(12) United States Patent
Finley et al.

(10) Patent No.: US 12,440,233 B2
(45) Date of Patent: Oct. 14, 2025

(54) POWERED SURGICAL TOOL WITH TRANSMISSION

(71) Applicant: GLOBUS MEDICAL, INC., Audubon, PA (US)

(72) Inventors: Marshal Eric Finley, Phoenixville, PA (US); Anthony James Ruhala, Almont, MI (US); James D. Lark, King of Prussia, PA (US); Christopher James Lark, West Bloomfield, MI (US); Corey Freimark, Grand Haven, MI (US); Evan Jeffries, Farmington Hills, MI (US); Haley Madison Schappell, Phoenixville, PA (US)

(73) Assignee: Globus Medical Inc., Audubon, PA (US)

( * ) Notice: Subject to any disclaimer, the term of this patent is extended or adjusted under 35 U.S.C. 154(b) by 357 days.

(21) Appl. No.: 18/177,184

(22) Filed: Mar. 2, 2023

(65) Prior Publication Data

US 2024/0293120 A1    Sep. 5, 2024

(51) Int. Cl.
*A61B 17/32* (2006.01)
*A61B 17/00* (2006.01)

(52) U.S. Cl.
CPC .... *A61B 17/32* (2013.01); *A61B 2017/00398* (2013.01); *A61B 2017/00477* (2013.01)

(58) Field of Classification Search
CPC ............ A61B 17/32; A61B 17/16; A61B 2017/00398; A61B 2017/00477
See application file for complete search history.

(56) References Cited

U.S. PATENT DOCUMENTS

| | | | |
|---|---|---|---|
| 10,194,922 B2 | 2/2019 | Bono et al. | |
| 2012/0181058 A1 | 7/2012 | Chaudhary et al. | |
| 2013/0304069 A1 | 11/2013 | Bono et al. | |
| 2020/0170660 A1* | 6/2020 | Bono | A61B 17/32002 |
| 2022/0338895 A1 | 10/2022 | Bono et al. | |

FOREIGN PATENT DOCUMENTS

JP    57-57952 B    7/1982

* cited by examiner

*Primary Examiner* — Mohamed G Gabr
*Assistant Examiner* — Khoa Tan Le

(57) ABSTRACT

The present invention relates to a powered surgical tool that selectively provides rotational oscillations to a tool head (effector) to effect tissue modification during a surgical procedure. The present invention also relates to cutting tools and tissue modification tools that operate to modify tissue when rotated in either or both directions about the longitudinal axis of the tool. The present surgical tool and cutting tools are effective to modify selective tissues while selectively preventing the modification of other tissues. For example, hard tissue, like bone, may be modified while soft tissue is not modified, or soft tissue may be modified without modification to hard tissue.

20 Claims, 49 Drawing Sheets

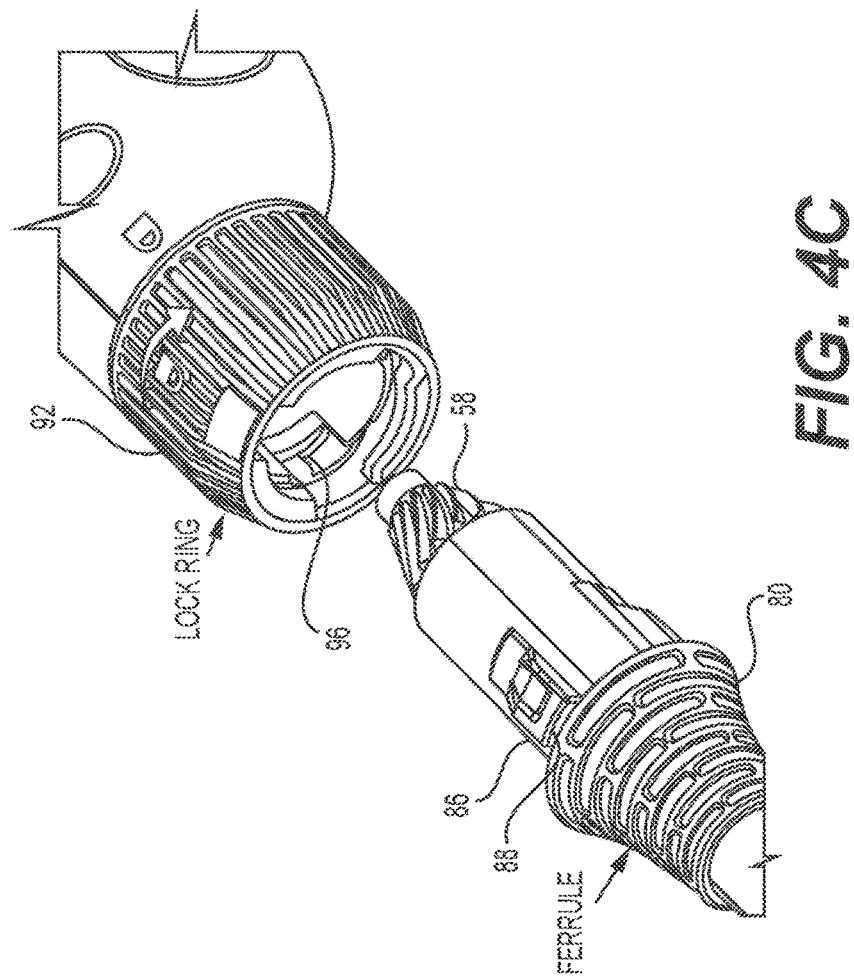
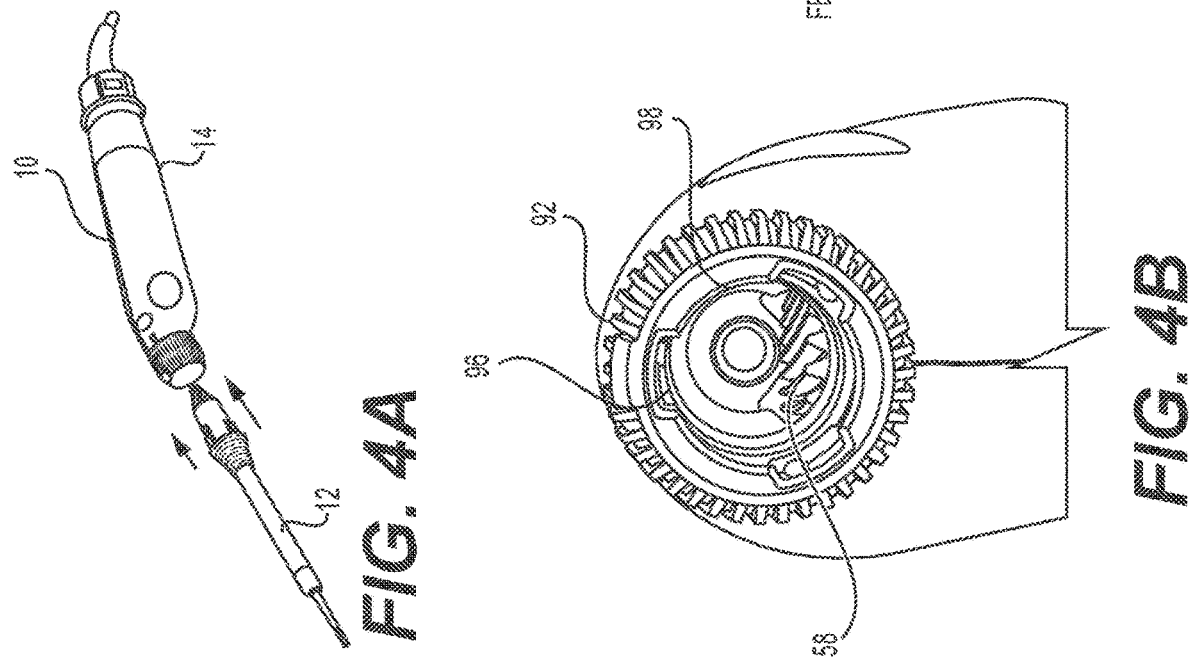

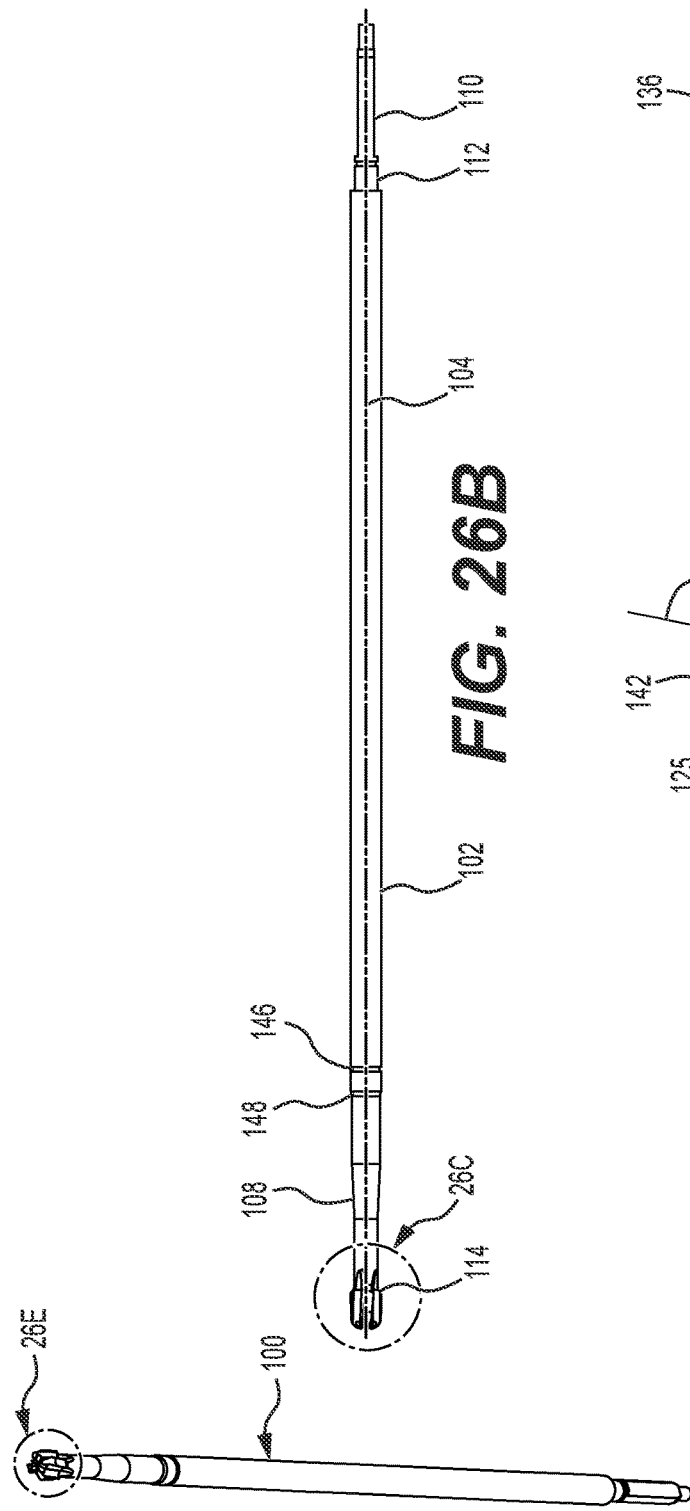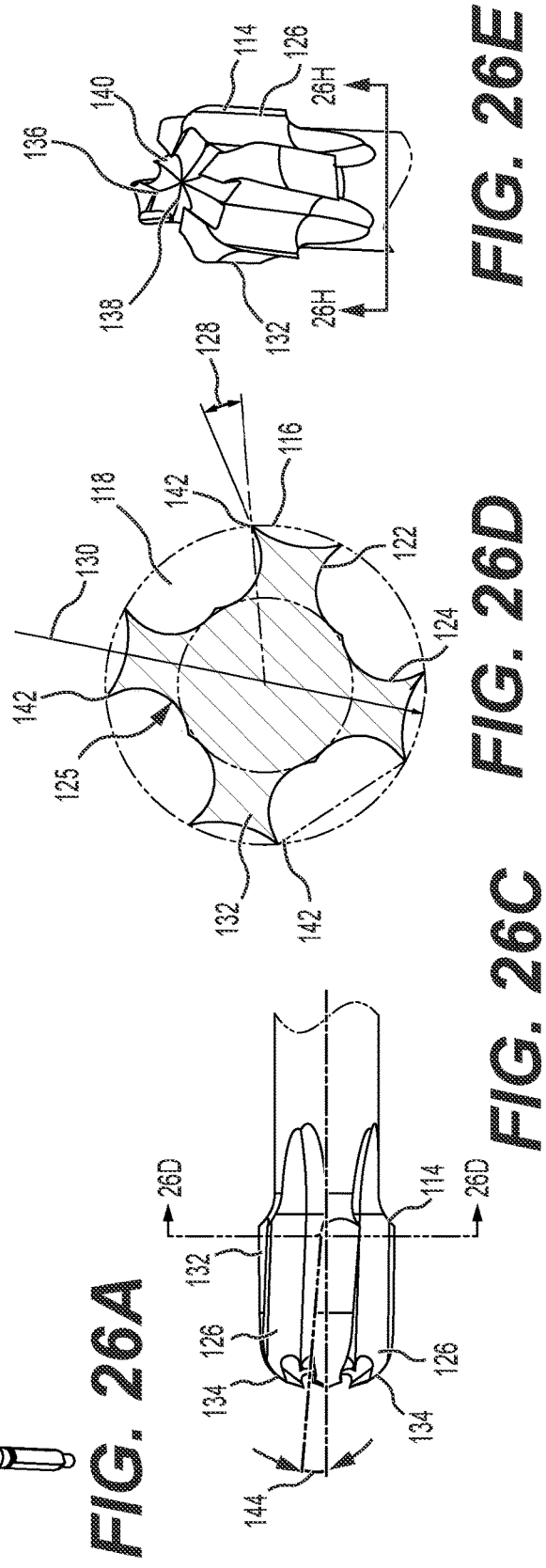

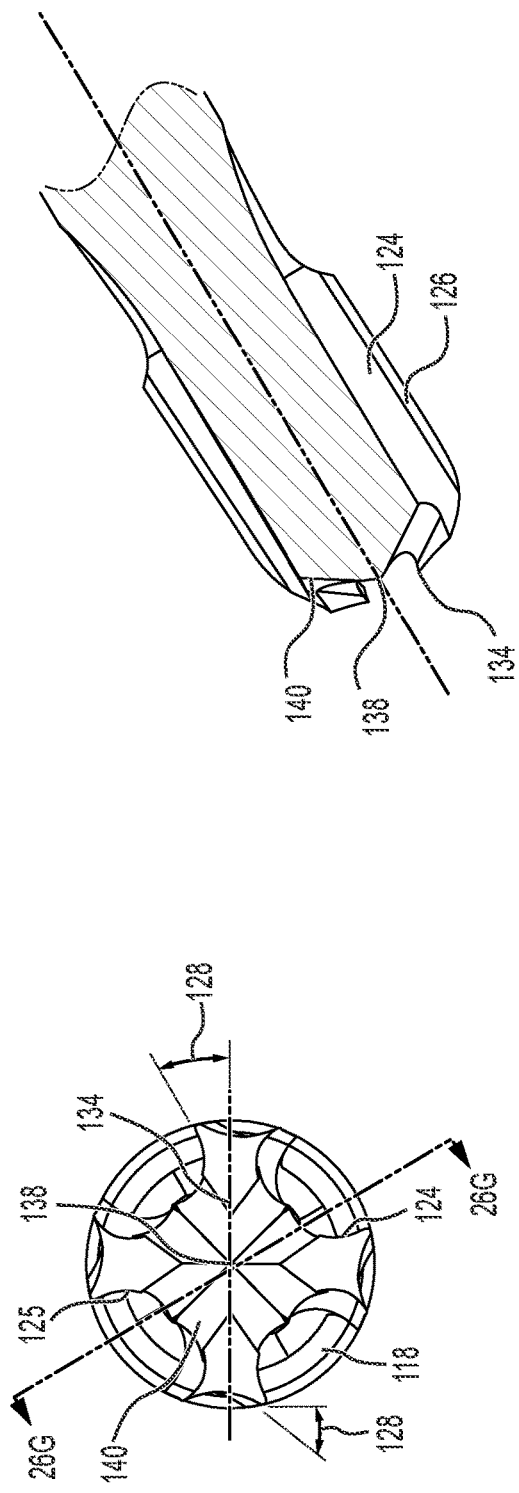
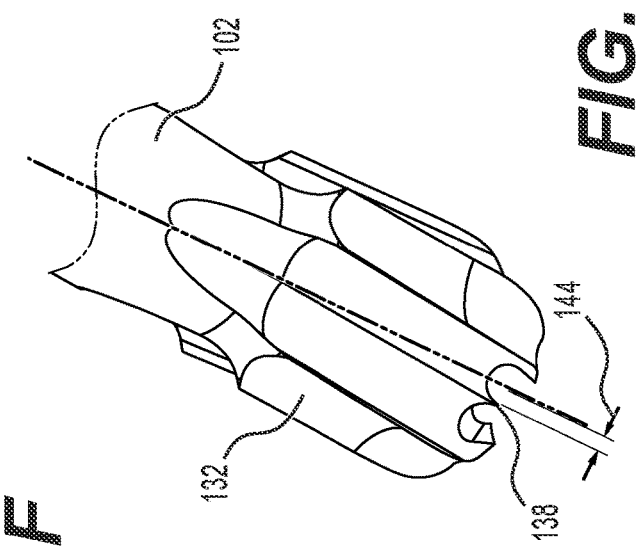
FIG. 26F
FIG. 26G
FIG. 26H

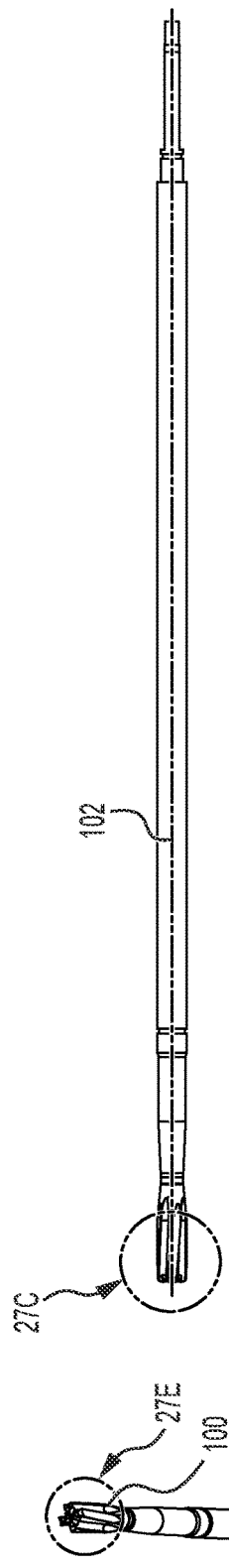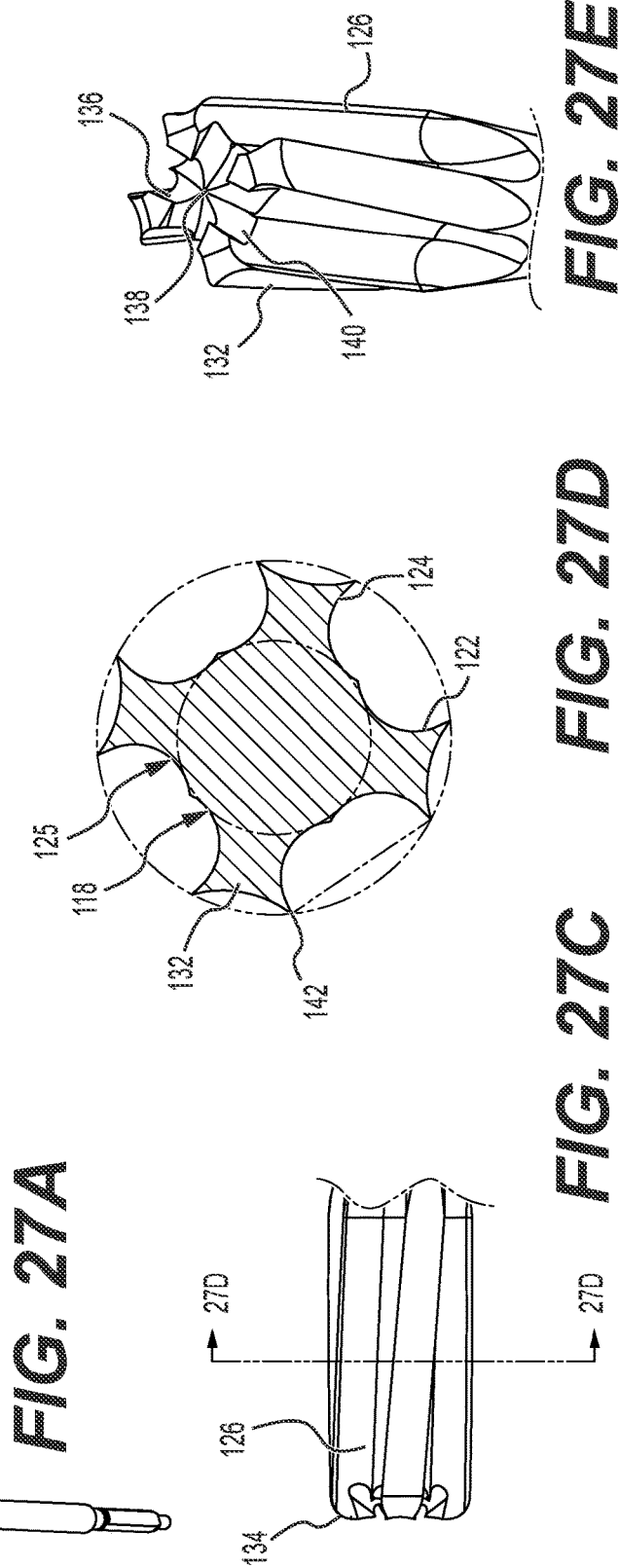

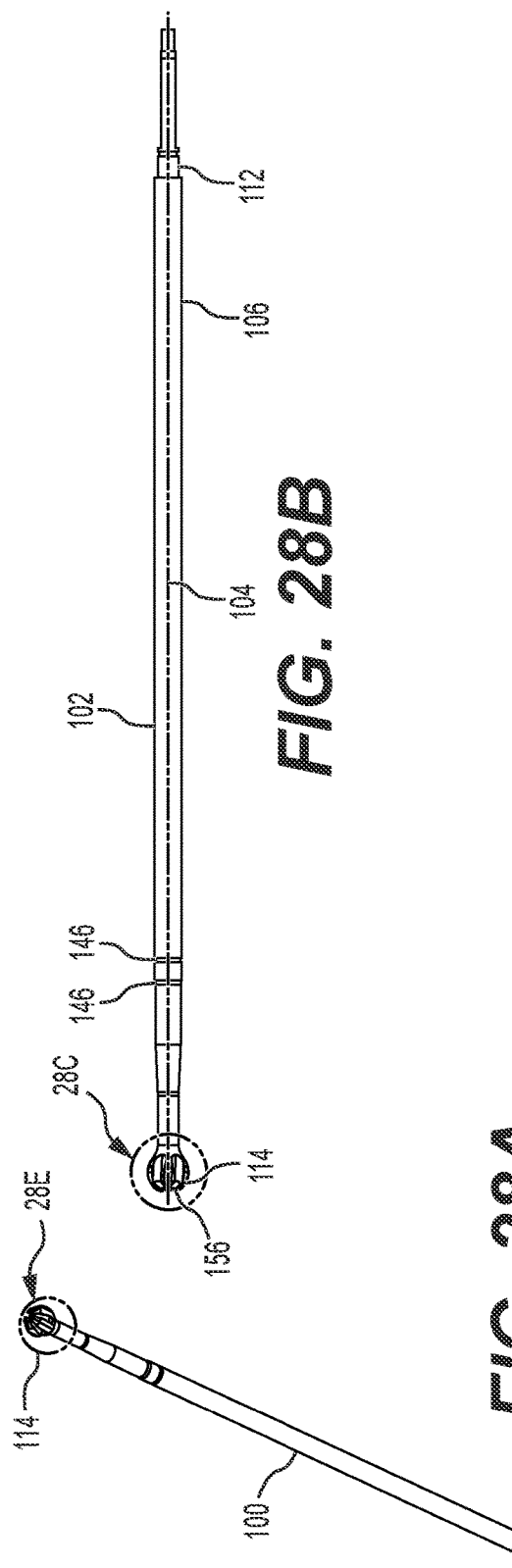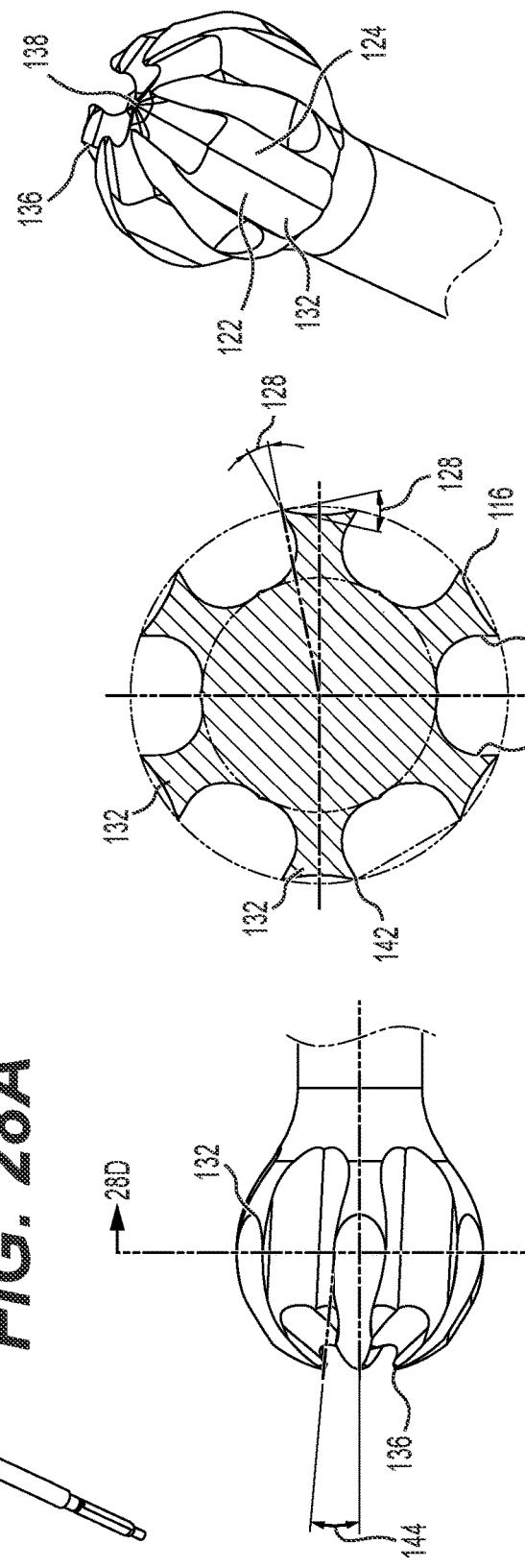

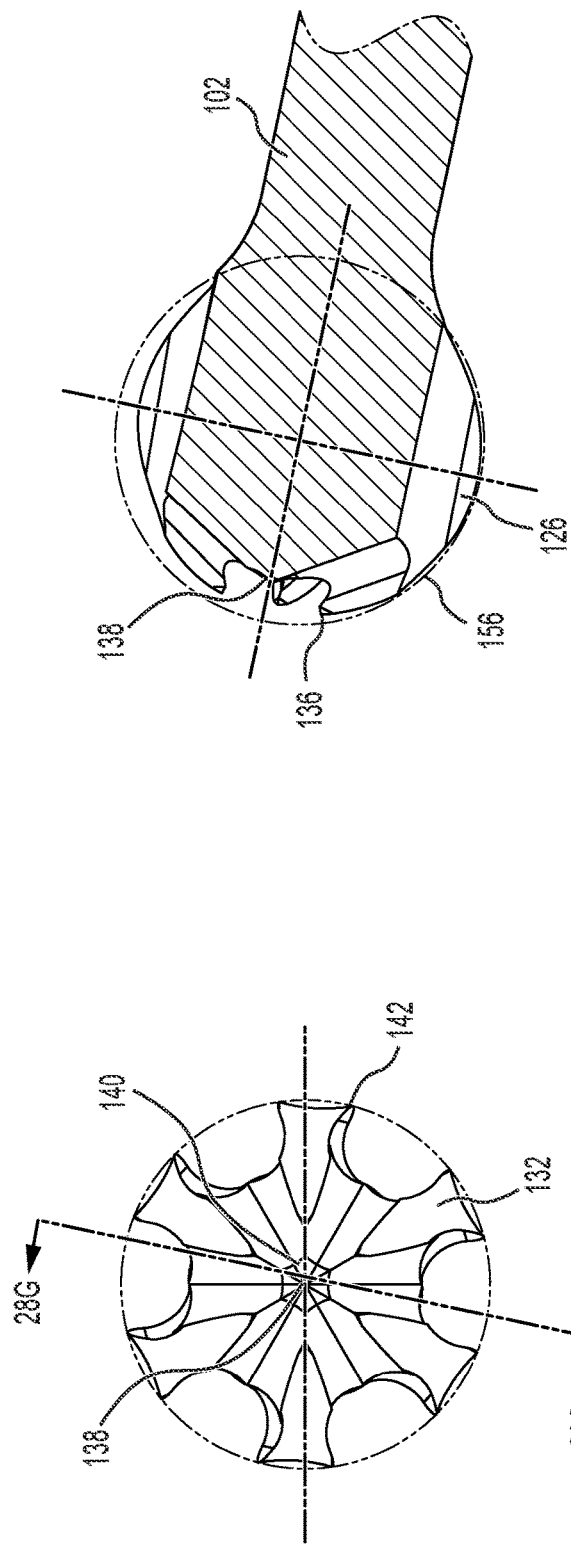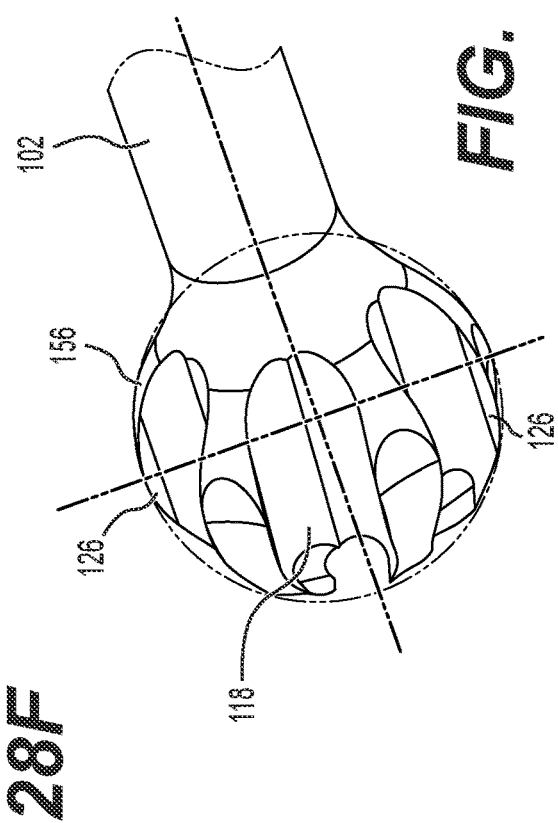
FIG. 28G
FIG. 28H
FIG. 28F

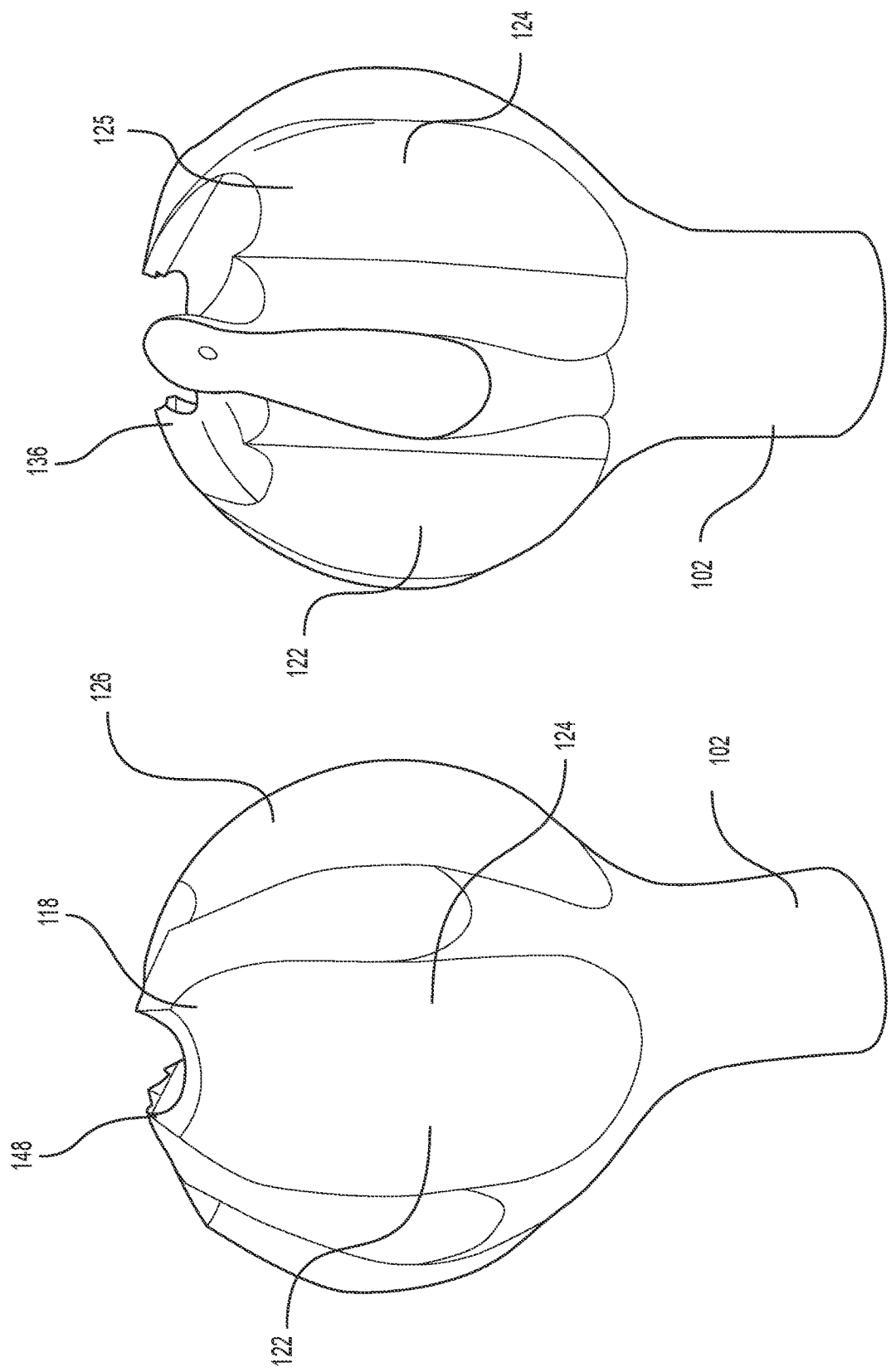

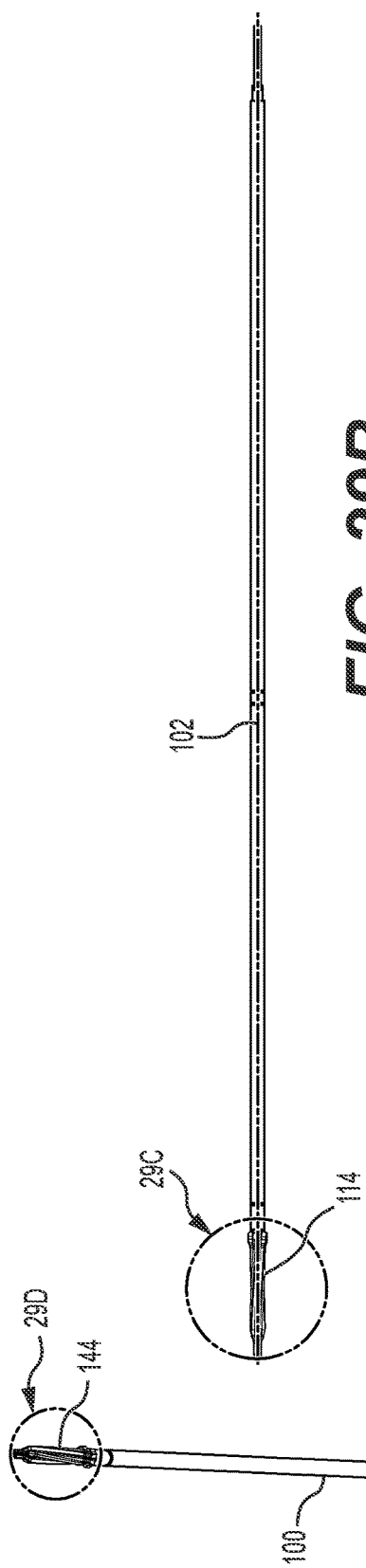
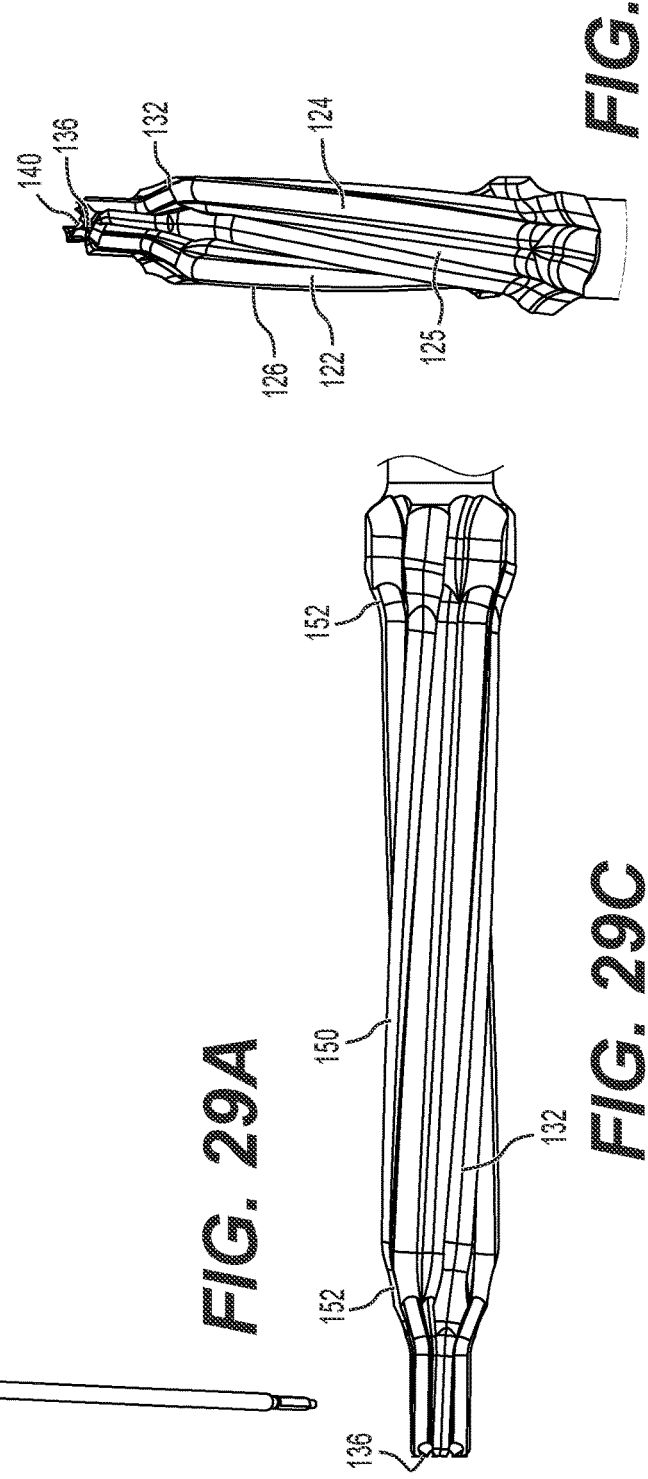
FIG. 29A
FIG. 29B
FIG. 29C
FIG. 29D

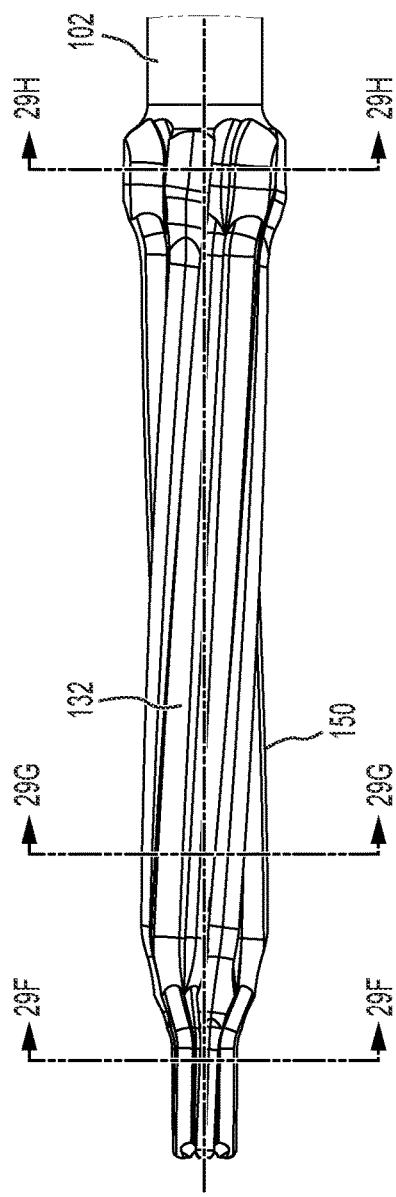
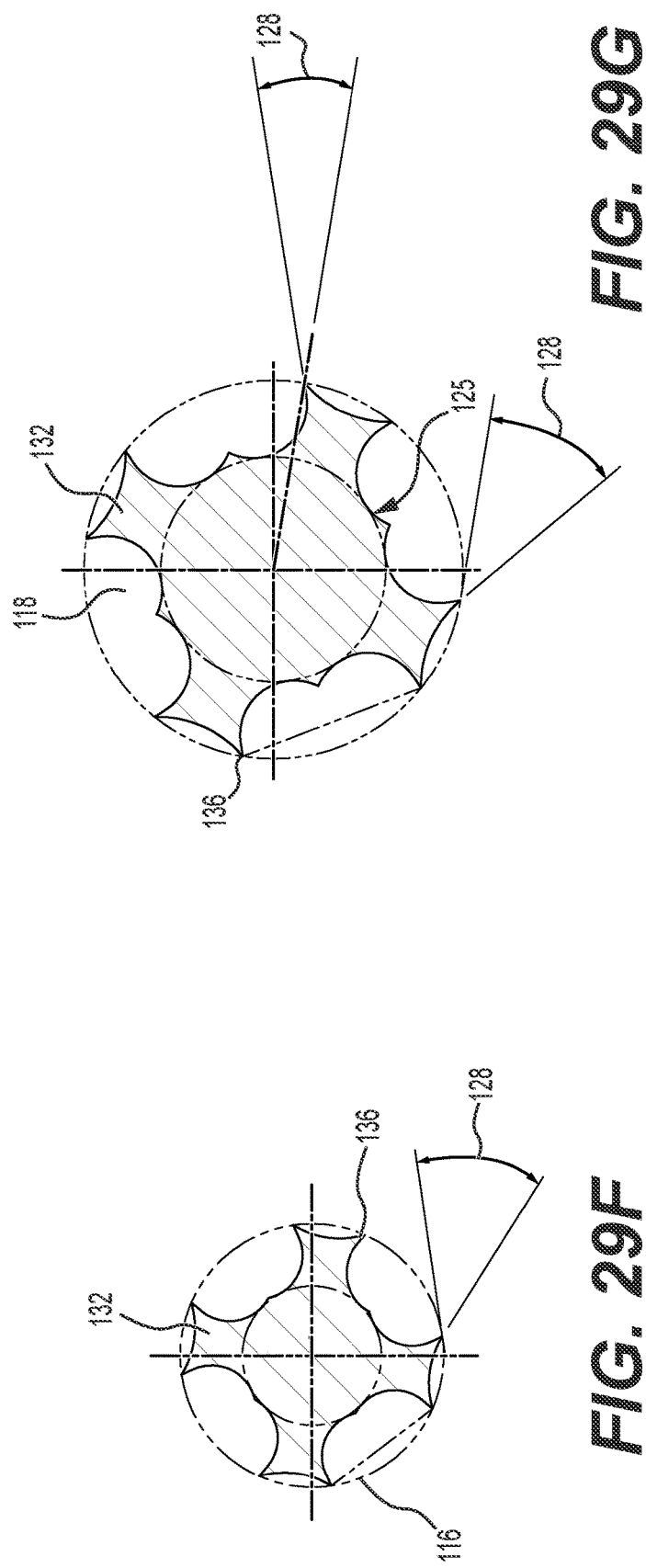
FIG. 29E
FIG. 29G
FIG. 29F

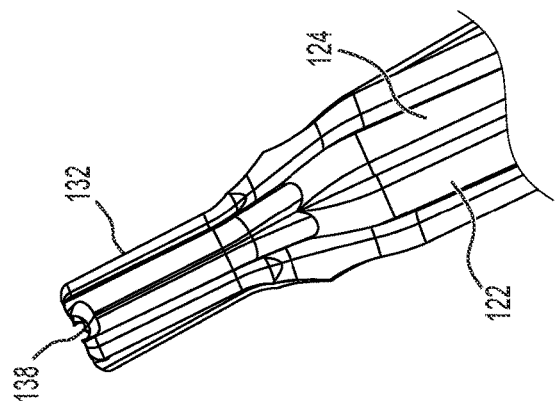
FIG. 29I
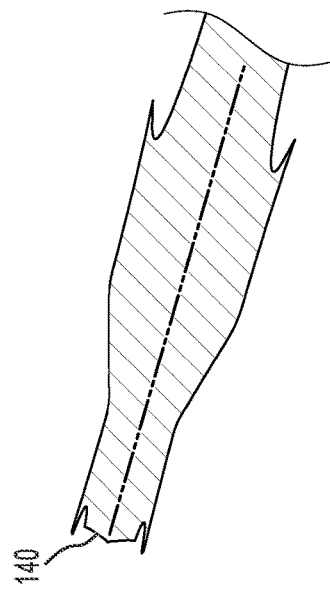
FIG. 29L
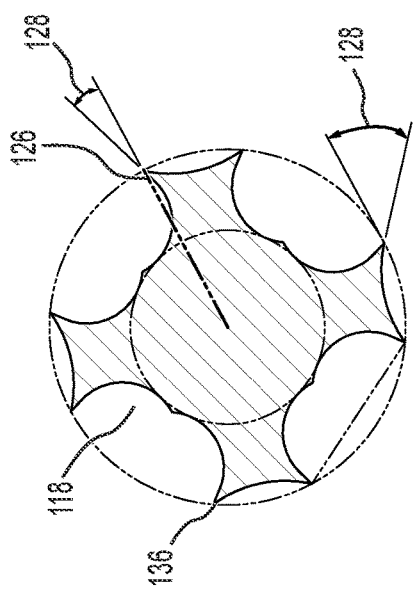
FIG. 29H
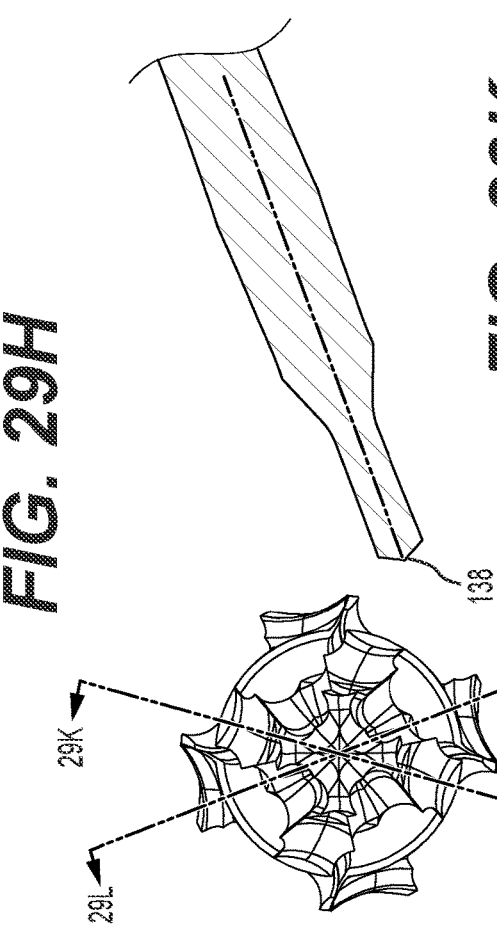
FIG. 29K
FIG. 29J

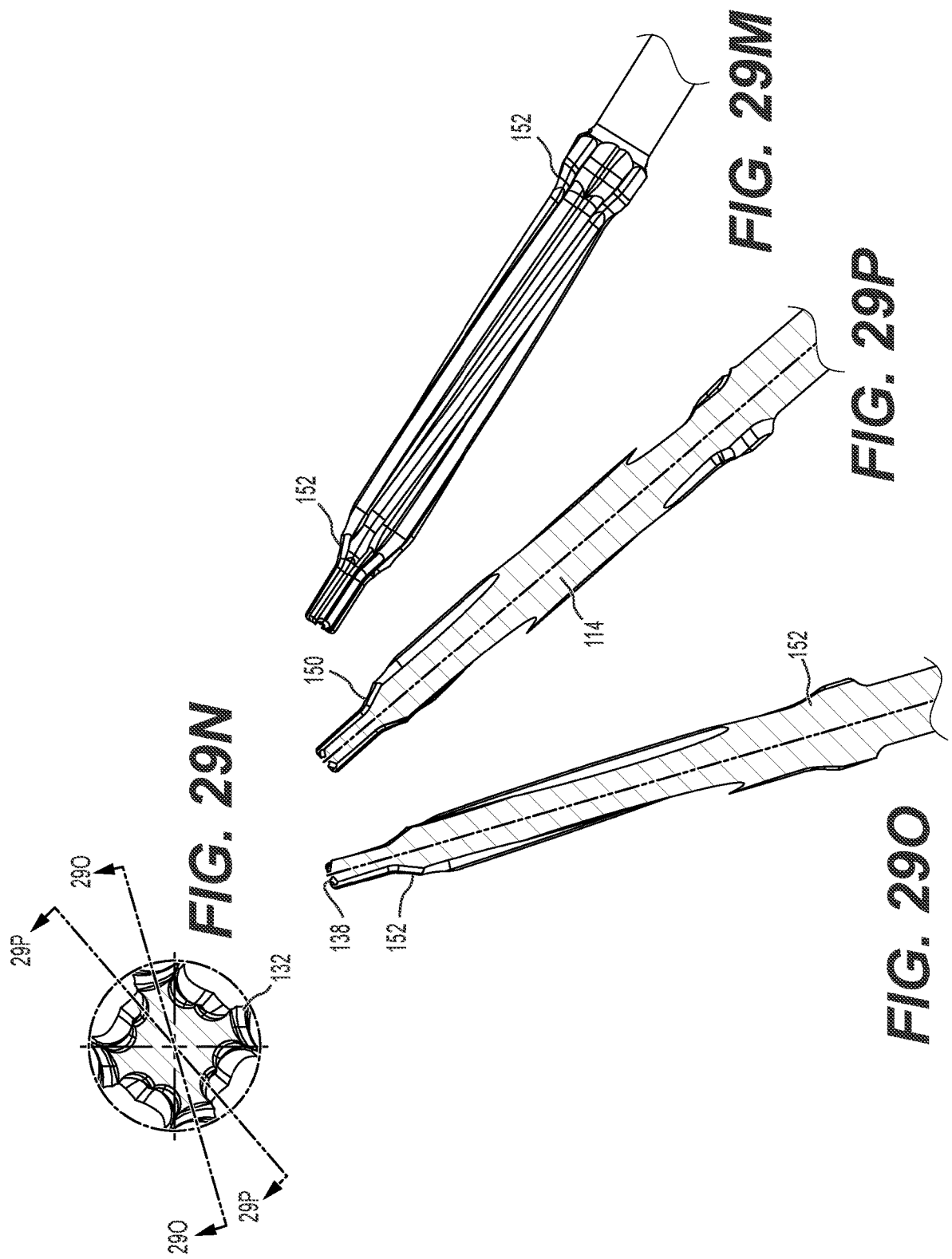

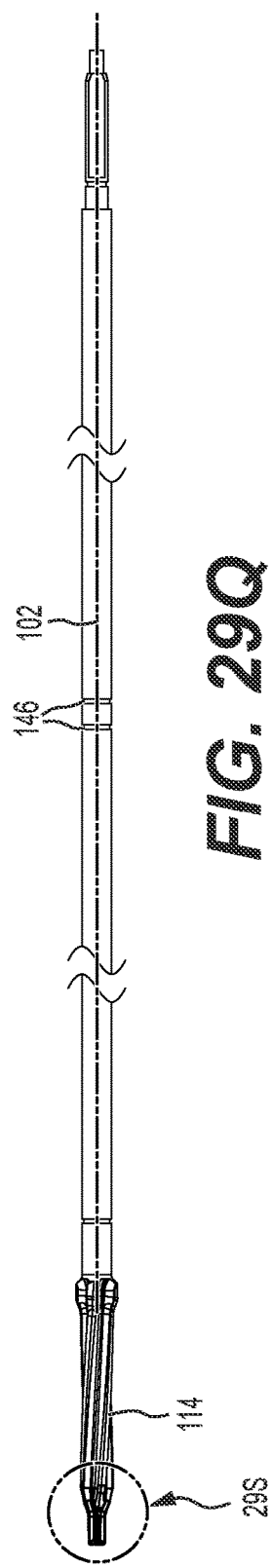
FIG. 29Q
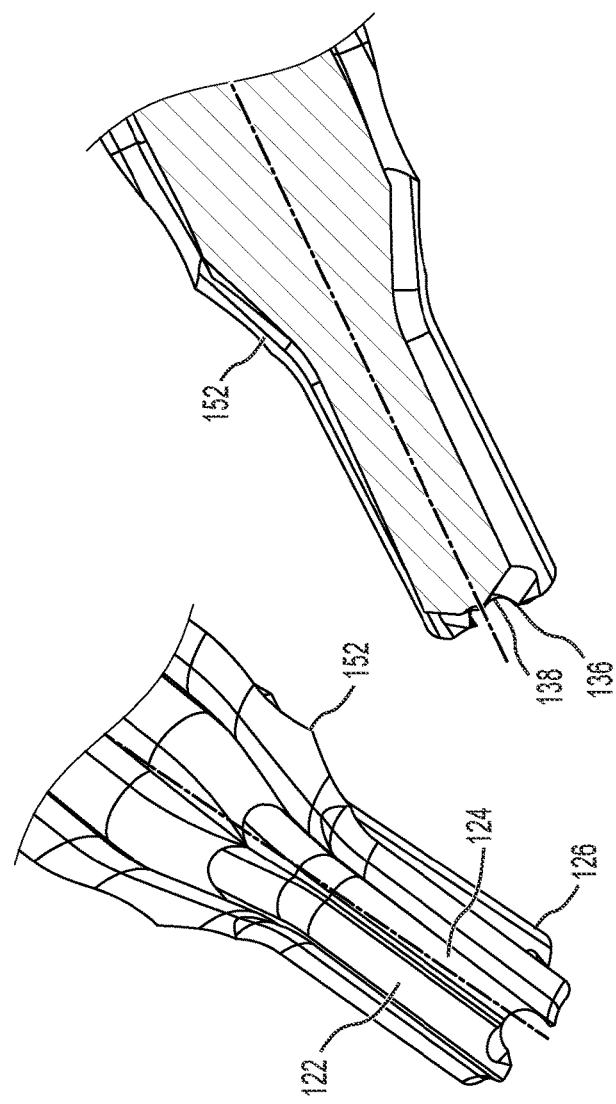
FIG. 29T
FIG. 29S
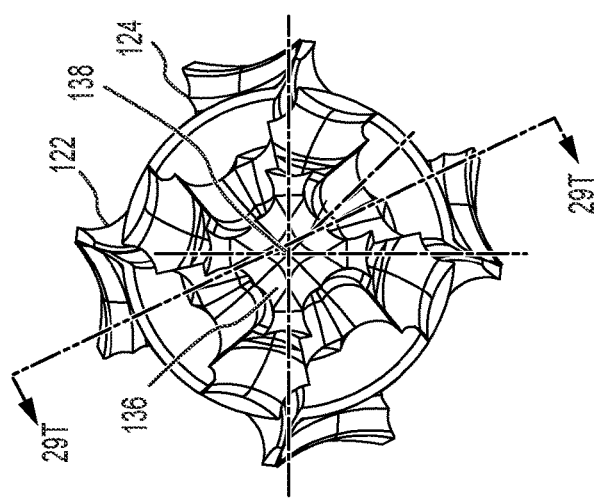
FIG. 29R

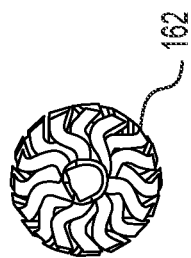
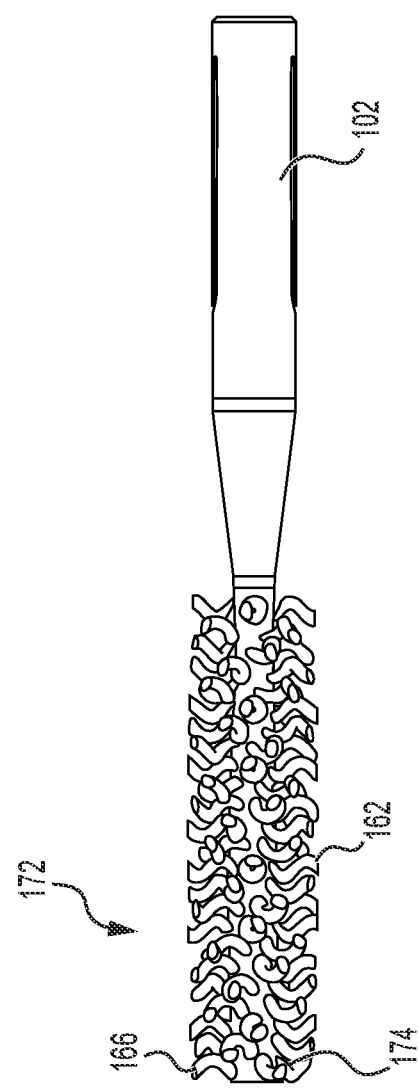
FIG. 31C
FIG. 31B

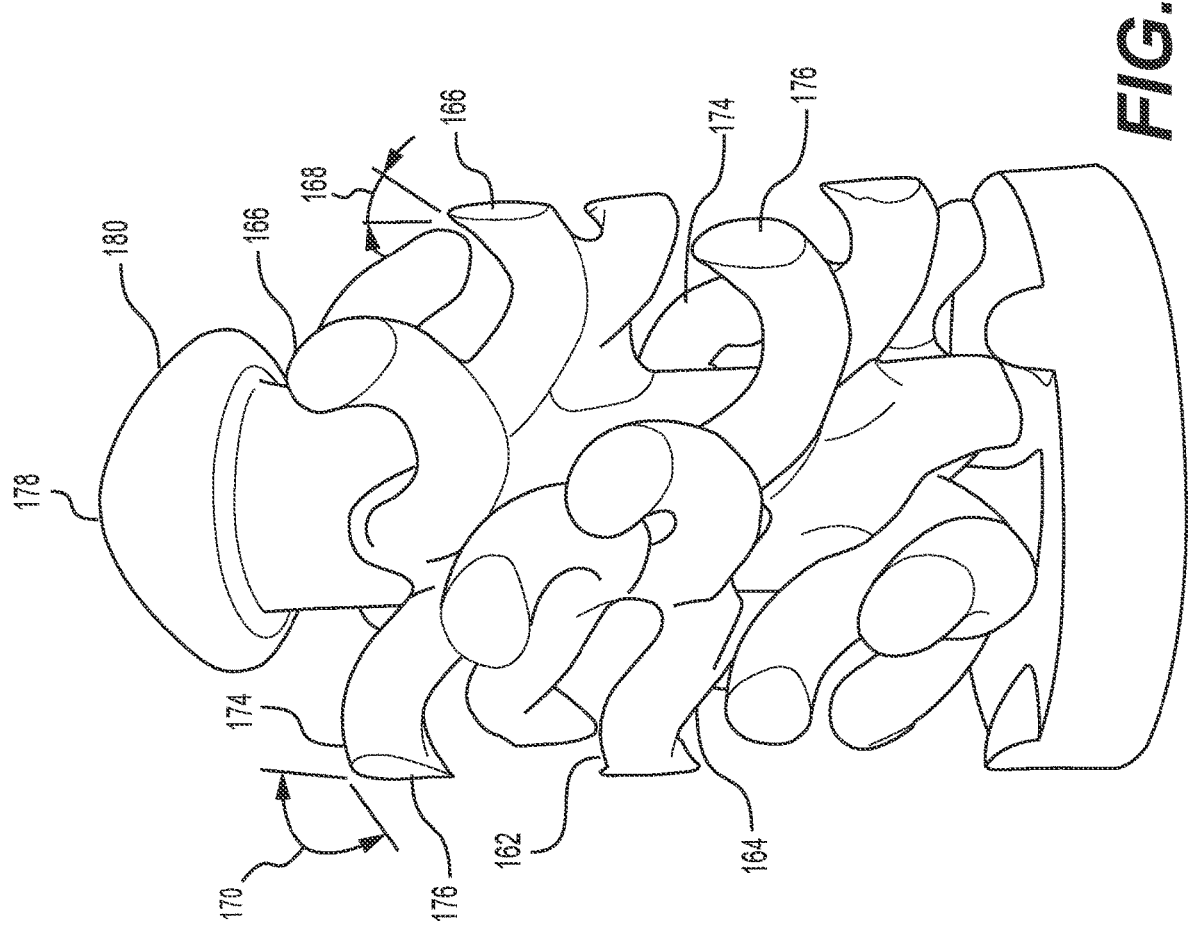

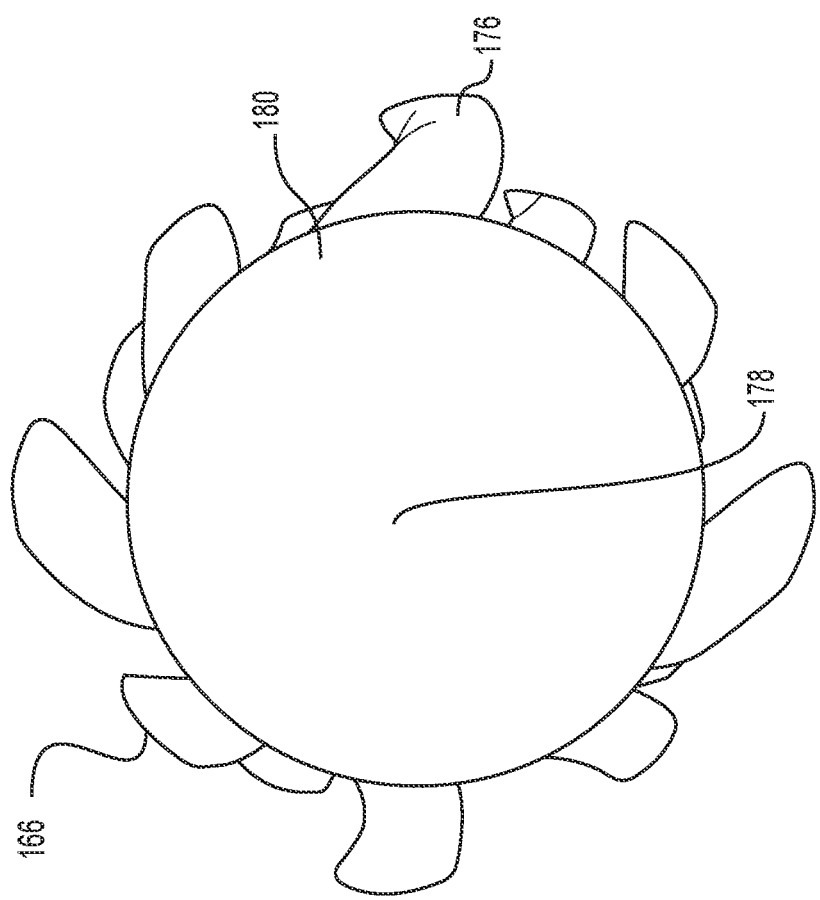

POWERED SURGICAL TOOL WITH TRANSMISSION

RELATED APPLICATIONS AND PATENTS

The present application is related to the U.S. Non-Provisional patent application Ser. No. 17/893,789, filed Aug. 23, 2022; U.S. Non-Provisional patent application Ser. No. 13/469,665, entitled "Rotary Oscillating Bone, Cartilage, and Disk Removal Tool Assembly, filed May 11, 2012, now U.S. Pat. No. 10,194,922, issued on Feb. 5, 2019; U.S. International Application No. PCT/US2013/037071, entitled "Rotary Oscillating Bone, Cartilage, and Disk Removal Tool Assembly", filed Apr. 18, 2013; U.S. Non-Provisional patent application Ser. No. 13/647,101, entitled "Cutting Tool for Bone, Cartilage, and Disk Removal", filed Oct. 8, 2012, now U.S. Pat. No. 9,232,953, issued on Jan. 12, 2016; U.S. International Application No. PCT/US2013/063182, entitled "Cutting Tool for Bone, Cartilage, and Disk Removal", filed Oct. 3, 2013; U.S. Provisional Patent Application No. 62/460,481, entitled "Surgical Rotary Tool", filed Feb. 17, 2017; U.S. Non-Provisional patent application Ser. No. 15/895,352, entitled "Surgical Rotary Tool", filed Feb. 13, 2018; U.S. Non-Provisional patent application Ser. No. 15/932,361, entitled "Surgical Rotary Tool", filed Feb. 16, 2018, now U.S. Pat. No. 11,523,833, issued on Dec. 13, 2022; U.S. Provisional Patent Application No. 62/423,624, entitled "Rotary Oscillating Surgical Tool", filed Nov. 17, 2016; U.S. Non-Provisional patent application Ser. No. 15/814,891, entitled "Rotary Oscillating Surgical Tool", filed Nov. 16, 2017, now U.S. Pat. No. 10,835,263, issued on Nov. 17, 2020; U.S. Provisional Patent Application No. 62/423,651, entitled "Robotic Surgical System", filed Nov. 17, 2016; U.S. Provisional Patent Application No. 62/423,677, entitled "Robotic Surgical System", filed Nov. 17, 2016; U.S. Non-Provisional patent application Ser. No. 15/816,861, entitled "Robotic Surgical System", filed Nov. 17, 2017; now U.S. Pat. No. 11,135,026, issued on Oct. 5, 2021; U.S. Non-Provisional patent application Ser. No. 16/266,802, entitled "Rotary Oscillating Bone, Cartilage, and Disk Removal Tool Assembly" filed Feb. 4, 2019, now U.S. Pat. No. 11,389,719, issued Jul. 19, 2022; U.S. Non-Provisional patent application Ser. No. 17/459,754, entitled "Robotic Surgical System and Method", filed Aug. 27, 2021; and U.S. Non-Provisional patent application Ser. No. 17/842,296, entitled "Rotary Oscillating Bone, Cartilage, and Disk Removal Tool Assembly", filed Jun. 16, 2022. All of the above-identified references are incorporated herein in their entirety by reference.

FIELD OF THE INVENTION

The present invention relates to a rotary handheld surgical tool usable for cutting, drilling, and grinding.

BACKGROUND OF THE INVENTION

Powered rotary tools for surgery are well known in the art. Many surgeons consider them indispensable for certain surgical procedures, such as drilling, cutting, and grinding, particularly for orthopedic surgical procedures. They are used to modify tissue, such as bone, at the surgical site so that the surgical procedure can be effected. Such a tool typically includes a tool head, or end effector, which is rotated by an externally powered motor, such as an electrical motor. The tool head is part of an elongate shaft that is operably coupled to the rotor of the motor. The rotor of the motor effects rotation of the tool head and its shaft. The rotating tool head is used to effect some surgical operation, for example drilling, cutting, and grinding. An actuator is provided to selectively effect powering of the motor rotor to effect rotation of the effector.

Such tools are expensive and, because of the numerous parts, difficult and expensive to sterilize for reuse, often requiring partial or complete disassembly. Also, the tools have separable parts, such as the tissue modifying tool head. Besides removing tissue, such powered tools are used for other surgical steps, such as installing fasteners, such as screws. If a tool cannot be readily sterilized, it is disposed of after use, adding to the cost of surgery. Thus, when separate powered tools are used, multiple tools need to be sterilized or disposed of.

The prior art has provided surgical tools having a rotary cutter adapted to modify tissue, such as bone, cartilage, and discs, in a patient. Such tools, though, present a problem if the cutter encounters fibrous tissue such as muscle and nerves. Such fibrous tissue can wrap around the cutter and be damaged thereby. The prior art has also provided oscillating rotary tools for such surgical procedures, but the mechanisms used to effect oscillation of the cutter during rotation do not operate smoothly due to the mechanisms used to effect oscillation. An advance in such oscillating tools is represented by our co-pending applications: U.S. Non-Provisional patent application Ser. No. 13/469,665, entitled "Rotary Oscillating Bone, Cartilage, and Disk Removal Tool Assembly, filed May 11, 2012; and now issued U.S. Pat. No. 10,194,922, issued on Feb. 5, 2019; U.S. International Application No. PCT/US2013/037071, entitled "Rotary Oscillating Bone, Cartilage, and Disk Removal Tool Assembly", filed Apr. 18, 2013; U.S. Non-Provisional patent application Ser. No. 13/647,101, entitled "Cutting Tool for Bone, Cartilage, and Disk Removal", filed Oct. 8, 2012, and now issued U.S. Pat. No. 9,232,953, issued on Jan. 12, 2016; U.S. International Application No. PCT/US2013/063182, entitled "Cutting Tool for Bone, Cartilage, and Disk Removal", filed Oct. 3, 2013; U.S. Provisional Patent Application No. 62/460,481, entitled "Surgical Rotary Tool", filed Feb. 17, 2017, U.S. Non-Provisional patent application Ser. No. 15/895,352, entitled "Surgical Rotary Tool", filed Feb. 13, 2018; and U.S. Non-Provisional patent application Ser. No. 15/932,361, entitled "Surgical Rotary Tool", filed Feb. 16, 2018; U.S. Provisional Patent Application No. 62/423,624, entitled "Rotary Oscillating Surgical Tool", filed Nov. 17, 2016, and U.S. Non-Provisional patent application Ser. No. 15/814,891, entitled "Rotary Oscillating Surgical Tool", filed Nov. 16, 2017; U.S. Provisional Patent Application No. 62/423,651, entitled "Robotic Surgical System", filed Nov. 17, 2016; U.S. Provisional Patent Application No. 62/423,677, entitled "Robotic Surgical System", filed Nov. 17, 2016, and U.S. Non-Provisional patent application Ser. No. 15/816,861, entitled "Robotic Surgical System", filed Nov. 17, 2017.

Because of the oscillation of the cutting tools, there is a need for the cutting system to be smooth in operation with little vibration and noise.

SUMMARY OF THE INVENTION

The present invention relates to a powered surgical tool that selectively provides rotational oscillations to a tool head (effector) to effect tissue modification during a surgical procedure. The present invention also relates to cutting tools and tissue modification tools that operate to modify tissue when rotated in either or both directions about the longitudinal axis of the tool. The present surgical tool and cutting tools are effective to modify selective tissues while selectively preventing the modification of other tissues. For example, hard tissue, like bone, may be modified while soft tissue is not modified, or soft tissue may be modified without modification to hard tissue.

Accordingly, it is an objective of the present invention to provide a rotary oscillating surgical tool that has an output shaft that permits interchanging end effectors from a hard tissue modification tool to a soft tissue modification tool.

It is a further objective of the present invention to provide a rotary oscillating surgical tool with a transmission that provides rotational oscillations of the cutting tool about the longitudinal axis of the cutting tool.

It is a still further objective of the present invention to provide such a surgical tool that allows for selection and interchangeability of the cutting tool while utilizing the same powered surgical tool.

An even further objective of the present invention is to provide a mechanism for converting rotational motion from an electric motor into oscillating rotational motion.

Still a further objective of the present invention is to provide cutting tools that operate to selectively modify hard or soft tissue when rotationally oscillated.

Still yet a further objective of the present invention is to provide a tool change assembly that changes a portion of the oscillating transmission to replace portions of the transmission that have higher wear in operation.

In one aspect of the present invention, a power operated surgical tool comprising an external housing adapted to enclose and support various internal components, a transmission and a motor secured within the external housing is provided. The motor includes an output shaft, the motor output shaft connected to the transmission, the transmission including an oscillating rotation drive mechanism for causing a cutting tool to rotationally oscillate about a longitudinal axis of the cutting tool, the oscillating rotation drive mechanism having a link that revolves about the motor offset shaft at a swing angle and is attached to a rotatably mounted shuttle so that the distal end of the link rotates around the motor shaft while a pivot axis at the front portion of the link is positioned to rotate upon a neutral point, causing the shuttle to rotationally oscillate about an axis orthogonal with respect to the motor output shaft.

In another aspect of the present invention, the relationship of the swing angle can be varied with respect to the motor output shaft to provide different angular rotation of the shuttle.

In another aspect of the present invention, the shuttle includes an actuate gear segment, the gear segment intermeshed with a pinion gear, the pinion gear connected to an end effector shaft to cause the rotational oscillating motion to the end effector shaft.

In another aspect of the present invention, the end effector shaft includes the cutting tool.

In another aspect of the present invention, the power operated surgical tool includes a crank assembly hub secured to the motor output shaft, the crank assembly hub including a hub bore for receiving the distal end of the link, the crank assembly hub constructed and arranged to maintain the swing angle.

In another aspect of the present invention, the swing angle is an acute angle with respect to the motor output shaft. In another aspect of the present invention, rotation of the cutting tool is between 40 degrees and 180 degrees in each direction about the longitudinal axis of the cutting tool. In another aspect of the present invention, oscillating rotation of the cutting tool is between 50 degrees and 90 degrees in each direction about the longitudinal axis of the cutting tool.

In another aspect of the present invention, the link is secured to the shuttle by one or more arms each having a bearing which receives therein a bolt that is received within the bearings and threadably secured to a bore in the shuttle.

In another aspect of the present invention, the link is secured to the shuttle by a pair of spaced apart arms each having a bearing which receives therein a bolt that is received within the bearings and threadably secured to a bore in the shuttle.

In another aspect of the present invention, the pinion gear, as well as the gear segment, are constructed from a polymeric material.

In another aspect of the present invention, the polymeric material is polyether ether ketone.

In another aspect of the present invention, the pinion gear, as well as the gear segment, are straight cut gears. In another aspect of the present invention, the pinion gear, as well as the gear segment, are helical cut gears.

In another aspect of the present invention, the end effector is removably connected to the external housing.

In another aspect of the present invention, the end effector includes the pinion gear, the end effector shaft, and the cutting tool.

In another aspect of the present invention, the power operated surgical tool includes a tool coupler for coupling the end effector to the external housing, the tool coupler including a ferrule secured to a first end of the end effector, while the cutting tool extends from a second end of the end effector, the ferrule including a flange, the flange including a stop surface that cooperates with a front surface of a lock ring to establish the depth that the end effector is allowed to enter into a motor assembly, adjacent the flange is a ferrule shank, the ferrule shank includes one or more keys fixed in position on the ferrule shank, each key including side key surfaces and a lock surface, the lock ring is constructed to rotate in a first direction to allow the ferrule shank to enter into an inner bore of the lock ring, allowing the ferrule key(s) to enter and the key side surfaces to engage a docking port of the external housing to prevent the end effector from rotating relative to the external housing.

In another aspect of the present invention, the lock ring includes one or more cam surfaces which cooperate with the lock surface(s) of the ferrule to pull the stop surface of the ferrule against a front surface of the lock ring to secure the end effector in position. In another aspect of the present invention, the lock ring includes a spring lock having a rounded end which cooperates with ridges positioned on an outer surface of the docking ports to provide a tactile feedback when the locking ring is rotated into its locked position.

In another aspect of the present invention, the power operated surgical tool includes an oscillating cutting tool, the oscillating cutting tool includes two or more flutes, the flutes extend inward from an outside diameter of the cutting tool toward a longitudinal axis, forming a recessed flute channel, each flute channel having a pair of opposing sidewalls, respectively and a cylindrical radius at the base of each flute channel, each opposing sidewall forms a face of a cutting edge extending along the length of each flute channel so that each flute channel provides two opposing faces providing cutting edges of a blade, allowing the cutting tool to cut in both directions when rotationally oscillated around the longitudinal axis.

In another aspect of the present invention, the flute channels and thus the blades extend along the cutting tool parallel with respect to the longitudinal axis.

In another aspect of the present invention, wherein the flute channels and thus the blades extend along the cutting tool helically with respect to the longitudinal axis.

In another aspect of the present invention, the helix angle is between three and five degrees with respect to the longitudinal axis. In another aspect of the present invention, the helix angle is more than five degrees with respect to the longitudinal axis.

In another aspect of the present invention, each blade includes a top corner radius, the top corner radius extending inwardly from an outside diameter towards the longitudinal axis so that the convergence of the face and the top corner radius provide the outermost diameter of the cutting tool.

In another aspect of the present invention, the top corner radius terminates in a sharp corner in close proximity to the longitudinal axis so that the sharp corners are spaced apart.

In another aspect of the present invention, a central point is positioned between the spaced apart sharp corners and along the longitudinal axis, the central point includes a plurality of facets from the convergence of the flute surfaces at the central point, the facets include sharp edges that grind and pulverize hard tissue.

In another aspect of the present invention, the cutting tool includes an extended central point, the extended central point includes facets which may be flat or curved intersecting at the central point to break the hard tissue when the cutting tool is oscillated.

In another aspect of the present invention, the power operated surgical tool includes a soft tissue oscillating cutter including a shank having a shaped head portion, the shaped head portion includes a plurality of helically positioned shaped talons, each talon including a body bent to retain tissue, and each talon including a cutter end.

In another aspect of the present invention, the cutter end includes both acute and obtuse cutting surface relief angles.

In another aspect of the present invention, the talon is round in cross-section and includes one or more bends terminating in a generally flat cutting surface, the cutting surface being substantially parallel to the outer surface of the shaped head portion. In another aspect of the present invention, the talon bends are about ninety degrees each, and each talon includes at least two bends along its length.

In another aspect of the present invention, a distal end of the soft tissue oscillating cutting tool is provided with a stop plug to limit the proximity of the soft-tissue cutting tool with respect to a tissue surface.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DESCRIPTION OF THE PRIOR ART

Examples of such rotary tools include those disclosed in U.S. Pat. Nos. 4,646,738; 5,735,535; 7,066,940; and U.S. Publication 2014/0246047. U.S. Pat. No. 4,646,738 is an electric motor-powered tool that is quite complex, and it would require disassembly after use for sterilization. U.S. Pat. No. 5,735,535 is an electric motor powered tool that is also complex, would require disassembly after use for sterilization, and uses a chuck to hold the tool head. U.S. Pat. No. 7,066,940 is also an electrically powered tool that, like the two previously mentioned tools, is complex, requires disassembly for sterilization, and has a separable cutting tool head. U.S. Patent Application Publication 2014/0246047 illustrates a different type of powered surgical tool, but it is not structured for using a rotary cutting tool. Like the aforementioned tools, it would require disassembly for sterilization and is quite complex in structure.

Even though advancements have been made over the years, no one has provided a simpler surgical tool that provides an advance in the art of rotary surgical tools that simplifies their use and provides for both tissue modification and screw installation functions in a single powered tool.

BRIEF DESCRIPTION OF THE FIGURES

FIG. 4A is an isometric view illustrating insertion of the end effector into the motor assembly;

FIG. 4B is an isometric view illustrating the socket for the end effector in the motor assembly;

FIG. 4C is an isometric view illustrating the end portion of the end effector which engages with the motor assembly;

FIG. 26A is an isometric view of a bi-directional cutting tool;

FIG. 26B is a side view of the bi-directional cutting tool illustrated in FIG. 26A;

FIG. 26C is a partial side view of the bi-directional cutting tool taken along lines 26C-26C of FIG. 26B;

FIG. 26D is a cross-sectional view of the bi-directional cutting tool taken along lines 26D-26D of FIG. 26C;

FIG. 26E is a partial isometric view taken along lines 26E-26E of FIG. 26A;

FIG. 26F is an end view of the bi-directional cutting tool;

FIG. 26G is a partial section view taken along lines 26G-26G of FIG. 26F;

FIG. 26H is a partial isometric view taken along lines 26H-26H of FIG. 26E;

FIG. 27A is an isometric view of a bi-directional cutting tool having elongated flutes and cutting surfaces;

FIG. 27B is a side view of the bi-directional cutting tool illustrated in FIG. 27A;

FIG. 27C is a partial side view of the bi-directional cutting tool taken along lines 27C-27C of FIG. 27B;

FIG. 27D is a cross-sectional view of the bi-directional cutting tool taken along lines 27D-27D of FIG. 27C;

FIG. 27E is a partial isometric view taken along lines 27E-27E of FIG. 27A;

FIG. 28A is an isometric view of a bi-directional ball nose cutting tool;

FIG. 28B is a side view of the bi-directional ball nose cutting tool illustrated in FIG. 28A;

FIG. 28C is a partial side view of the bi-directional cutting tool taken along lines 28C-28C of FIG. 28B;

FIG. 28D is a cross-sectional view of the bi-directional cutting tool taken along lines 28D-28D of FIG. 28C;

FIG. 28E is a partial isometric view taken along lines 28E-28E of FIG. 28A;

FIG. 28F is an end view of the ball nose cutting tool;

FIG. 28G is a section view taken along lines 28G-28G of FIG. 28F;

FIG. 28H is a partial side view of the ball nose cutting tool;

FIG. 28I is a partial side view of the ball nose cutting tool;

FIG. 28J is a partial side view of the ball nose cutting tool;

FIG. 29A is an isometric view of a bi-directional form cutting tool;

FIG. 29B is a side view of the bi-directional form cutting tool illustrated in FIG. 29A;

FIG. 29C is a partial side view of the bi-directional form cutting tool taken along lines 29C-29C of FIG. 29B;

FIG. 29D is a partial isometric view of the bi-directional form cutting tool taken along lines 29D-29D of FIG. 29A;

FIG. 29E is a partial side view of the bi-directional form cutting tool taken along lines 29C-29C of FIG. 29B;

FIG. 29F is a section view taken along lines 29F-29F of FIG. 29E;

FIG. 29G is a section view taken along lines 29G-29G of FIG. 29E;

FIG. 29H is a section view taken along lines 29H-29H of FIG. 29E;

FIG. 29I is a partial side view of the form cutting tool;

FIG. 29J is an end view of the form cutting tool;

FIG. 29K is a section view taken along lines 29K-29K of FIG. 29J;

FIG. 29L is a section view taken along lines 29L-29L of FIG. 29J;

FIG. 29M is a partial side view of the form cutting tool;

FIG. 29N is an end view of the form cutting tool;

FIG. 29O is a section view taken along lines 29O-29O of FIG. 29N;

FIG. 29P is a section view taken along lines 29P-29P of FIG. 29N;

FIG. 29Q is a side view of the form cutting tool;

FIG. 29R is an end view of the form cutting tool;

FIG. 29S is a partial isometric side view of the form cutting tool taken along lines 29S-29S;

FIG. 29T is a section view taken along lines 29T-29T of FIG. 29R;

FIG. 31B is a side view of the bi-directional tissue modification tool;

FIG. 31C is an end view of the bi-directional tissue modification tool;

FIG. 32A is a side view of a bi-directional tissue modification tool having a depth pilot;

FIG. 32B is an end view of the bi-directional tissue modification tool, illustrating the depth pilot.

DETAILED DESCRIPTION OF THE DISCLOSURE

Figure 1:
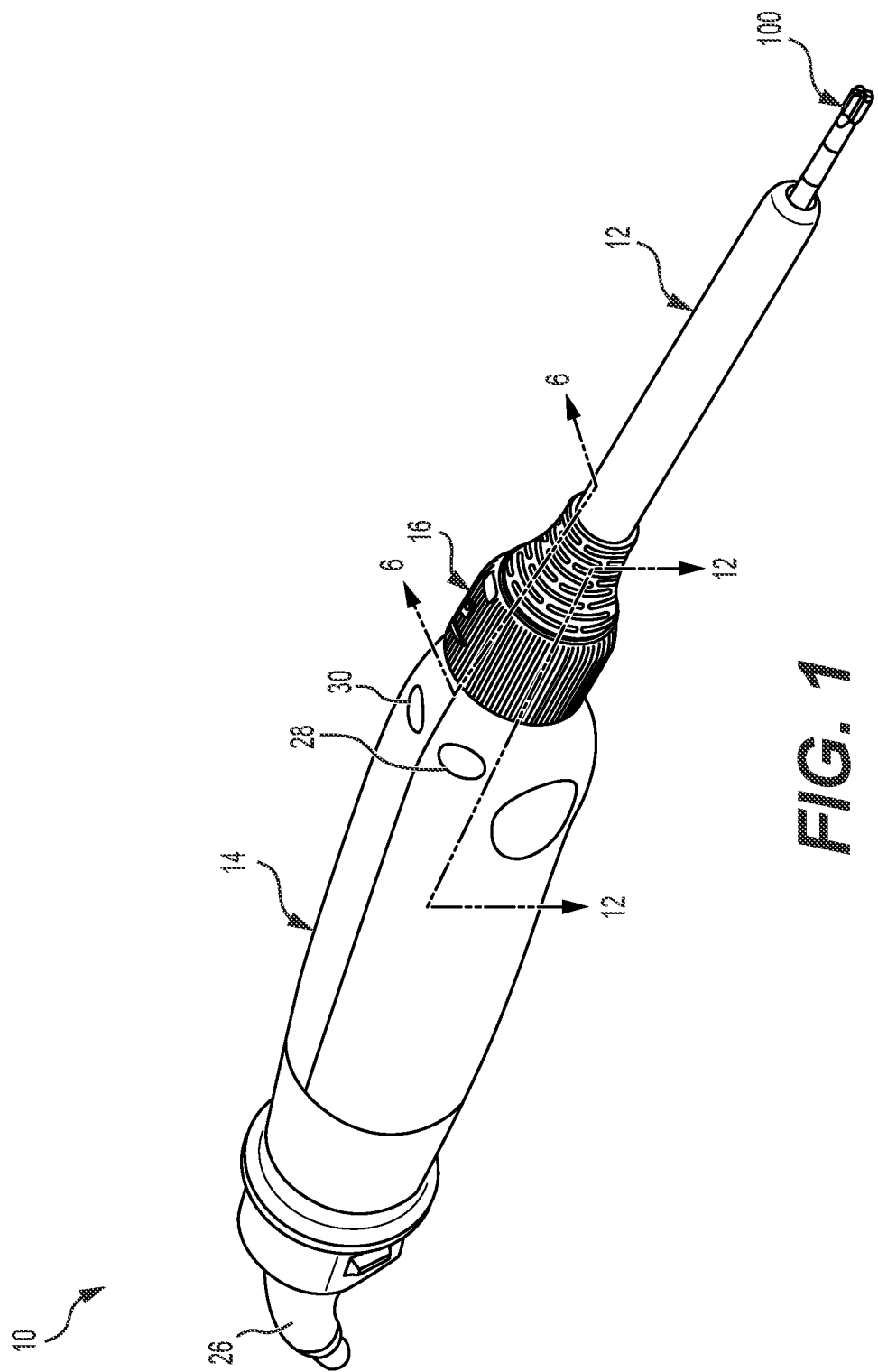
FIG. 1 is an isometric view of a surgical tool usable for tissue modification.
Figure 2:
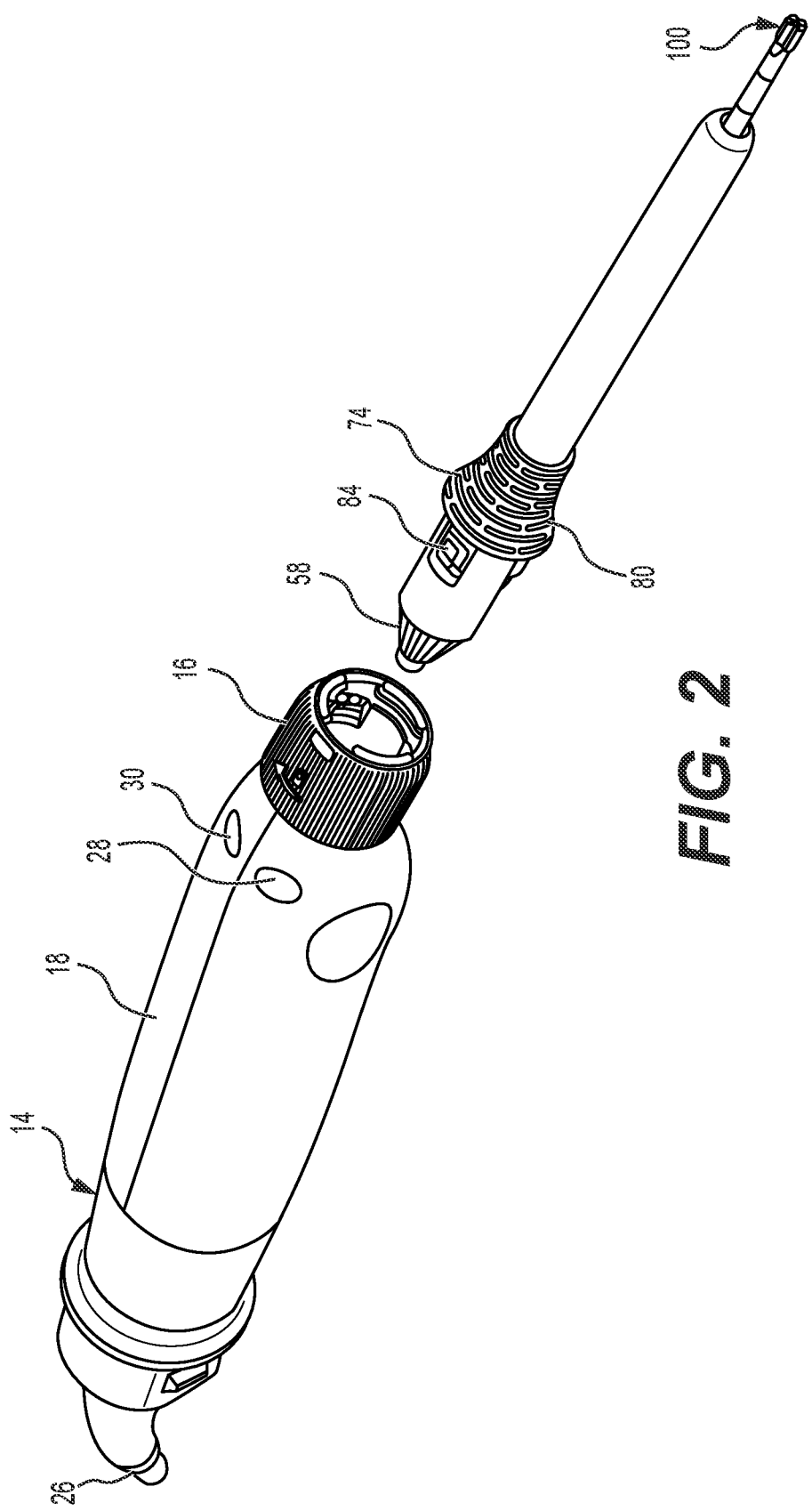
FIG. 2 is an isometric view of the surgical tool of FIG. 1 illustrated with a removable cutting tool.
Figure 3:
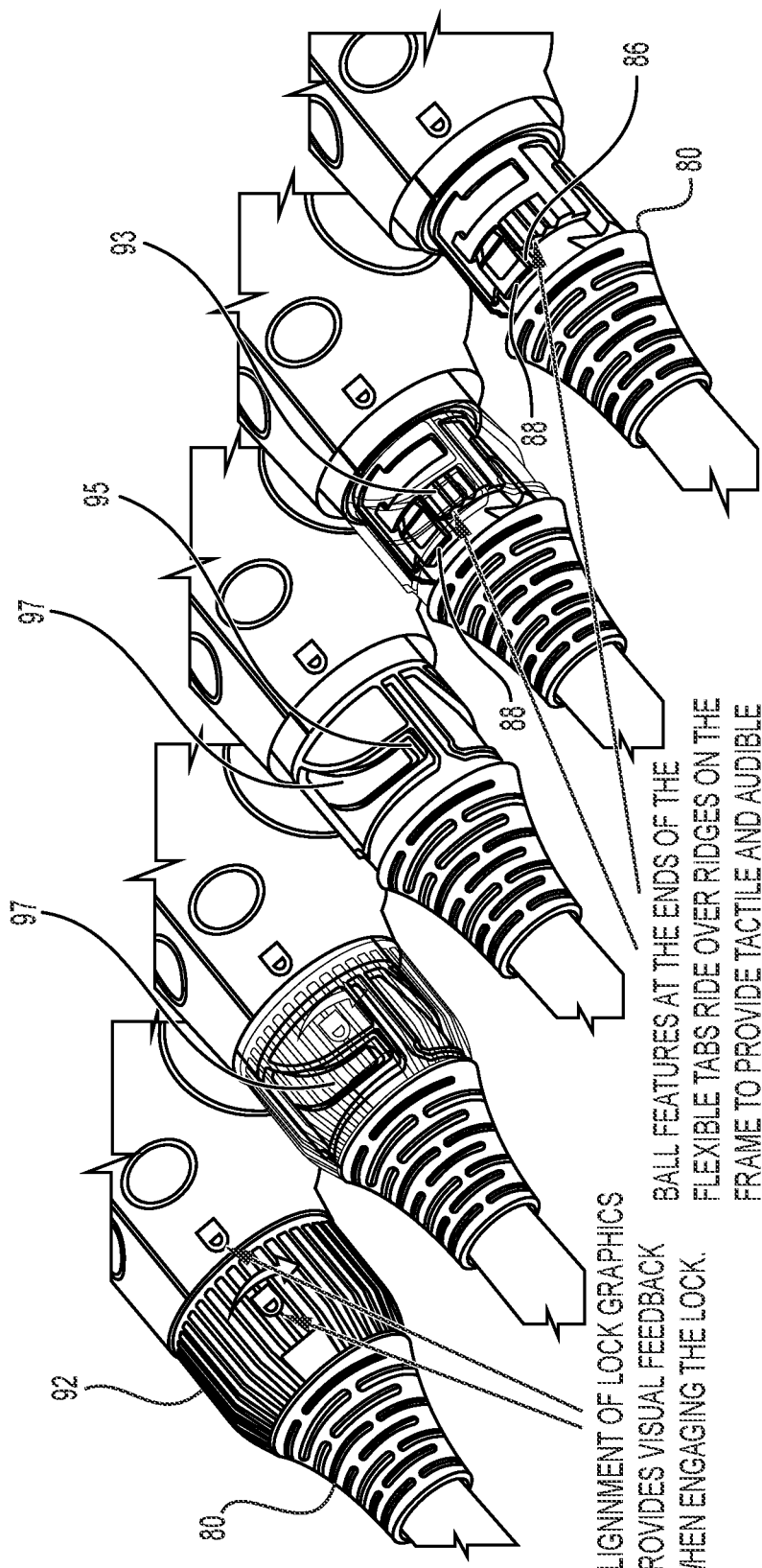
FIG. 3 is an isometric view of a portion of the surgical tool, illustrating removal and replacement of the end effector.
Figure 5B:
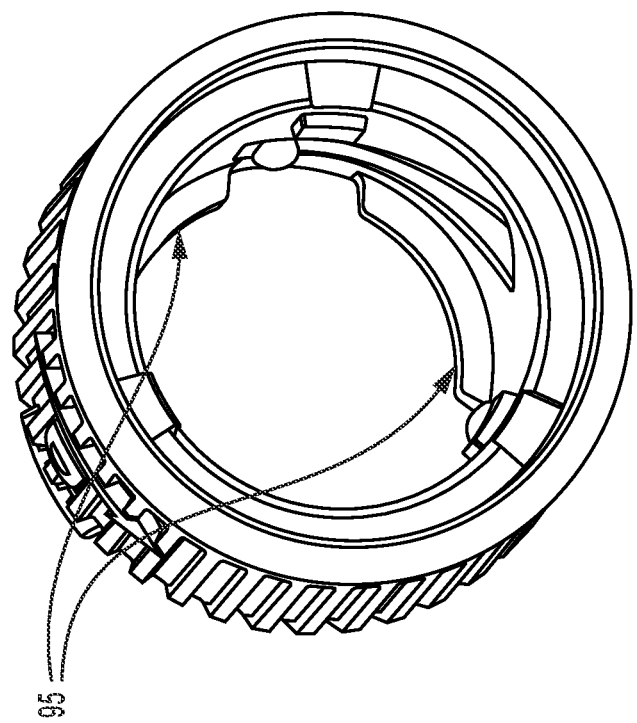
FIG. 5B is an isometric rear view of the cam ring of the motor assembly.
Figure 5A:
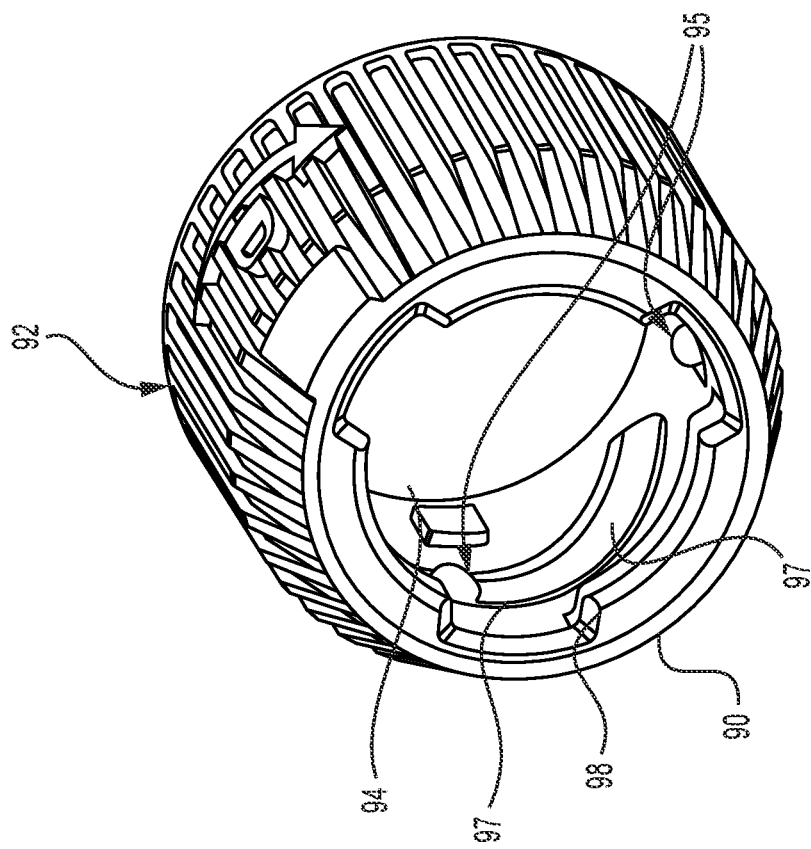
FIG. 5A is an isometric front view of the cam ring of the motor assembly.
Figure 6:
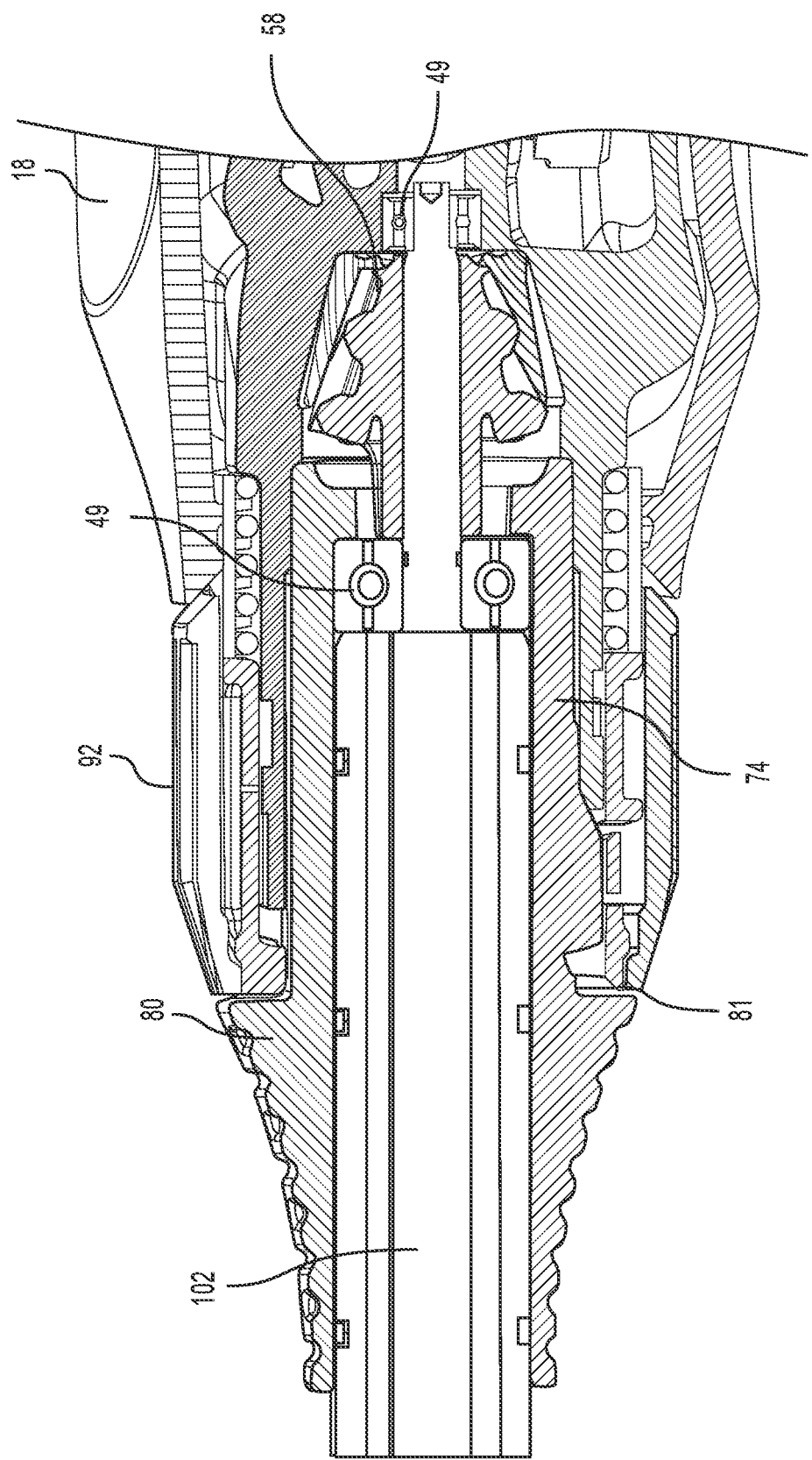
FIG. 6 is a partial section view taken along lines 6-6 of FIG. 1, illustrating the connection between the motor assembly and the end effector.

Referring generally to the figures, and more particularly to FIGS. 1-24, the reference numeral 10 designates generally a power operated surgical tool having an external housing 18 adapted to enclose and support various internal components, such as a motor 20 operably connected to a transmission, designated generally 22, which operably couples the motor 20 to a transmission 22 that carries a tool coupler 16. In a preferred embodiment, the motor 20 is an electric motor that is operably coupled to a power source, as for example by an electrical power cord 26. It should be noted that while electrical power is preferred, pressurized or vacuum fluids such as air, oil or the like may be utilized to provide rotational motion to the motor without departing from the scope of the invention. The housing 18 can be provided with a depending handle (not shown) for gripping by a surgeon for control of the surgical tool 10. The housing 18 can be formed of a polymeric (often referred to as plastic) material and can be formed by molding. Preferably, the housing 18 is formed by combining two halves that are suitably secured together by fasteners, glue, welding, spring fasteners or the like, as well as suitable combinations thereof. Various controls accessible by the surgeon are provided for selecting operation modes of the surgical tool 10 and can include an on power switch 28 and an off power switch 30.

As shown in the embodiment of FIG. 1, the surgical tool 10 operate at high cutting speeds for cutting efficiency and control by a surgeon. Oscillations (starting from a center, 1 oscillation is equal to movement of the gear to the right, back to center, to the left and back to the center) are on the order of at least about 5,000 oscillations per minute (5,000 revolutions per minute for the motor 20) and may be as high as 30,000-50,000 oscillations per minute or more. An oscillation is movement of the tissue modification device, such as a cutter, from one rotational position extreme to its other rotational extreme and then back to the original extreme position. Preferably, 5,000 opm (oscillation per minute) and 50,000 opm. More preferably, the oscillation speed is between 15,000 opm and 30,000 opm. Such oscillation speed provides optimal bone cutting and disc removal rate, and optimal tactile feedback without creating component fatigue and high vibration noise. Since there is a 1:1 ratio between rpm of the motor 20 and the opm, the optimal motor speed in terms of rpm will be the same as that for the oscillating gear in terms of opm.

Still referring generally to the figures, and more specifically to FIGS. 6-21, the oscillating rotation drive mechanism 35 is described below. The oscillating rotation drive mechanism 35 is coupled to the shaft 37 of the motor 20, as with a crank assembly hub 39 suitably mounted to the shaft 37, as with a set screw 41 or the like. The oscillating rotation drive mechanism 35 also includes a link 43 that revolves about the shaft 37 and is attached to a rotatably mounted shuttle 45. The link 43 is preferably positioned within a hub bore 66 in the crank assembly hub 39 at a swing angle 50 (FIG. 7) with respect to the motor shaft 37. In this manner, the distal end 46 of the link 43 rotates around the motor shaft 37, while the pivot axis 48 at the front portion of the link 43 is positioned to extend through a neutral point 32. The neutral point 32 is a point in the oscillating drive mechanism about which the shuttle 45 and the link 43 rotate while the neutral point 32, thus the front portion 42 of the link 43, preferably has no linear translation. Thus, the relationship of the swing angle 50 can be varied to provide different angular rotation of the shuttle 45 and the gear segment 56. In this manner, a larger swing angle 50 provides more rotation of the shuttle 45 around the neutral point 32, while a smaller swing angle 50 provides less rotation to the shuttle 45 and the gear segment 56. This construction allows the amount of bi-directional oscillation provided to the shuttle 45, and thus the end effector 12 (detachable drill tip assembly), to be altered as desired. In a most preferred embodiment, the rotation of the end effector (rotation angle of its shaft) is 72.65 degrees in each direction about the longitudinal axis 104 of the end effector 12. It has been found that this amount of bi-directional rotation provides suitable hard tissue (bone) removal rates while typically not injuring soft tissues such as nerves, muscle, etc. It should be noted that bi-directional oscillation angles of 40 degrees to 180 degrees in each direction (more preferably between 50 degrees and 90 degrees in each direction, which provides optimal bone cutting while reducing the chance of grabbing tissue) have been utilized with success in removing bone and tissue and are contemplated to be within the scope of the present invention for use in surgical procedures. It should also be noted that while the pivot axis 48 at the front portion 42 of the link 34 is positioned to extend through a neutral point 32, the pivot axis 48 may be positioned spaced apart from the neutral point 32 to provide additional rotational torque to the shuttle 45 without departing from the scope of the invention, so long as the center portion of the link pivot axis 48 is rotated about a point. The shuttle 45 includes the arcuate rack gear segment 56 that, through oscillating rotation of the shuttle, effects reciprocating motion of the pinion gear 58. As shown, the gear ratio of the pinion gear 58 to the arcuate rack gear segment 56 is 3.125. Thus, if the optimal oscillation of the pinion gear 58 is 72.65 degrees, the sweep angle of the shuttle 45 is +/−23.25 degrees. The swing angle 50 and sweep angle could be changed to set the oscillation angle of the pinion gear 58 to be in the optimal oscillation range (e.g., 40 degrees-180 degrees, or 50 degrees and 90 degrees).

Figure 7:
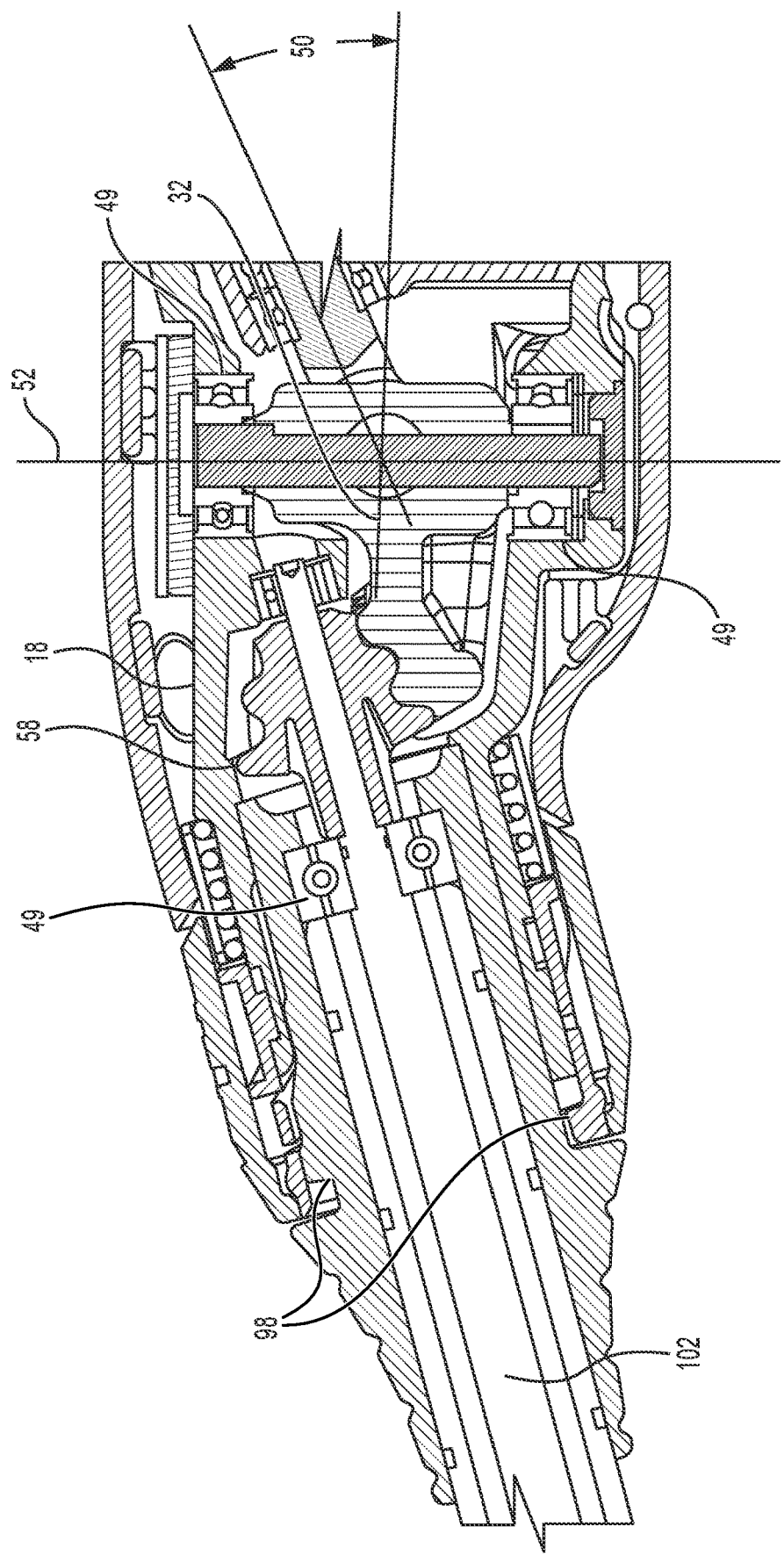
FIG. 7 is a partial section view taken along lines 6-6 of FIG. 1, illustrating the connection between the motor assembly and the end effector.
Figure 8:
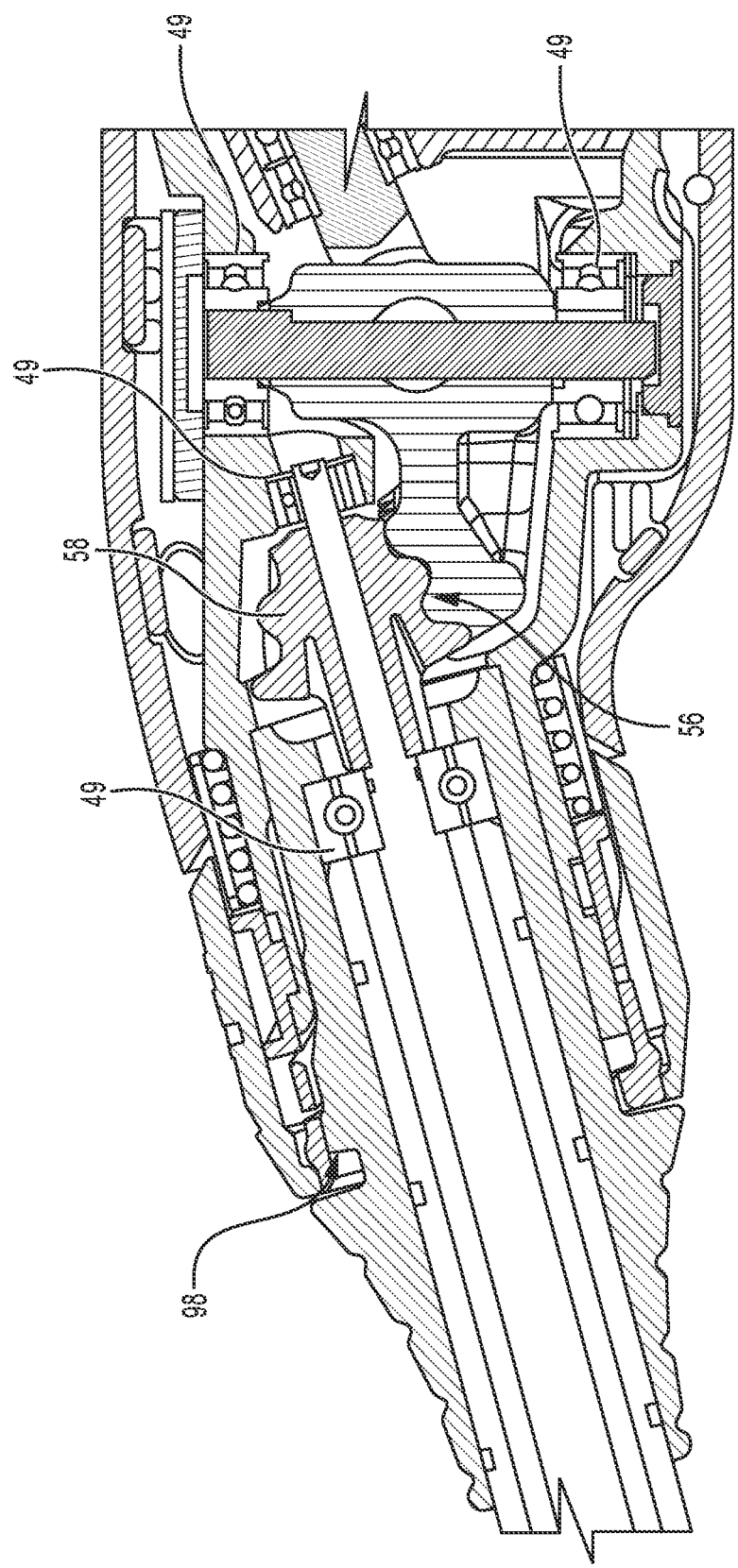
FIG. 8 is a partial section view taken along lines 6-6 of FIG. 1, illustrating the connection between the motor assembly and the end effector.

As shown, the shuttle 45 is rotatably mounted in the housing 18 via a shaft 46 secured to the shuttle 45, as on bearings 49 that are mounted in the housing, see FIG. 7. While ball bearings 49 are shown, any suitable bearing(s) can be used, such as a sleeve bearing(s) or needle bearing(s). The link 43 is attached to the shuttle 45 as by being rotationally mounted to bearings 54 mounted in the shuttle 45 as with fasteners 54, such as nuts 60 or bolts 62. Rotation of the rotor of the motor 20 thereby effects oscillating movement of the pinion gear 58 about the end effector shaft 64. The link 43 is preferably attached to the shuttle 45 as by having one and more, preferably a pair of, spaced apart arms 67 each having a bearing 49 secured therein with a bolt 62 that is received within the bearings 69 and threadably secured to the shuttle 45 via a threaded bore 68.

FIGS. 6-21 illustrate further details of the transmission 22, which is operable to effect the oscillating rotational driving of the end effector shaft 64 at high speeds, such as 10,000 orbits per minute or higher. The transmission 22 is constructed to selectively convert rotation of the shaft 37 of the motor 20 rotor 70 into oscillating rotation of the end effector shaft 64 for tissue modification, as with a cutting tool 100. A pinion gear 58, such as a bevel gear or helical bevel gear 59, meshes with a gear segment 56 or helical gear segment 57, whereby oscillating motion of the gear segment 56, 57, induced by rotation of the hub 39, induces the oscillating motion to an end effector shaft 64 that is rotatably mounted in an end effector housing 72, as with bearings 49 (see FIGS. 14 and 22). The pinion gear, as well as the gear segment, are preferably constructed from a material that provides quiet running and high wear. In a most preferred embodiment, the gears are constructed from a polymeric material, such as a Polyether ether ketone (PEEK) or other members of the polyaryletherketone family of high-performance polymers. The polymer may be compression or injection molded and may include fibers or fillers which add additional wear, strength or lubricity properties to the gears. It should also be noted that metals or combinations of metal and polymers could be utilized for the gears without departing from the scope of the invention. It is noted here that the motor 20 can be an electric motor or a compressed or vacuum air operated motor, with an electric motor being preferred. The motor 20 is operably connected to a source of electricity via a power cord 26, with the switches 28 and 30 being operable to selectively effect operation of the motor 15.

Although the shaft 102 is shown to be at an angle to the motor's longitudinal axis, it is possible and in some cases desirable to have a shaft that is aligned or parallel with the motor's longitudinal axis.

The use of a helical gear (non-straight) in the pinion gear 58 and gear segment 56 is especially important in a high speed drill because they substantially reduce vibration and increase strength of the gears by engaging more teeth in the gear meshing areas by 30 percent or more. Because of the extra strength provided by the helical gears, the pinion gear 58 of the disposable drill tip assembly 12 can use a lower inertia material such as PEEK (molded PEEK material), rather than high inertia material such as steel.

Figure 9:
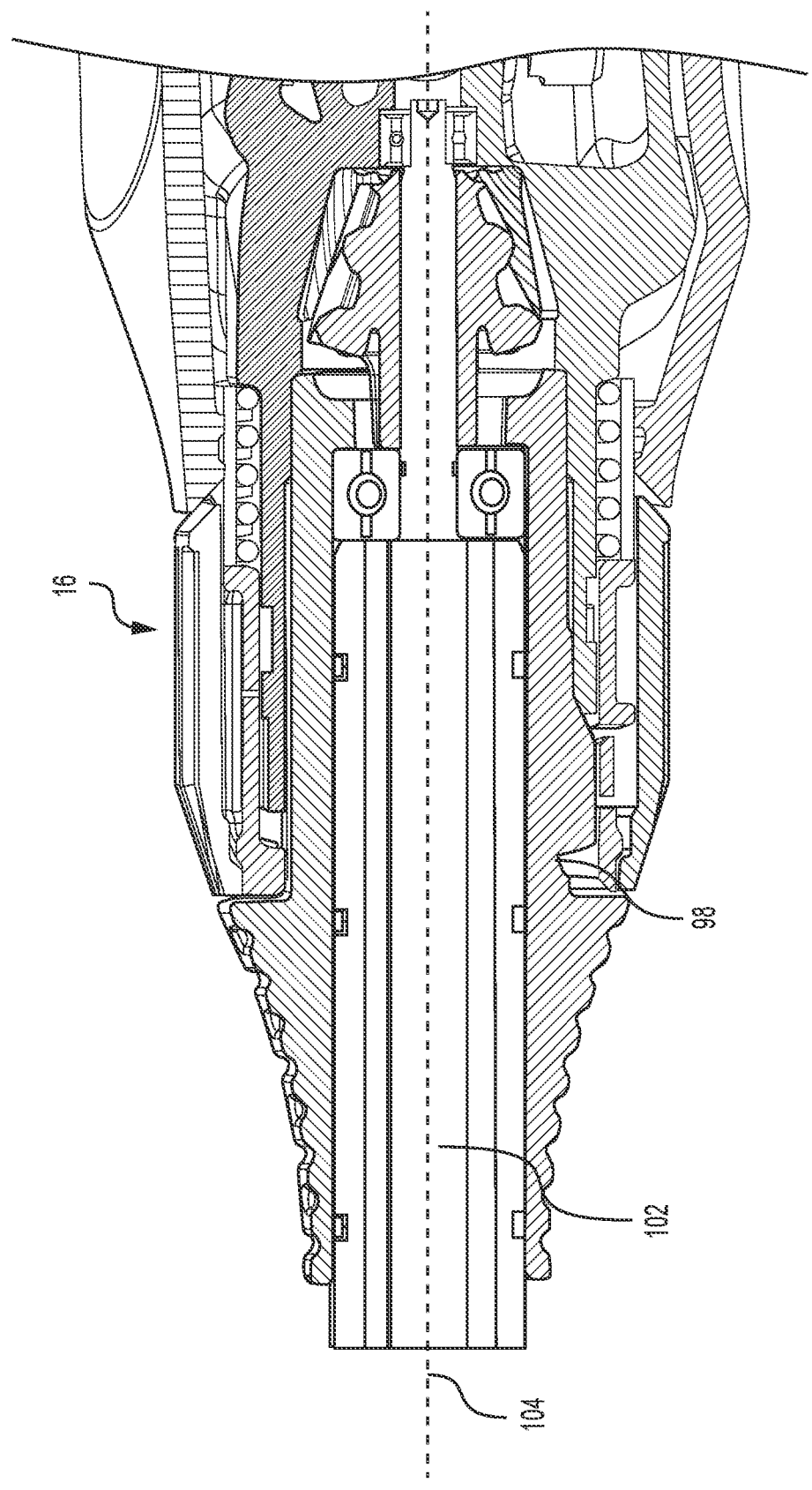
FIG. 9 is a partial section view taken along lines 6-6 of FIG. 1, illustrating the connection between the motor assembly and the end effector.
Figure 10:
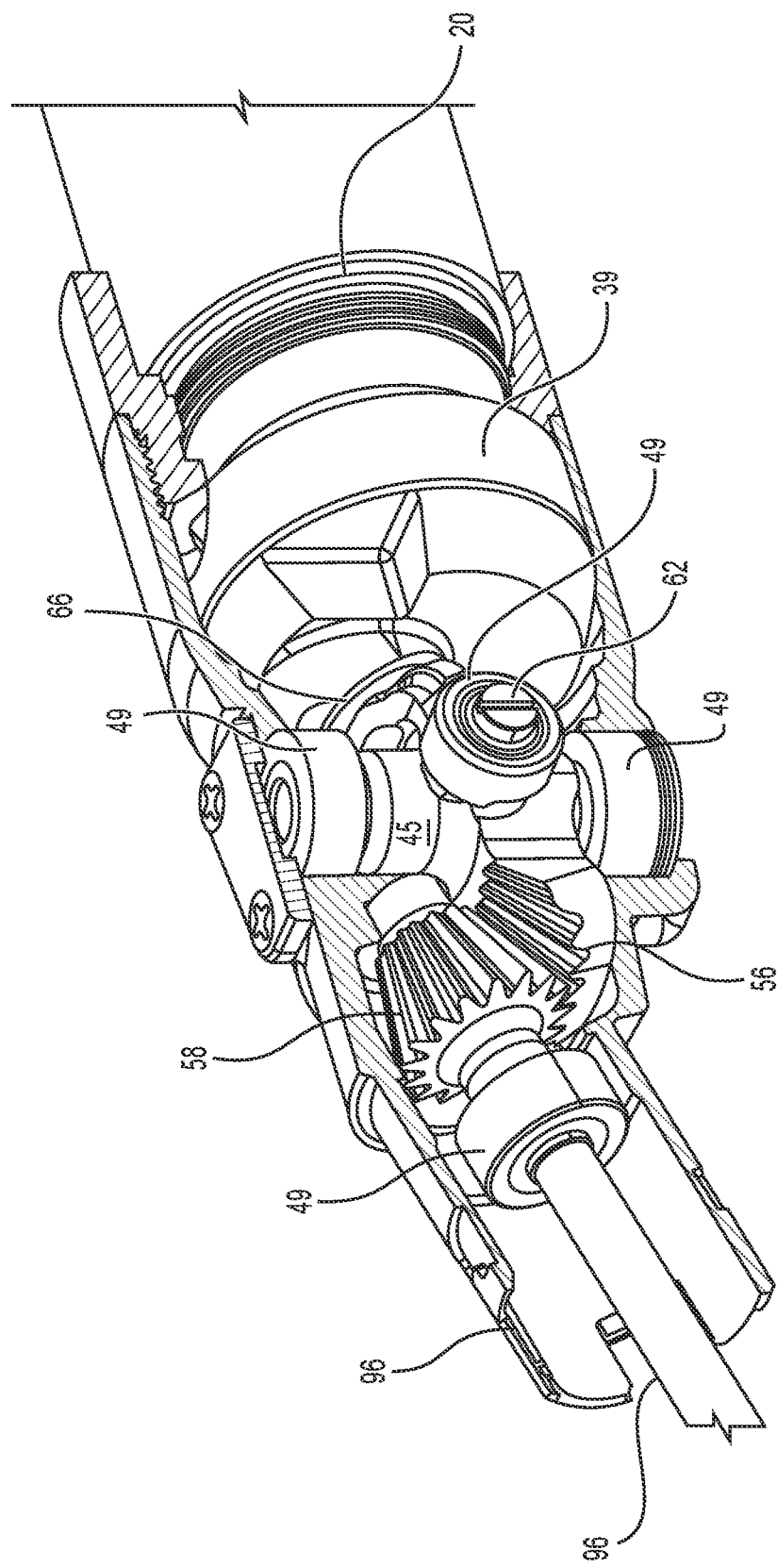
FIG. 10 is a partial isometric view, illustrating one embodiment of an assembly to convert constant rotational motion to rotational oscillation motion.
Figure 11:
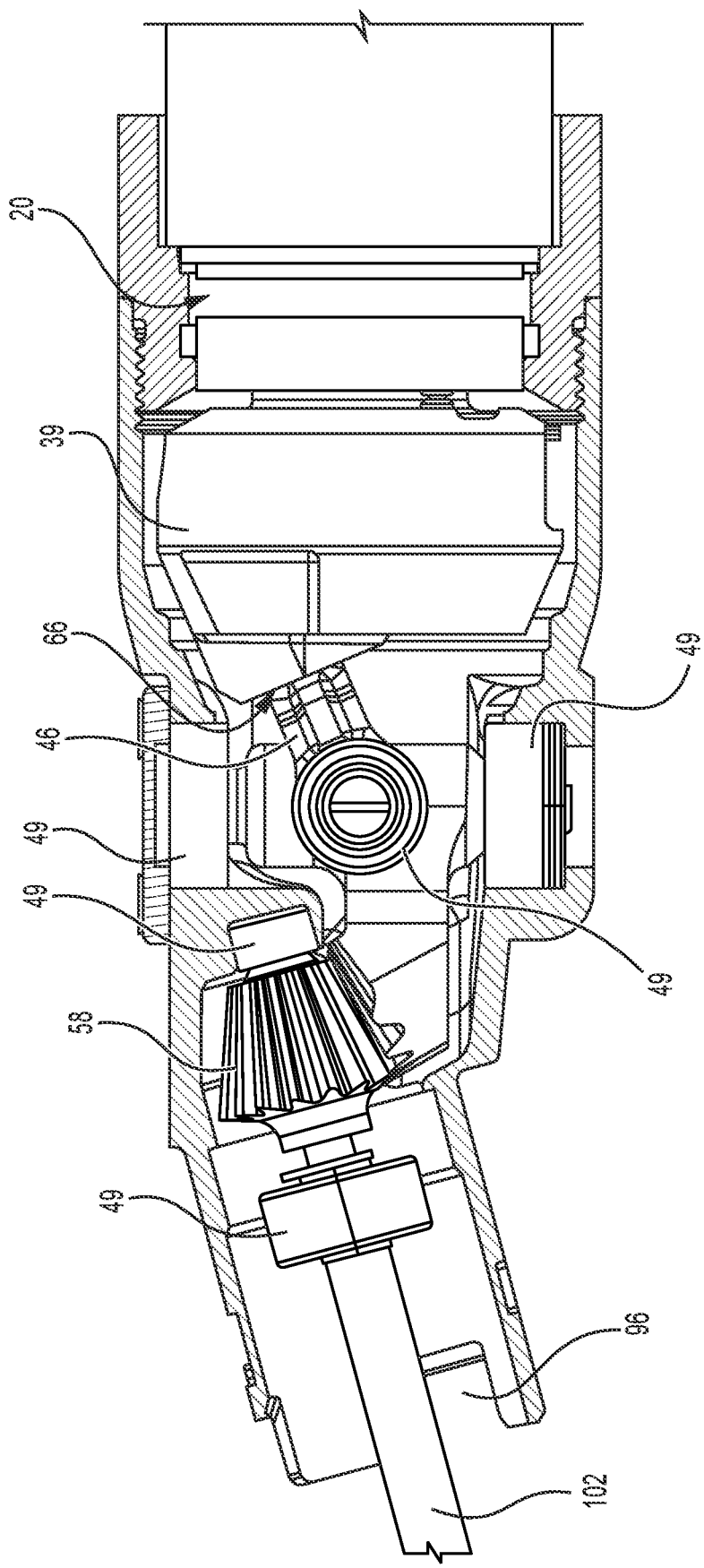
FIG. 11 is a side section view, illustrating the oscillating motion assembly used to convert constant rotational motion to rotational oscillation motion of FIG. 10.
Figure 12:
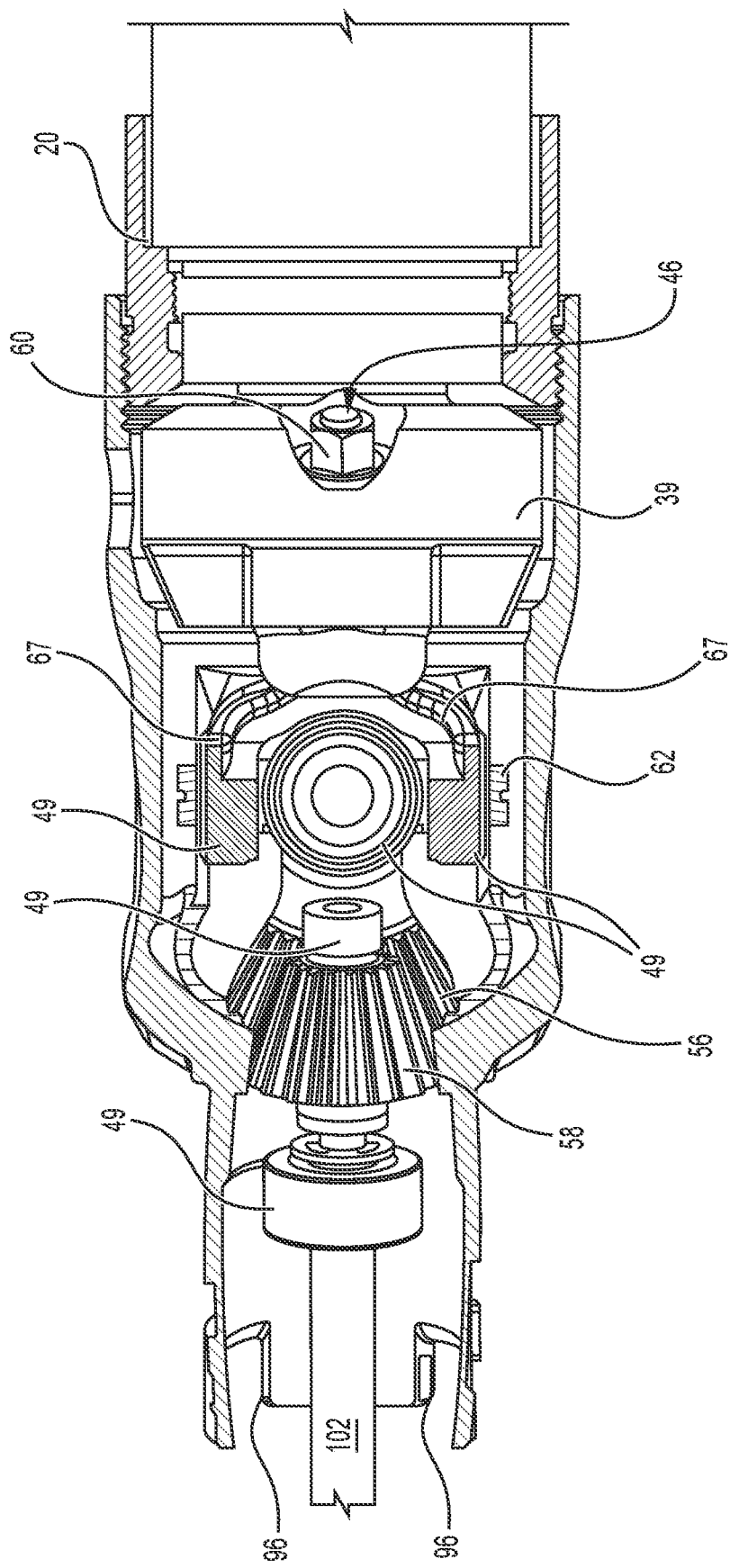
FIG. 12 is a top section view, taken along lines 12-12 of FIG. 1, illustrating the oscillating motion assembly.
Figure 13:
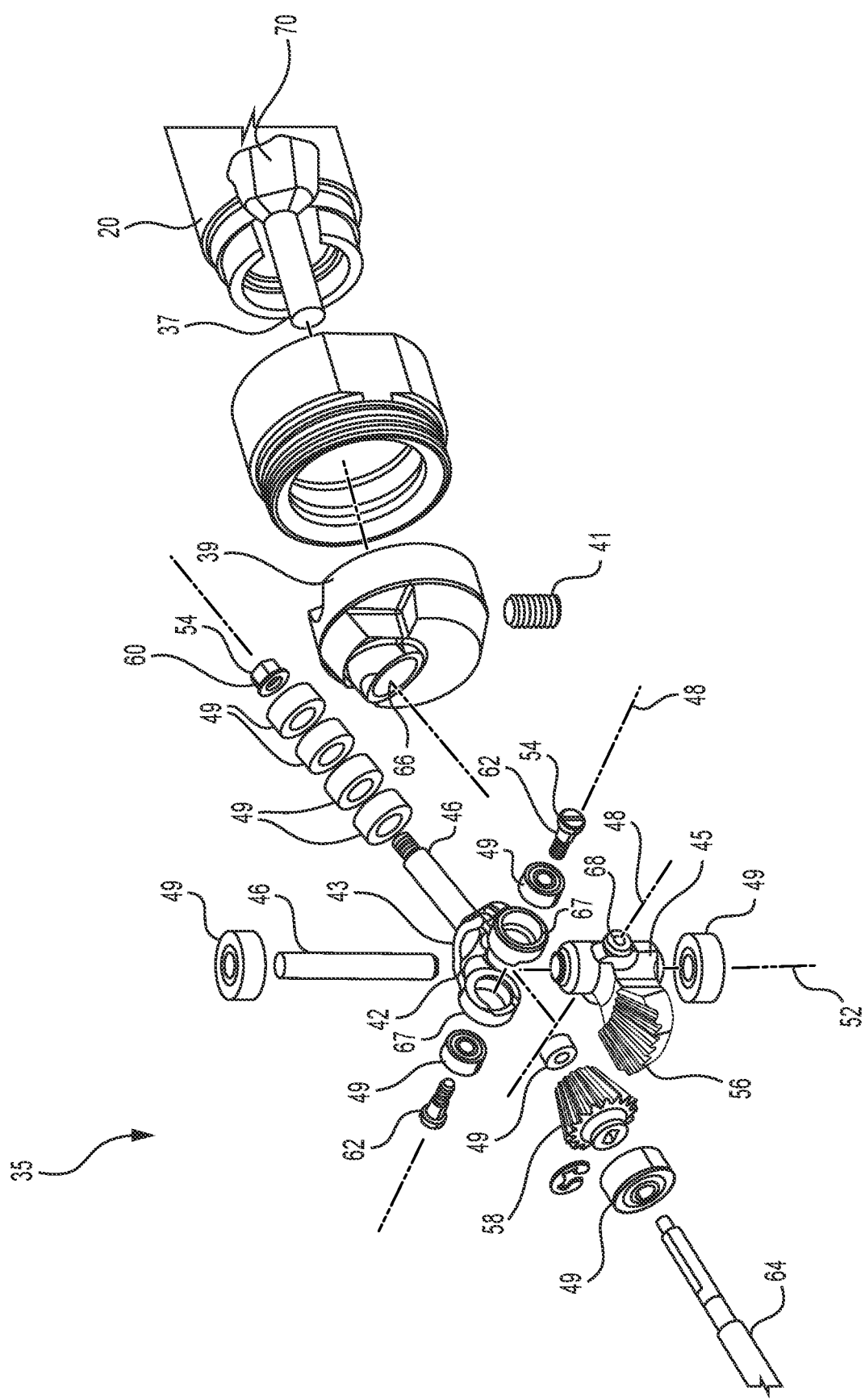
FIG. 13 is a partial exploded view illustrating one embodiment of the oscillating motion assembly.
Figure 14:
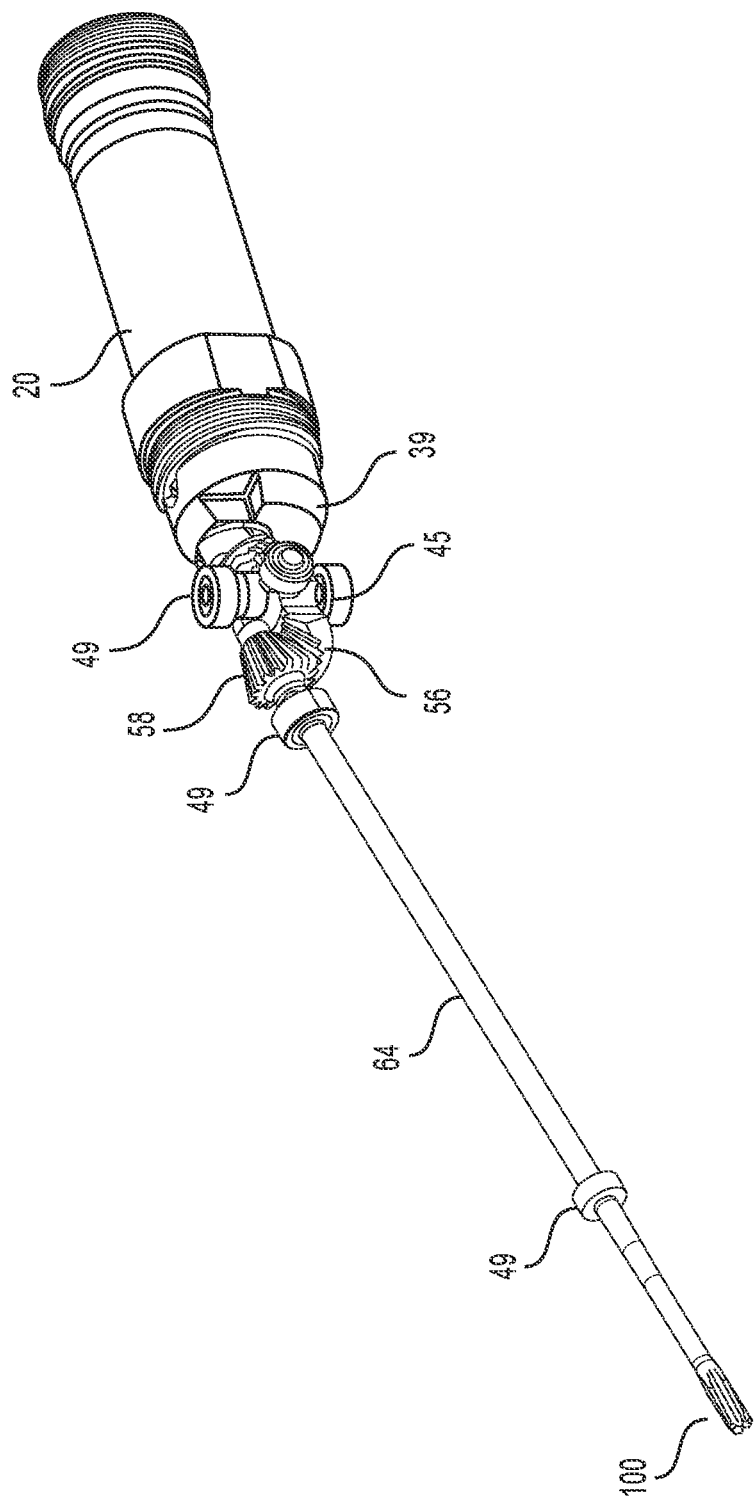
FIG. 14 is an isometric view illustrated with a portion of the shroud removed, illustrating the motor assembly, the oscillating motion assembly, and the end effector.
Figure 15:
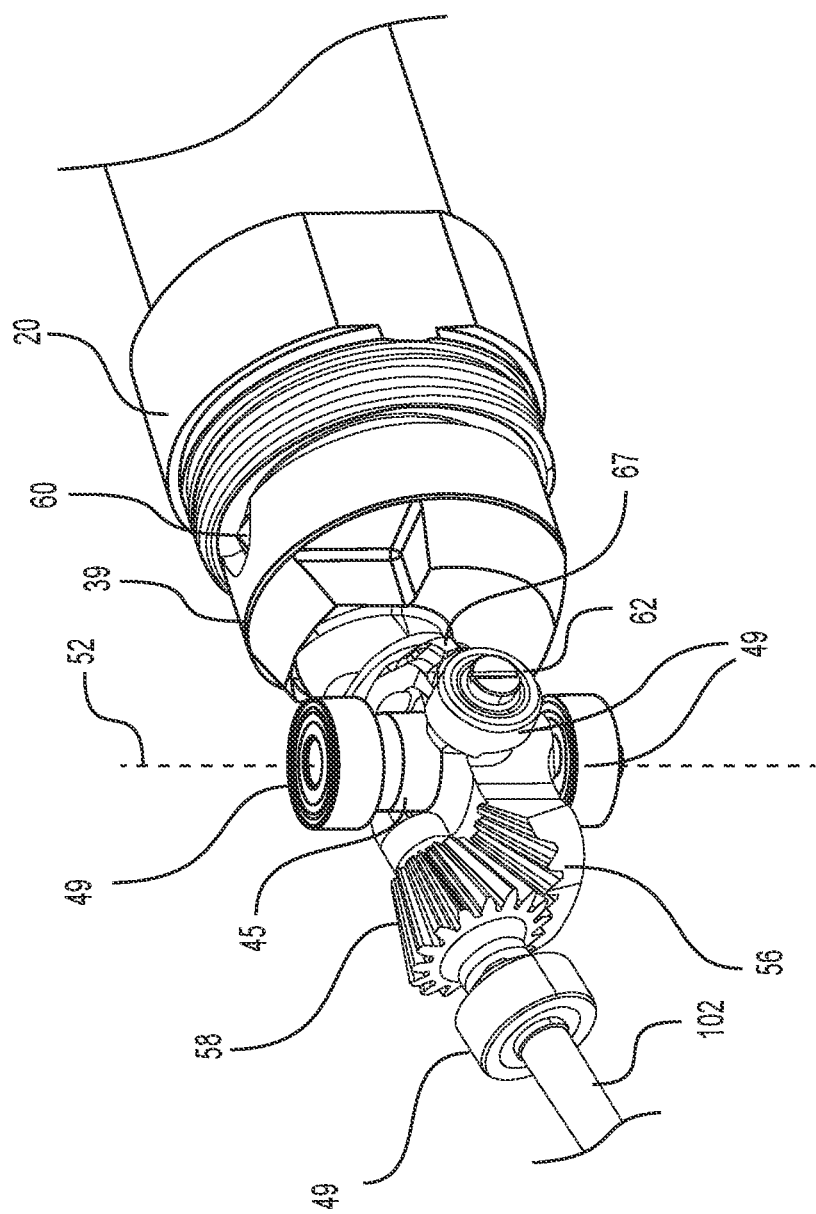
FIG. 15 is a partial isometric view of one embodiment of the oscillating motion assembly connected to the motor assembly and the end effector.
Figure 16:
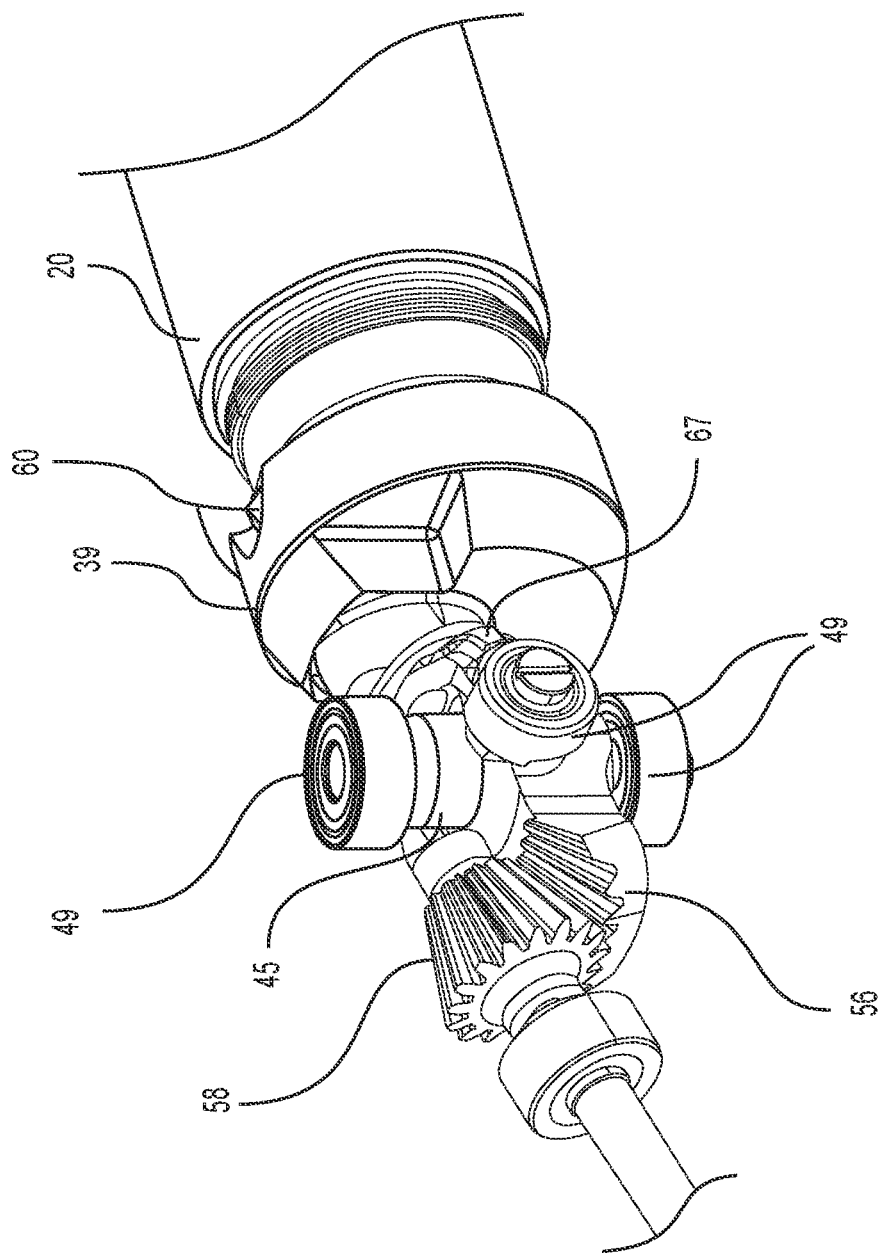
FIG. 16 is a partial isometric view of one embodiment of the oscillating motion assembly connected to the motor assembly and the end effector.
Figure 17:
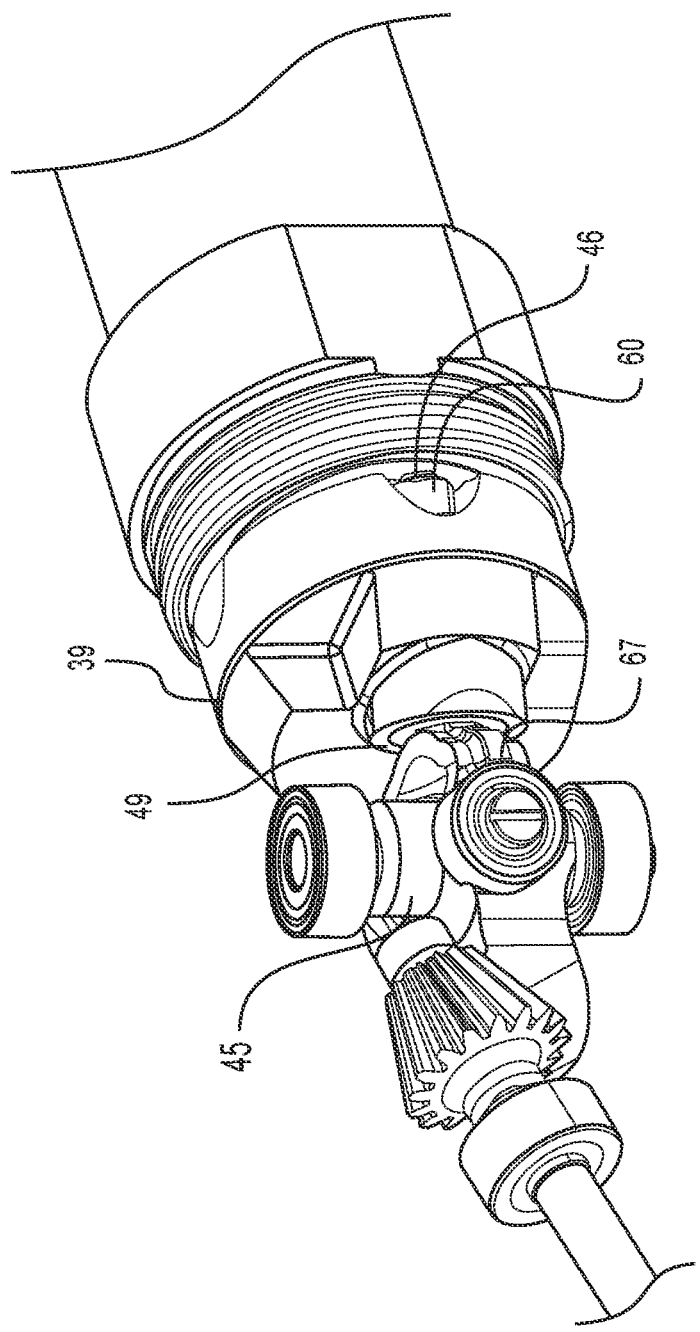
FIG. 17 is a partial isometric view of one embodiment of the oscillating motion assembly, illustrating one position of the oscillating motion assembly where motion is imparted to the end effector.
Figure 18:
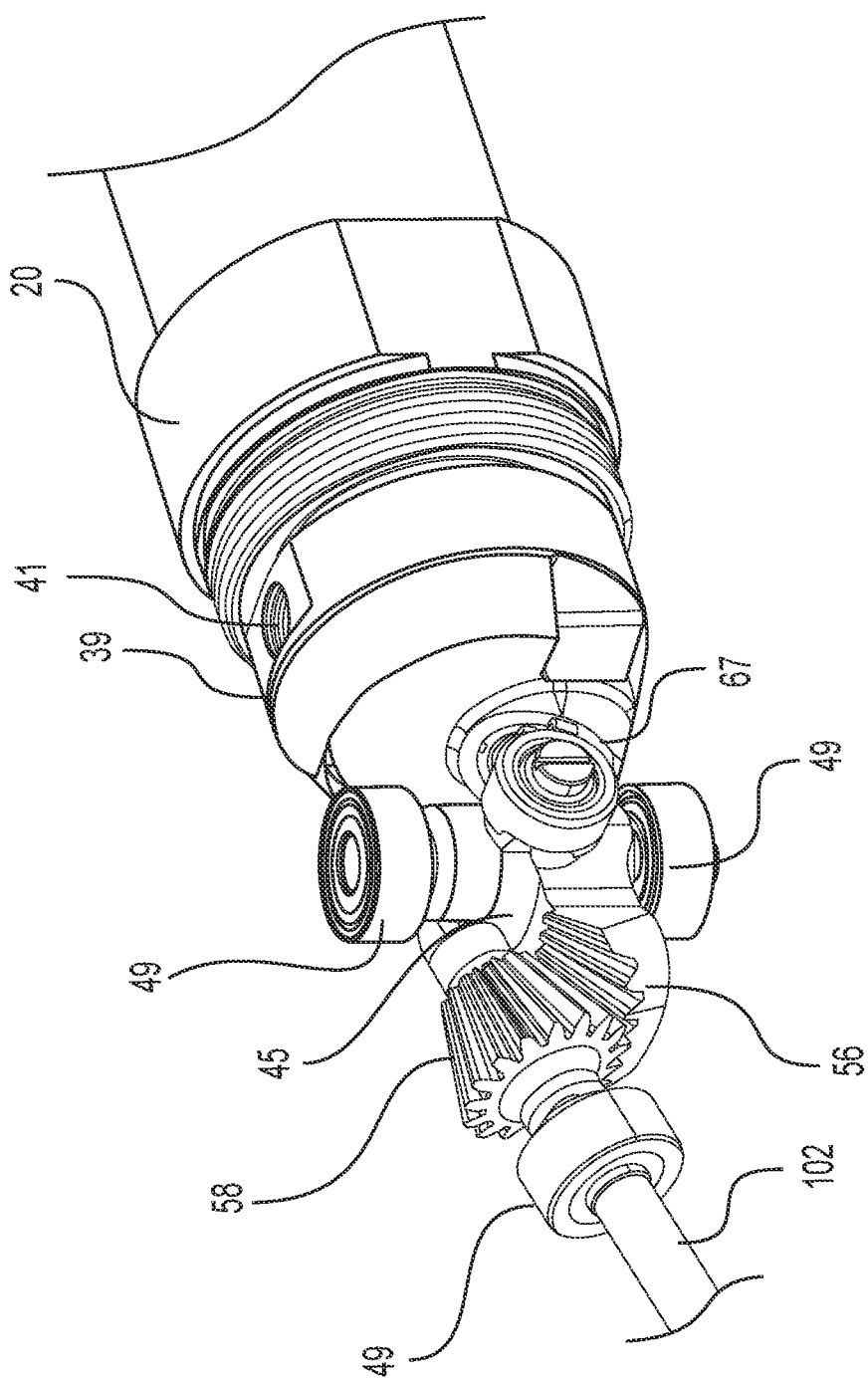
FIG. 18 is a partial isometric view of one embodiment of the oscillating motion assembly, illustrating one position of the oscillating motion assembly where motion is not imparted to the end effector.
Figure 19:
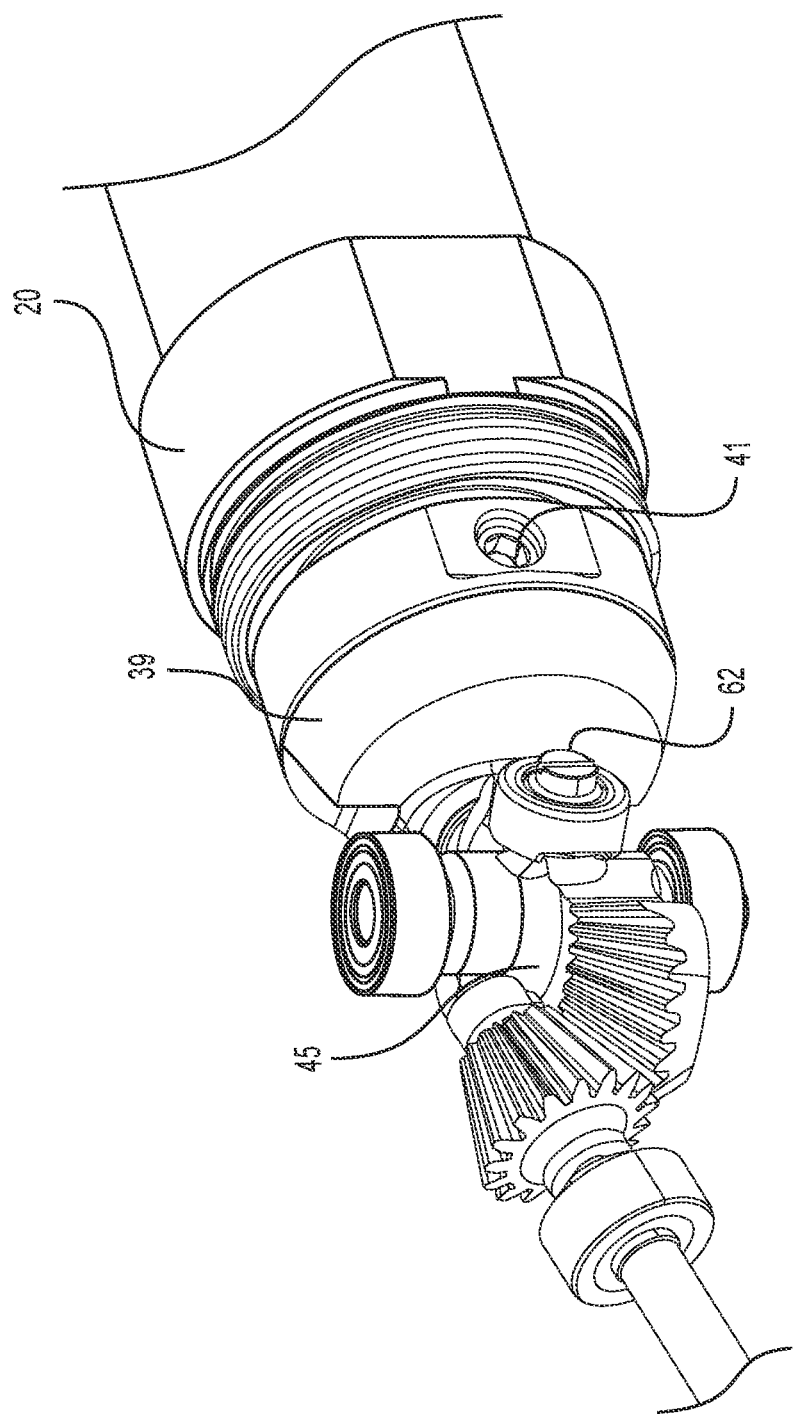
FIG. 19 is a partial isometric view of one embodiment of the oscillating motion assembly, illustrating one position of the oscillating motion assembly where motion is imparted to the end effector.
Figure 20:
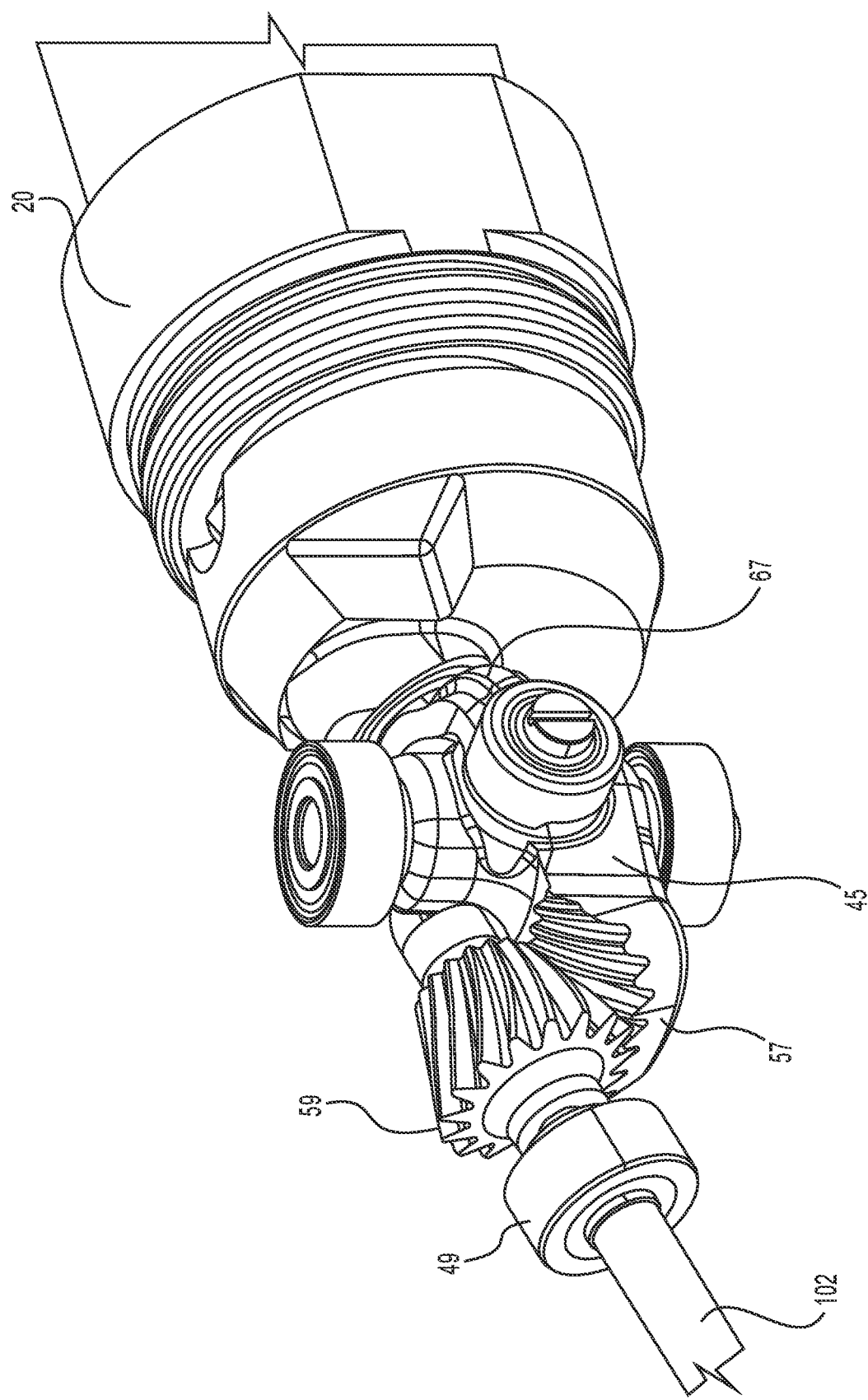
FIG. 20 is a partial isometric view of one embodiment of the oscillating motion assembly, illustrating one position of the oscillating motion assembly where motion is not imparted to the end effector.
Figure 21:
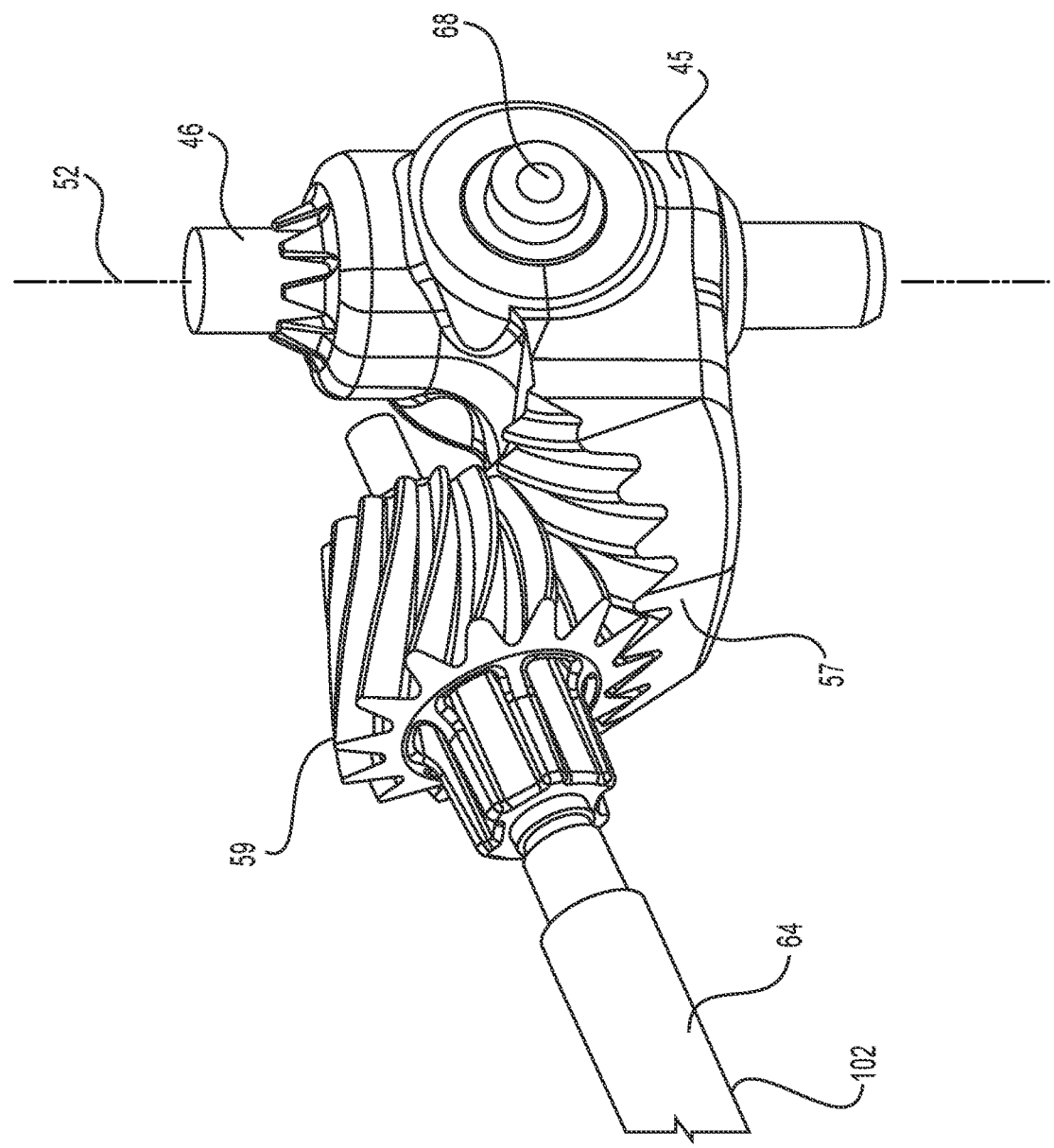
FIG. 21 is a partial isometric view of one embodiment of the oscillating motion assembly, illustrating the use of helical gears.
Figure 22:
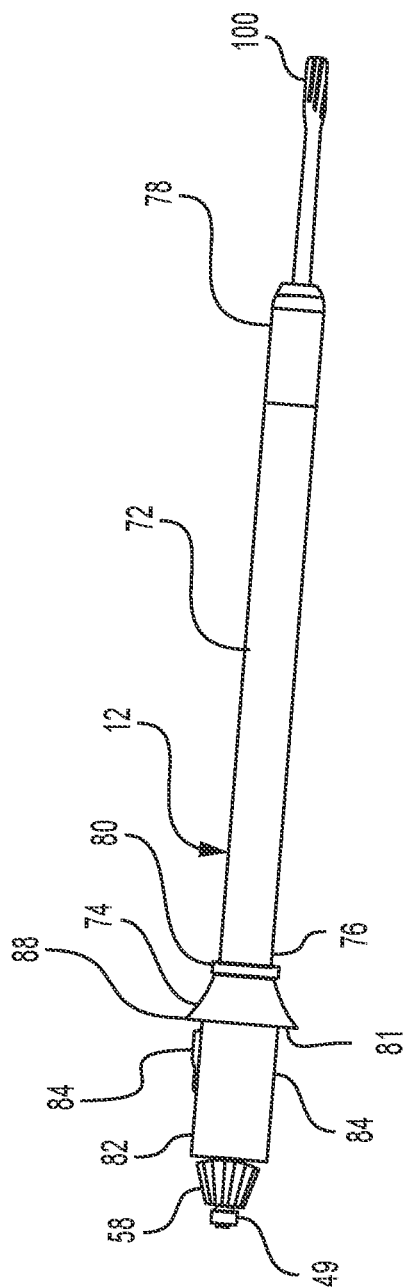
FIG. 22 is an isometric side view of one embodiment of an end effector.
Figure 23:
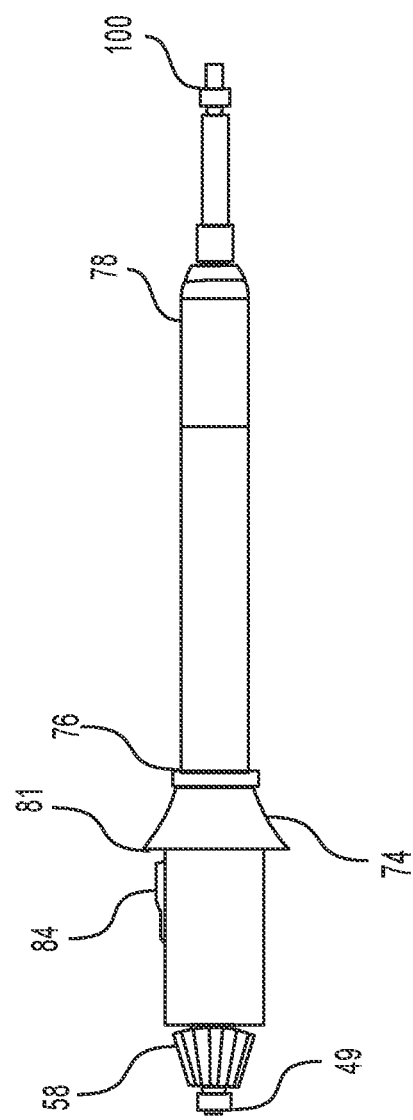
FIG. 23 is a side view of one embodiment of an end effector.
Figure 25:
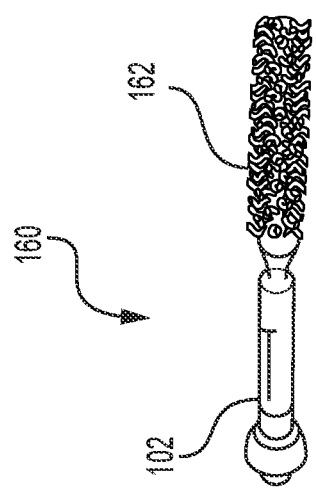
FIG. 25 is an isometric view of a tissue modification cutting tool for the end effector.

Referring generally to the figures, and more specifically to FIGS. 1-12, 14, 22-24, the end effector 12 and its connection to the motor 14 and transmission assembly 22 is illustrated. Generally, the end effector 12 is removably connected to the external housing 18 and includes the pinion gear 58 portion of the transmission assembly 22 and a cutting tool 100. In this manner, portions of the device that cannot be cleaned in an autoclave, as well as high wear pieces, e.g., pinion gear 58 and cutting tool 100, can be replaced for each procedure. This construction also allows the surgeon to change from one type of end effector to another type easily should the need arise during a procedure. FIG. 9 shows the distal end portion of the output shaft 19. It includes the tool coupler 16 assembly that is operable for removably mounting different end effectors 12 to the motor shaft 37 and preventing relative rotation between the end effectors 12 and the output shaft 19 during operation. As shown, an end effector 12 is operable for removing hard tissue, such as bone, and can be mounted to the motor assembly 14 via the tool coupler 16. The tool coupler assembly 16 includes a ferrule 74 secured to a first end 76 of the end effector housing 72, while the cutting tool 100 extends from the second end 78 of the end effector housing 72. The ferrule 74 includes a flange 80, the flange 80 including a stop surface 81 that cooperates with a front surface 90 of the lock ring 92 to establish the depth that the end effector 12 is allowed to enter into the motor assembly 14. Adjacent the flange 80 is a ferrule shank 82. The shank 82 includes one or more keys 84, with the preferred embodiment including three keys 84. The keys 84 are fixed in position on the ferrule shank 82 and include side key surfaces 86 and a lock surface 88. The lock ring 92 is constructed to rotate in a first direction to allow the ferrule shank 82 to enter into an inner bore 94 of the lock ring 92, allowing the ferrule key(s) 84 to enter and the key side surfaces 86 to engage the docking ports 96 of the external housing 18 to prevent the end effector 12 from rotating relative to the external housing 18. Also, during insertion of the end effector 12, the pinion gear 58 engages with the gear segment 56. To maintain the proper clearance between the gear segment 56 and the pinion gear 58, the lock ring 92 includes one or more cam surfaces 98 which cooperate with the lock surface(s) 88 of the ferrule 74 to pull the stop surface 81 of the ferrule 74 against the front surface 90 of the lock ring 92 to secure the end effector 12 in position. Thus, the end effector 12 is prevented from rotation, as well as in and out movement with respect to the motor assembly 14. This construction maintains the proper positioning and clearance for the high speed operation of the transmission 22 and thus the end effector 12. A spring lock 97 may be provided in the lock ring 92, including a rounded end 95 which cooperates with ridges 93 positioned on an outer surface of the docking ports 96 to provide a tactile feedback when the locking ring 92 is rotated into its locked position. This construction also provides resistance to the lock ring 92 inadvertently rotating to a disengaged position during use of the surgical tool 10. Disengagement and removal of the end effector 12 is accomplished by grasping the lock ring 92 and rotating the lock ring 92 to the disengaged position, where the end effector 12 can be pulled out of the motor assembly 14. In this manner, the same motor assembly 14 can be utilized with a plurality of surgical tools which can be changed as needed by the surgeon.

Referring to FIGS. 26-30, bi-directional cutting tools 100 are illustrated. Referring generally to FIGS. 1-18, a bi-directional (oscillating) cutting tool 100 for cutting bone and tissue is illustrated. The cutting tool 100 includes a shank 102 having a longitudinal axis 104, a first end 108, and a second end 110. The shank 102 has a perimeter surface 106 extending around the longitudinal axis 104 and being symmetrically shaped to allow at least the second end 110 of the perimeter surface 106 to be gripped for rotation about the longitudinal axis 104, as well as being sized for cooperation with bearings 49 to support the rotation of the cutting tool 100. Thus, the longitudinal axis 104 is also a rotational axis. In a preferred embodiment, the second end of the shank 110 is round to cooperate with an inner bore of the pinion gear 58. In at least one embodiment, the second end of the shank 110 includes one or more index keys 112. The index key(s) 112 are constructed and arranged to cooperate with keyways (not shown) or the like positioned within the bore of the pinion gear 58 to assure that the surgical cutting tool 100 oscillates the same speed and arc of rotation as the transmission 22 driving the surgical cutting tool 100. The first end 108 of the shank 102 includes a cutter 114, the cutter 114 including an outside diameter 116; the cutter 114 including two or more flutes 118, each flute 118 extending parallel (FIGS. 28A-28K) or helically (FIGS. 26A-26J, 27A-27L, 29A-29X, 30, 31A-31B and 32A-32C) with respect to the longitudinal axis 104. The flutes 118 extend inward from the outside diameter 116 toward the longitudinal axis 104, forming a recessed flute channel 120; each flute channel 120 having a pair of opposing sidewalls 122, 124 and a cylindrical radius 125 at the base of each flute channel 120. Each sidewall 122, 124 forms a face 126 of a cutting edge 142 extending along the length of each flute channel 120 so that each flute channel 120 provides two opposing faces 126 providing cutting edges 142 of a blade 132, allowing the cutter 114 to cut in both directions when rotationally oscillated around the longitudinal axis 104. In a most preferred embodiment, the flute channels 120, and thus the blades 132, are helically positioned along the shank 102, e.g., helix angle 144, as it allows the face 126 to engage the bone at an angle to reduce cutting loads. While the preferred helix angle is between four degrees and ten degrees, five degrees is used in the embodiment as shown. It should also be noted that high helix angles 144 facilitate two or more cutting faces 126 simultaneously contacting the bone at the same time, reducing vibration and increasing removal rates. To enhance the cutting action and reduce pressure on the cutter 114, each face 126 includes a rake angle 128, the rake angle 128 being convergent with respect to a center plane 130 extending through said longitudinal/rotational axis 104 when the blade 132 is centered with respect to the center plane 130. A rake angle 128 is also provided between each face 126 extending from the outermost surface of the blade 132. Thus, each cutting edge preferably includes a positive rake angle which lowers the load on the cutting edge when cutting hard material such as bone. The flutes 118 separate the blades 132 which include the cutting edges 142, each blade 132 preferably includes a top corner radius 134, said top corner radius 134 extending inwardly from said outside diameter 116 towards said axis of rotation 104 so that the convergence of the face 126 and the top corner radius 134 provides the outermost diameter of the cutter 114. In at least some embodiments, the top corner radius 134 is structured to provide relief behind the face 126 as the cutter 114 is oscillated. The top corner radius 134 preferably terminates in a sharp corner 136 in closer proximity to the axis of rotation 104 so that the sharp corners are spaced apart. Between the spaced apart sharp corners 136 is a central point 138 which is a very sharp point.

The top corner radii 134 of the all four blades 132 define a central recessed area around the central point 138. The central point 138 is constructed and arranged at the center point from which a plurality of facets 140 converge. The flutes 118 also converge toward the plurality of facets 140. The convergence of the facets 140 create sharp edges that function to grind and pulverize bone while the top corner radii 134 cut the bone around the center point 138 and the flutes 118 carry the cut and pulverized bone away from the cutting tool 100. An additional advantage of the central point 138 is that the tendency for the cutting tool 100 to walk across the bone surface when the distal end of the cutting tool 100 is touched to the bone is significantly reduced.

In the embodiment of FIGS. 26A-26H, the central point 138 is disposed slightly below (proximal of) the edges 134 of the blades 132. The central point 138 is a zero angular velocity point such that cutting by the top corner radii 134 is not effective and a different cutting mode (e.g., pulverizing method described above) is used.

Transition between sharp corners 136 and 138 defines a concavely curved edge that results in positive pulverizing geometry that defines the central recessed area. This is an important feature because the central recessed area has a very low angular velocity such that normal cutting geometry is not effective. Thus, a pulverizing cutting geometry such as this area and the central point 138 allows the cutting tip 102 to much more effectively plunge into the bone.

In at least some embodiments, the face 126 and top corner radius 134 may include notches or waves (not shown) suitable to break the face 126 into shorter segments, thereby reducing load on the face 126 of the cutter 114. These notches or waves may be aligned or, more preferably, offset with respect to each other to eliminate ribs on the cut surface. The cutter 114 may be formed with an even or an odd number of flutes 118 without departing from the scope of the invention. In general, a cutter 114 with a higher number of flutes 118 and blades 132 will remove material faster than a cutter 114 with fewer flutes 118 and blades 132. The cutter 114 may be formed of the same material and formed integral with the shank 102. Alternatively, the shank 102 and the cutter 114 may be constructed from different materials, and the cutter 114 may be cemented to the shank 102 with silver solder or the like suitable to secure the cutter 114 to the shank 102. In this manner, materials such as high speed steel and/or carbide may be utilized as desired without departing from the scope of the invention. Coatings known in the art, such as but not limited to, titanium nitride, titanium carbonitride, vanadium carbide and the like, having a higher hardness than the base material, may be utilized to extend the useful life of the cutting tool 100. The cutting tool 100 may be made in any desirable diameter suitable for surgical procedures; some of the most desirable diameters are 1.5 millimeters, 2.0 millimeters, 2.4 millimeters, 3 millimeters and 4 millimeters. It should also be noted that the cutting tool 100 may include depth markings 146 to provide a visual indicator to those using the tool. The depth markings 146 may be colored to provide a clearer indication.

Figure 33:
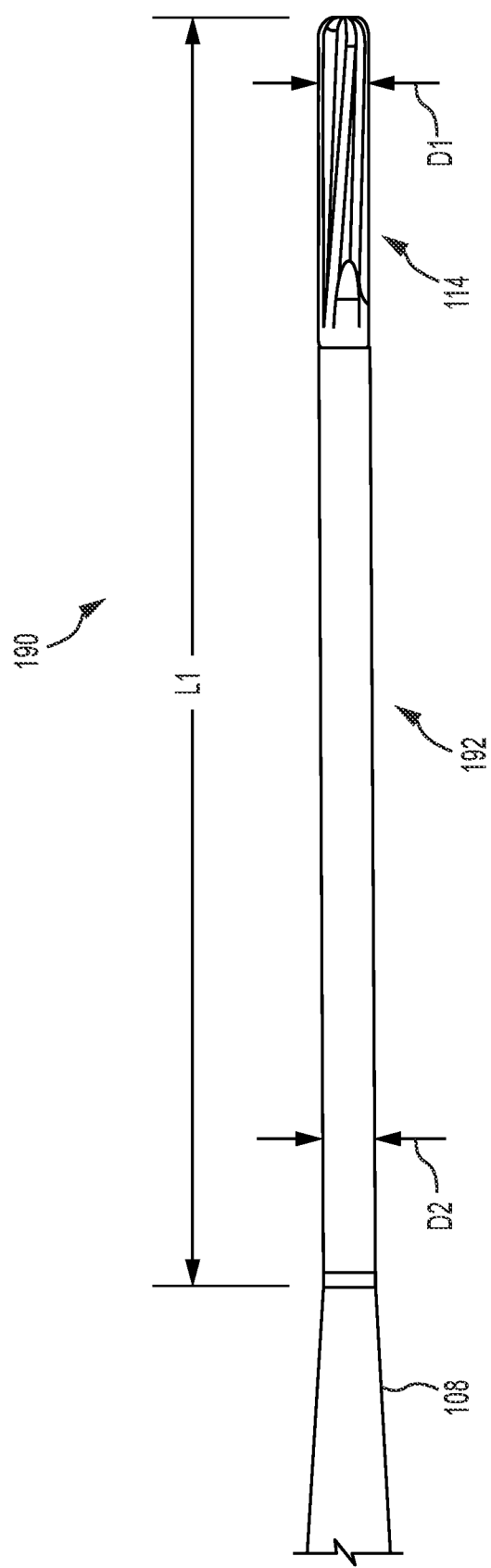
FIG. 33 is a side view of an alternative embodiment of a cutting tool having a very long neck relative to its diameter for increased haptic feedback during a transition between tissue of different density such as from cancellous bone to cortical bone.

In at least some embodiments, the cutting tool 100 includes an intentionally undersized shank 102 to provide a tactile feedback to the surgeon should the surgeon place a large load on the cutter 100. As shown in FIG. 33, the cutting tool 100 includes a cutter 190 including a neck portion 192 having a constant diameter followed by the cutter 114. The cutter 190 extends distally from the first end 108 of the shank 102 and is made of stainless steel although other shafts can be used. In this embodiment, the neck portion has a diameter D2 and cutter 114 has a diameter D1. As an example, D1 is 2-4 mm and D2 is 2 mm and L1 as shown is approximately 50 mm. The first end 108 extends slightly distally of the second end 78 of the end effector housing 72.

Because of the small diameter of the neck portion 192, the cutter 190 provides a vibration when the load is too high on the cutter 100, especially when the tip of the cutter 114 transitions from one area to another of different density (e.g., from cancellous bone to cortical bone). The neck portion 192 may include a length of between about 30 and 120 millimeters. In this manner, when different types of bone are encountered or when the load is too high on the cutter 100, a vibration is induced into the neck portion 192 to provide a tactile feedback to the surgeon. It should be noted the length of the neck portion and the diameter may be altered to accomplish the same function without departing from the scope of the invention.

In the cutter 190, the ratio of L1 to D2 is important. Preferably, the ratio is between 15 to 60, inclusive, with the minimum L1 being 30 mm and maximum L1 being 120 mm.

More preferably, the ratio is between 25 and 35, inclusive, which provides sufficient tactile feedback without being too flexible which results in wobbling of the cutter 190.

Figure 28K:
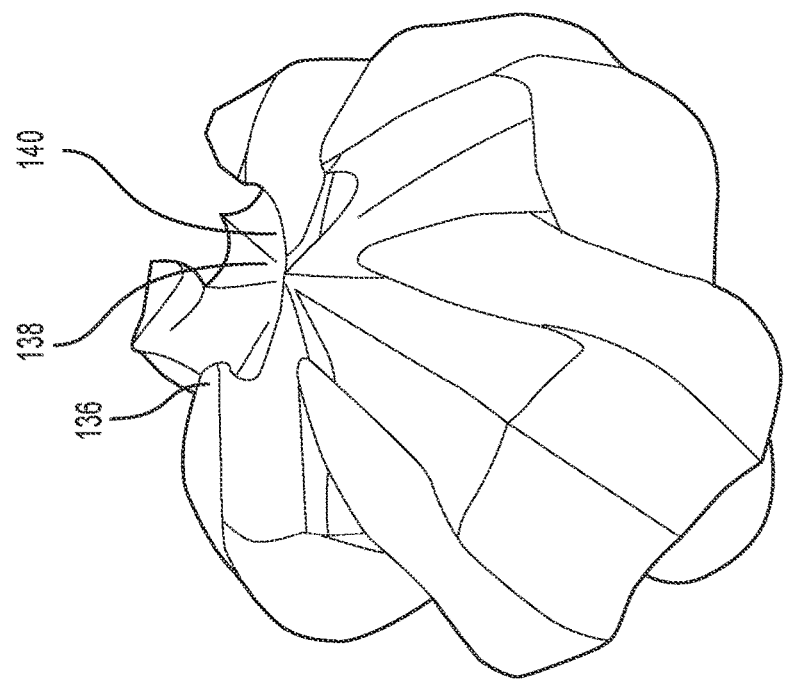
FIG. 28K is a partial isometric side view of the ball nose cutting tool.
Figure 28L:
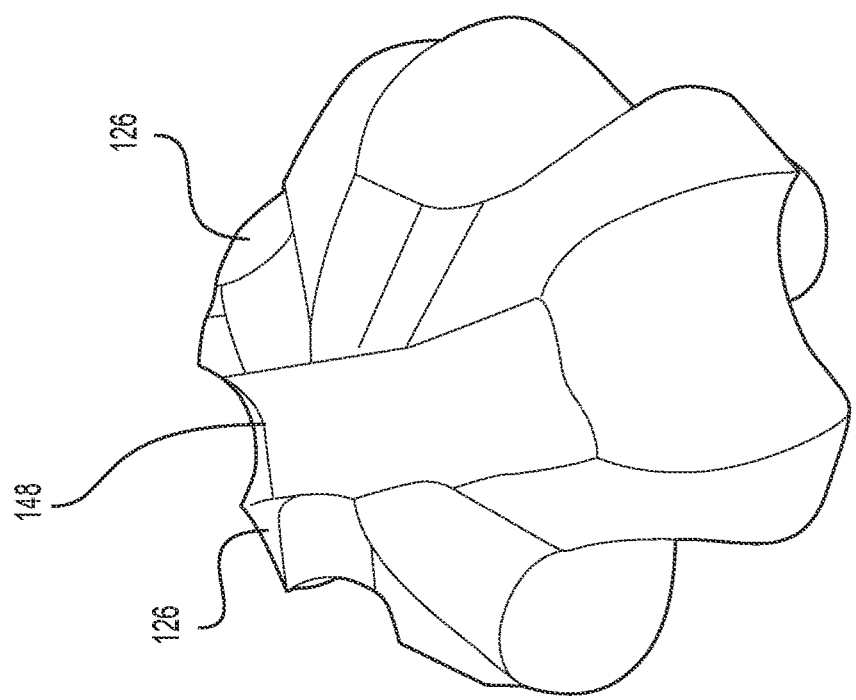
FIG. 28L is a partial isometric side view of the ball nose cutting tool illustrating an alternative end configuration.

Referring generally to the figures and more specifically to FIGS. 28A-28K embodiments of the cutting tool 100 that are ball shaped are illustrated. Thus, the blades 132 include an outermost surface that is curved with respect to the longitudinal centerline of the cutter, while maintaining the positive rake angles 128 on the flute sidewalls 122, 124, as well as the positive rake angles on the outer surface of the blades 132. FIG. 28L illustrates a ball shaped cutter 156 having a split point 148 in place of the central point 138. The split point 148 includes a flute 118 cut across the tip of the ball shaped cutter 156. Thus, a face 126 is provided on each side 122, 124 of the flute 118 having a positive rake angle 128. While this construction is more prone to walking on a surface when the end is applied to a bone, the construction is still suitable for cutting bone and other tissue when rotationally oscillated.

Figure 29V:
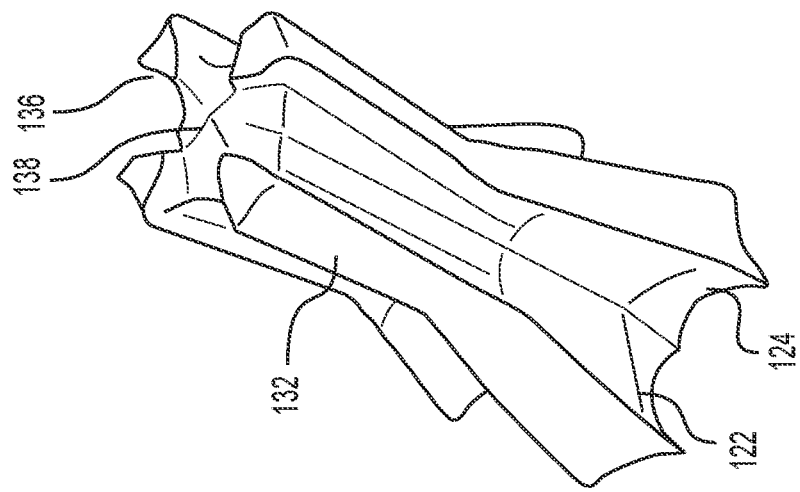
FIG. 29V is a partial isometric view of the end and side of the form cutting tool.
Figure 29U:
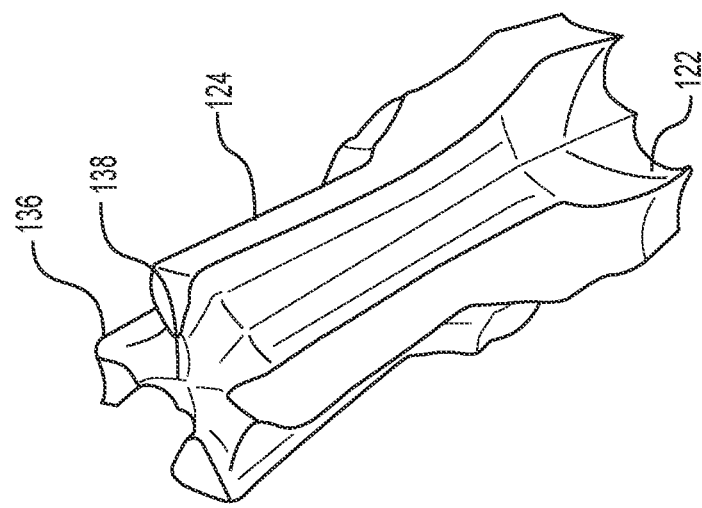
FIG. 29U is a partial isometric view of the end and side of the form cutting tool.
Figure 29X:
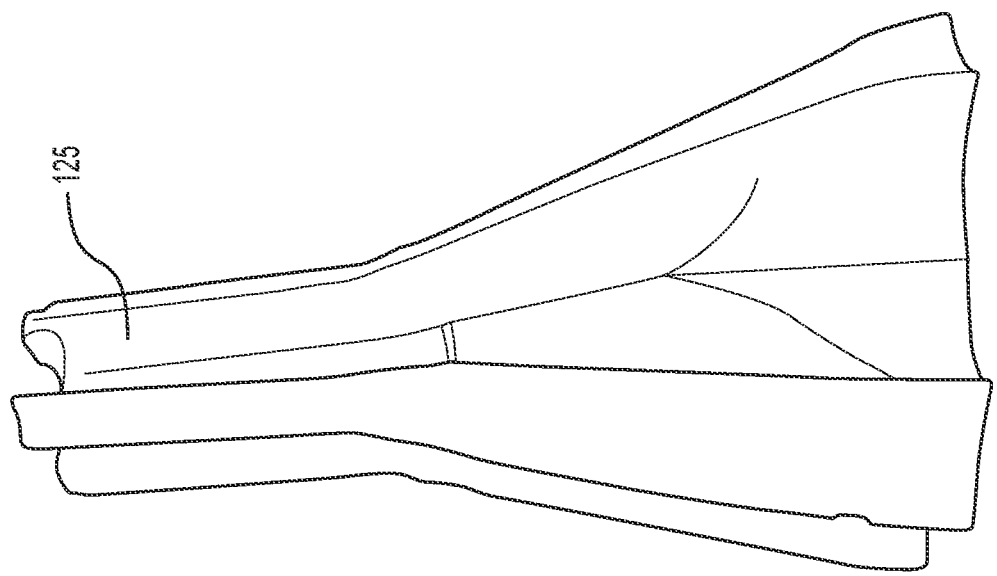
FIG. 29X is a partial isometric view of the side of the form cutting tool.
Figure 29W:
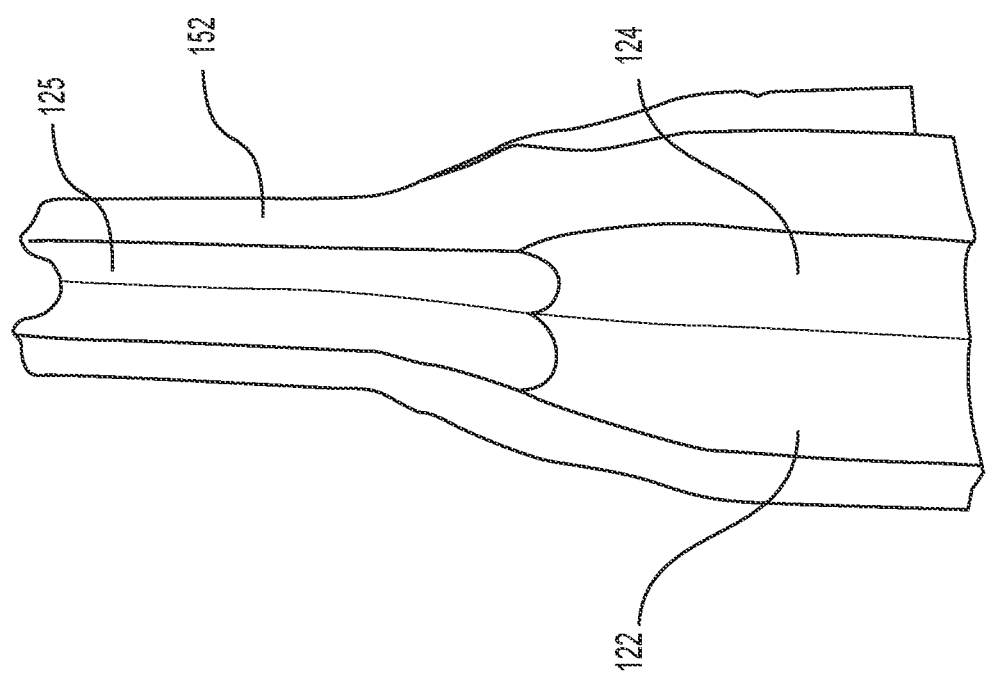
FIG. 29W is a partial isometric view of the side of the form cutting tool.

Referring generally to the figures and more specifically to FIGS. 29A-29X illustrate a bi-directional cutting tool 100 that includes a shaped side surface 150. The side surface 150 may be tapered or may include any number of different diameters with transition surfaces 152 extending between the diameters. In this manner, the cutter 100 is suitable for plunging into bone to create a shaped aperture. The cutter 100 can also be used to cut along the side of a bone to create a stepped or notched surface. The shaped cutter 100 includes the positive rake angles and fluting, as described above, that allow the shaped cutter to cut when oscillated in both directions. The shaped cutter 100 can also be constructed to provide a pilot bore with the smallest diameter portion of the cutter 100 while a larger diameter follows the small diameter for threading or the like. Still, a third diameter of the shaped cutter 100 may be used as a countersink or for clearance or the like, as a non-limiting example.

Figure 30:
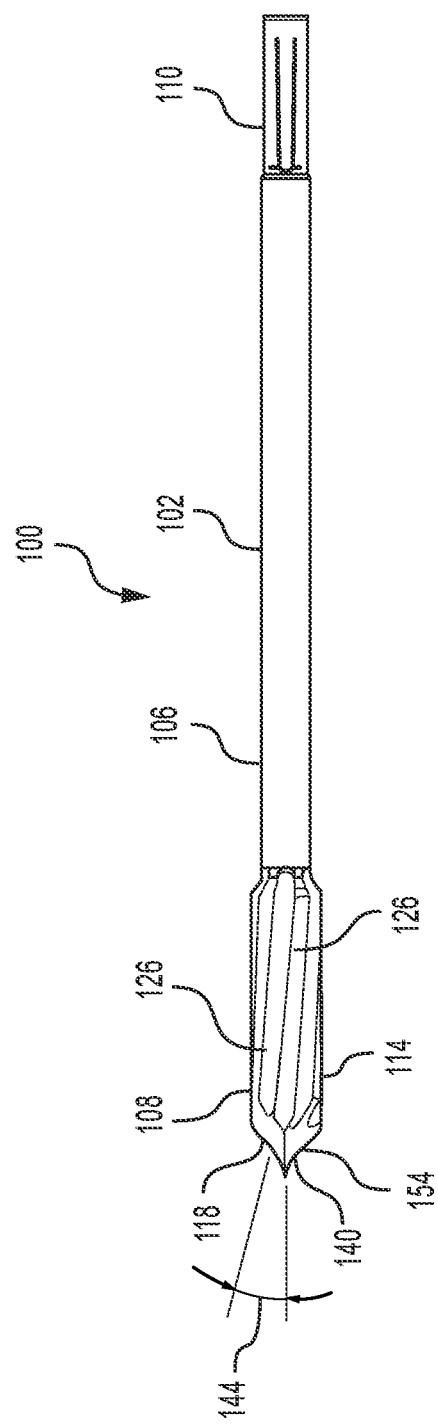
FIG. 30 illustrates a side view of a bi-directional cutting tool self-centering point.
Figure 31A:
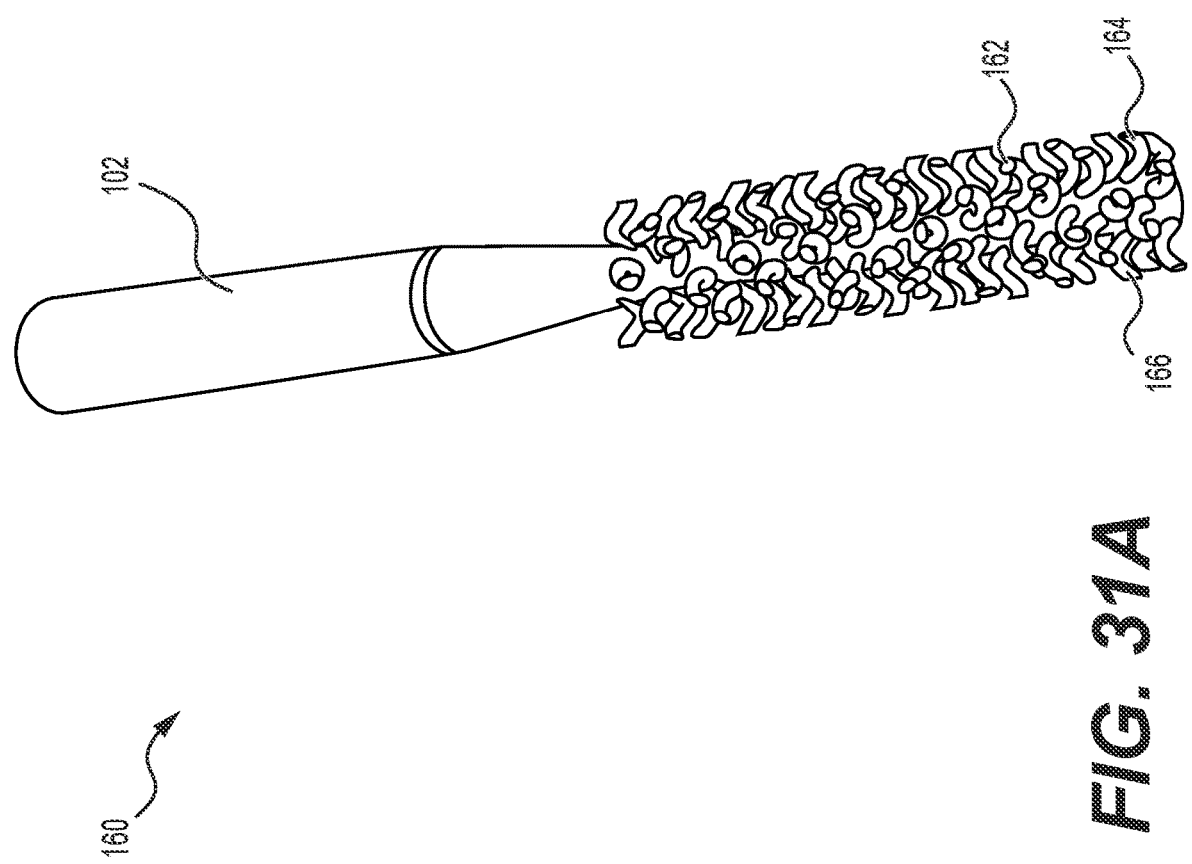
FIG. 31A is an isometric view of a bi-directional tissue modification tool.
Figure 32C:
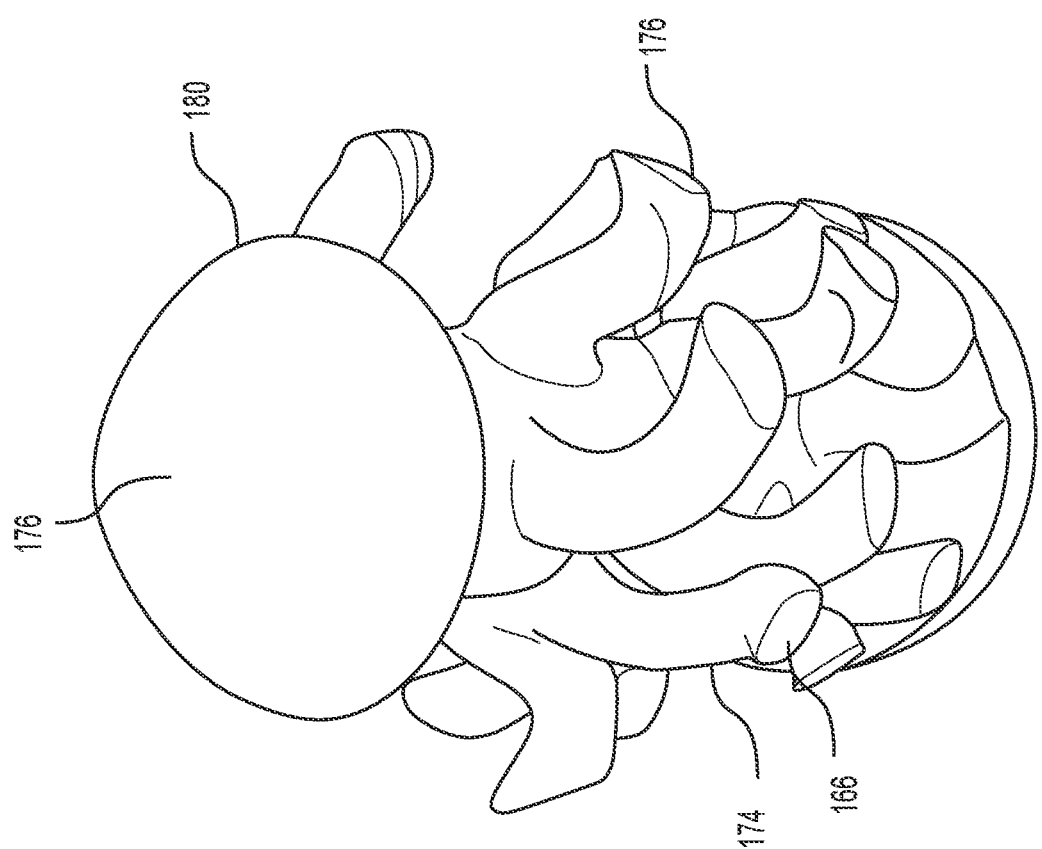
FIG. 32C is an isometric view of the bi-directional tissue modification tool having the depth pilot.

Referring generally to the figures and more specifically to FIG. 30 a bi-directional cutting tool 100 that includes an extended central point 154 is illustrated. The extended central point 154 is constructed to provide a central point that resists walking across a hard surface or irregular, such as bone. The extended central point 154 includes facets 140 which may be flat or curved, intersecting at the point 154 to cause the hard bone to break into small particles when the cutting tool 100 is oscillated.

Referring generally to the figures and more specifically to FIGS. 25, 31A-31B, and 32A-32C illustrate soft-tissue bi-directional cutters 160. In general, the soft tissue cutter 160 includes a substantially rigid shank 102 having a shaped head portion 172. The shaped head portion 172 includes a plurality of helically mounted and shaped talons 162; each talon 162 including a body 164 bent to retain tissue, and each talon 162 including a cutter end 166. The cutter end 166 includes both acute 168 and obtuse 170 cutting surface relief angles for diverse cutting action with respect to hard and soft tissues. The talons 162 are generally constructed and arranged to cut and grab tissue, such as disk material, which is held against the shaped head portion 172 and the distal ends of the talons 162. This construction allows the disk material to be removed from the surgical site by removing the tool with the intertwined soft tissue attached thereto. The construction of the talons 162 also allows self-cleaning of the soft tissue cutter 160 by high-speed oscillation or rotation once removed. This allows the tool to be quickly cleaned for reuse in removing more disk material and eliminates the need for tool changes each time the tool is filled with disk material. Once the disk material is removed, the talons 162 can be utilized to decorticate the bone. Thus, the same tool can be utilized to remove disk material and decorticate and shape the bone. In order to facilitate the broad spectrum of uses, the talons 162 include a unique structure. The talon 162 in the preferred embodiment is round in cross-section and includes one or more bends 174 terminating in a generally flat cutting surface 176; the cutting surface 176 being substantially parallel to the surface of the shaped head portion 172. The bends 174 provide rigidity and controlled flex to the talon 162. In addition, because one of the bends 174 in the talon 162 is provided in proximity to the outer cutting surface 176, while the cutting surface 176 is oriented parallel to the shaped head 172, various relief angles 168, 170 are provided around the perimeter of the cutting surface 176. This construction allows the same talon 162 to cut, scrape and smooth the surface being cut, while talons 162 rotationally oriented at different angles around and along the bi-directional cutting surface 176 contact the bone surface. The side of the talon 162 having higher relief angles reduces load on the talon 162 and allows higher material removal with the same load, while the lower relief angles scrape and/or rub the surface to leave a relatively smooth surface finish. This construction allows the same tool to be used for roughing and finishing of the bone surface and provides a suitable surface for supporting implants and promoting bone growth. The talon bends 174 are preferably about ninety degrees, and each talon 162 preferably includes two bends 174 along its length. However, it should be noted that other bend angles, and as few as one bend and as many as six, may be utilized without departing from the scope of the invention. The bends 174 may be axially aligned with each other along the length of each talon 162, or there may be a rotation between the bends 174 to provide for more or less flexion of the talon 162 during operation for smoother surface finish or faster material removal respectively. The talons 162 may also be located along the shank 102 at a helical angle with respect to each other or linearly aligned to provide different operating characteristics to the tool. The preferred material for the soft tissue cutting tool 160 is printed titanium. However, other materials including high speed steel, stainless steel, carbide and the like, may be utilized without departing from the scope of the invention. Suitable coatings may also be utilized on the outer surface of the bi-directional cutter to reduce friction and increase surface hardness; such coatings may include but should not be limited to, titanium nitride, titanium carbide, chromium carbide, titanium carbonitride and the like. In some embodiments, 32A-32C, the distal end 178 of the soft tissue cutting tool 160 is provided with a stop plug 180 that is suitable to prevent the tool from moving into a surface or limit the proximity of the soft-tissue cutting tool 160 with respect to a side surface. In this manner, when the soft tissue cutting tool 160 gets within the desired proximity to a bottom surface or a side surface, the stop plug 180 rubs against the bone surface to prevent the tool from moving further toward the bone. This construction is particularly useful for decortication of bone and reduces the chances of the surgeon removing too much material from the bone surface.

Figure 24:
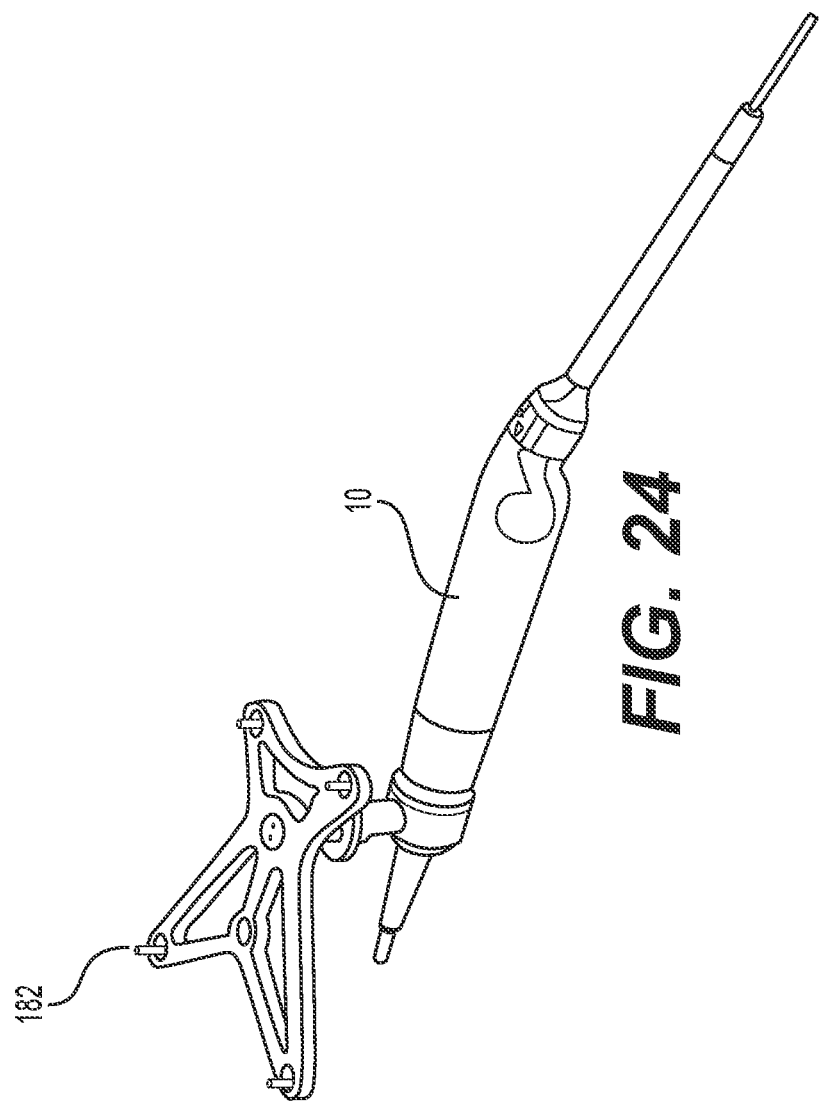
FIG. 24 is an isometric view of the surgical tool having an attached location and orientation assembly.
Figure 26J:
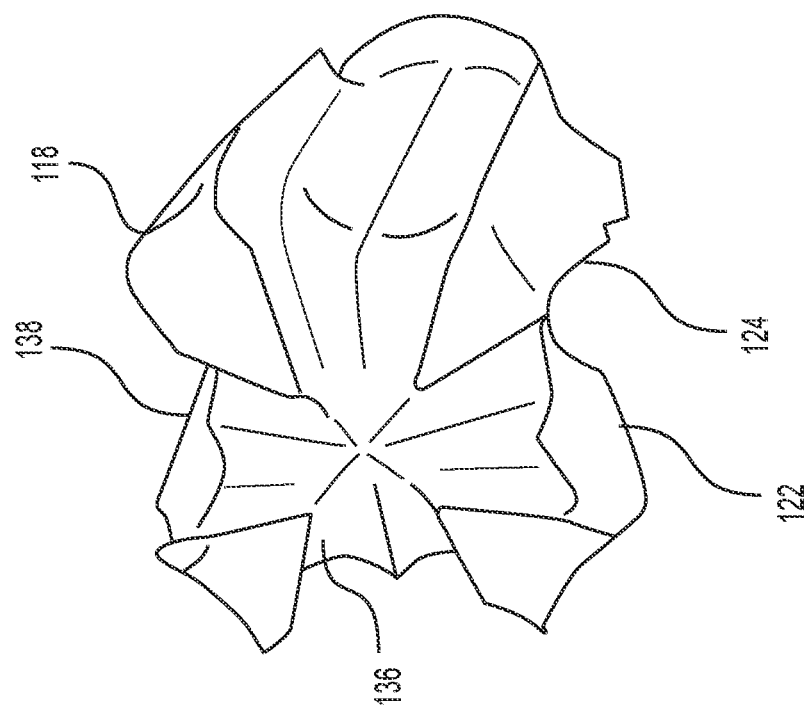
FIG. 26J is a partial isometric view of the bi-directional cutting tool.
Figure 26I:
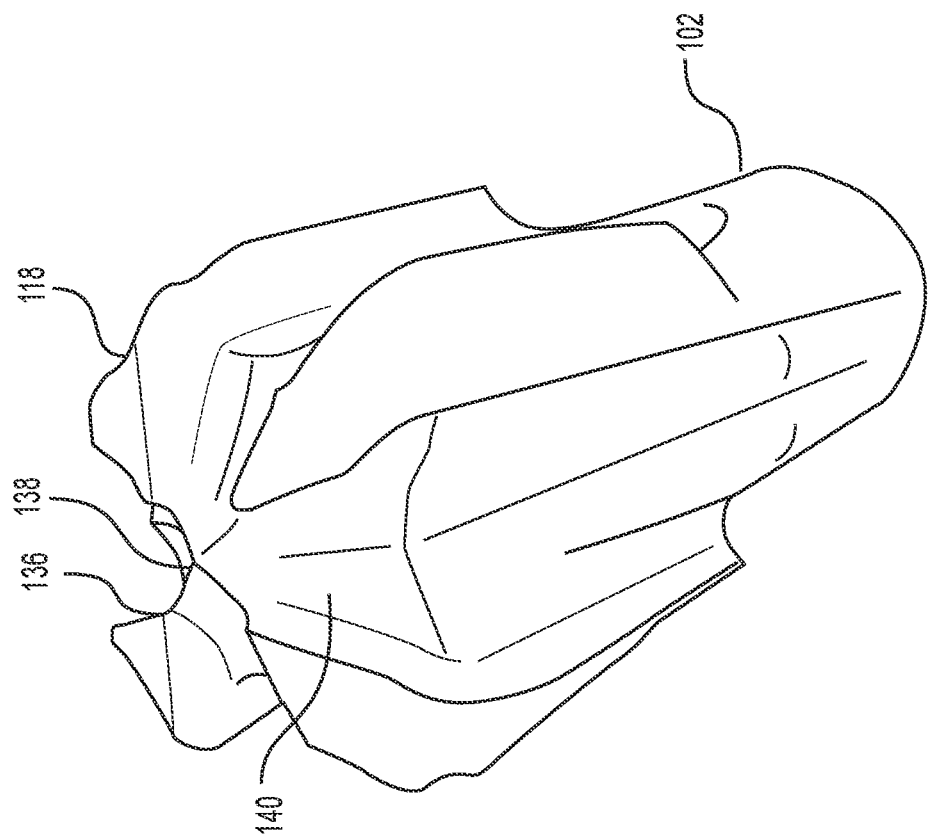
FIG. 26I is a partial isometric view of the bi-directional cutting tool.
Figure 27F:
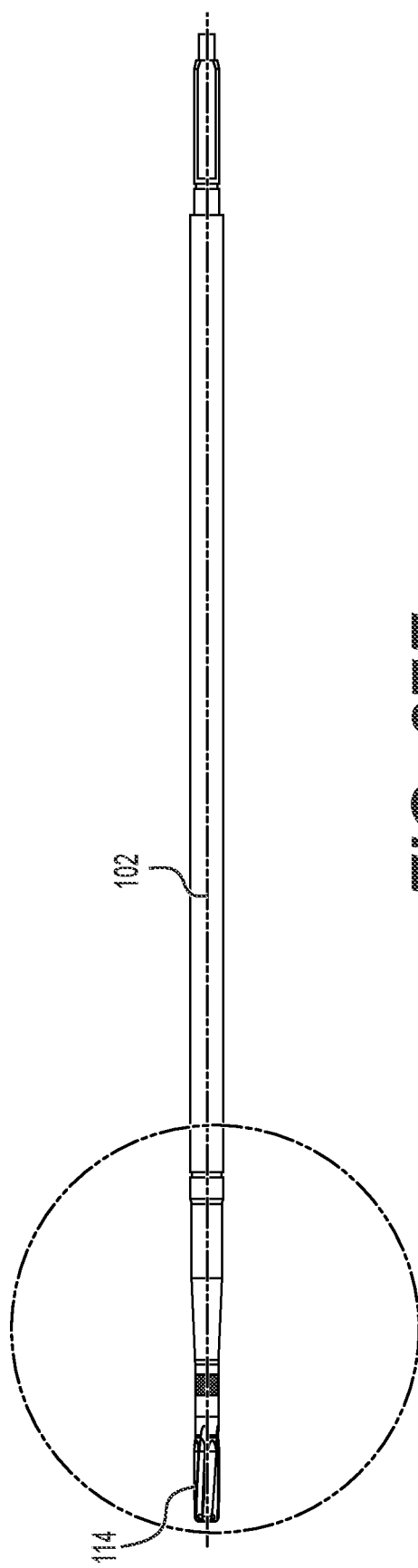
FIG. 27F is a side view of the bi-directional cutting tool with extended flutes and cutting surfaces.
Figure 27G:
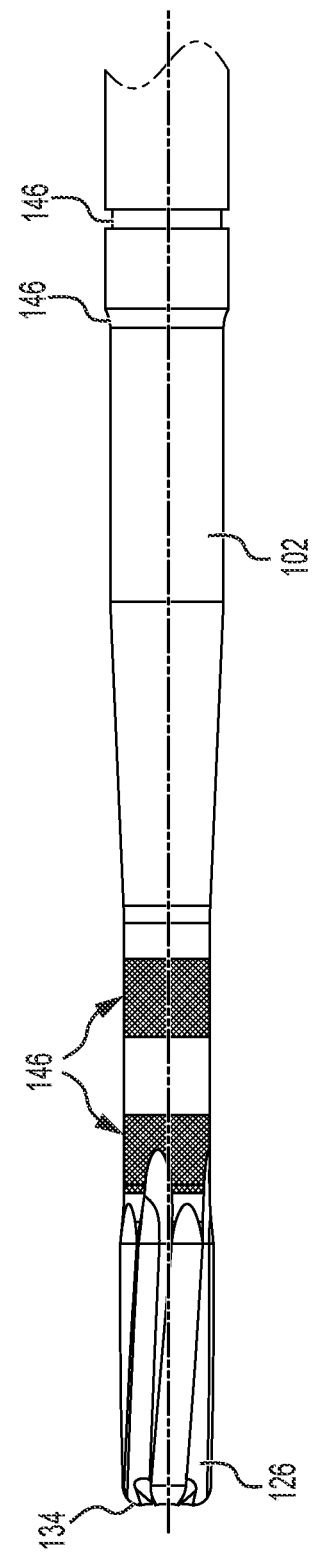
FIG. 27G is a partial side view of the bi-directional cutting tool with extended flutes and cutting surfaces taken along lines 27G-27G of FIG. 27F.
Figure 27J:
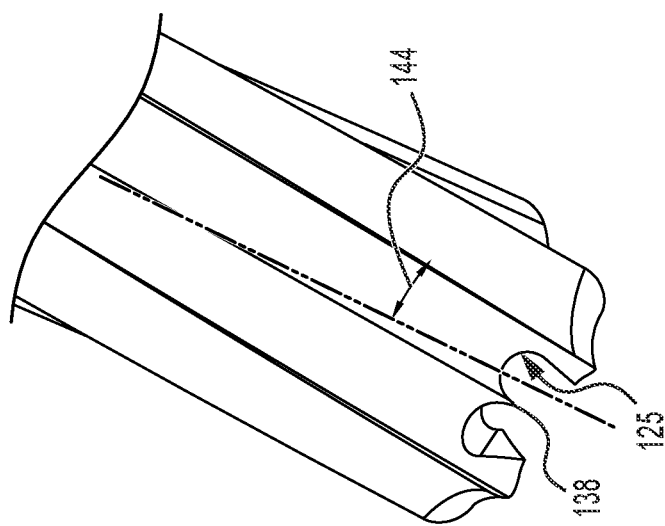
FIG. 27J is a partial isometric view of the bi-directional cutting tool with extended flutes and cutting surfaces.
Figure 27I:
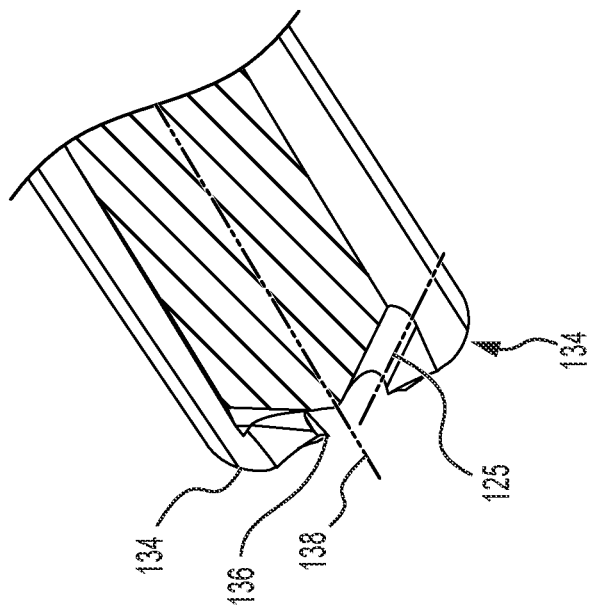
FIG. 27I is a partial section view taken along lines 27I-27I of FIG. 27H.
Figure 27H:
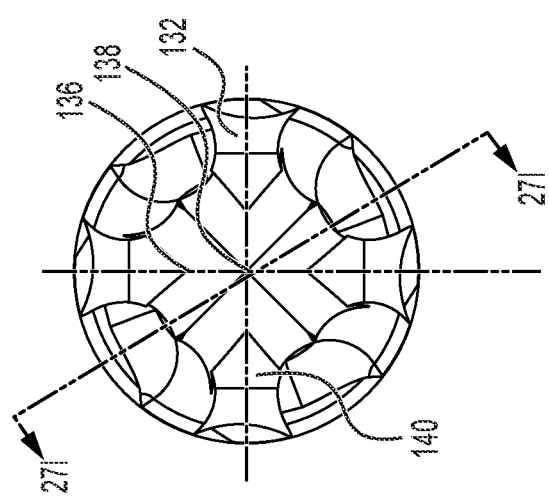
FIG. 27H is an end view of the bi-directional cutting tool with extended flutes and cutting surfaces.
Figure 27L:
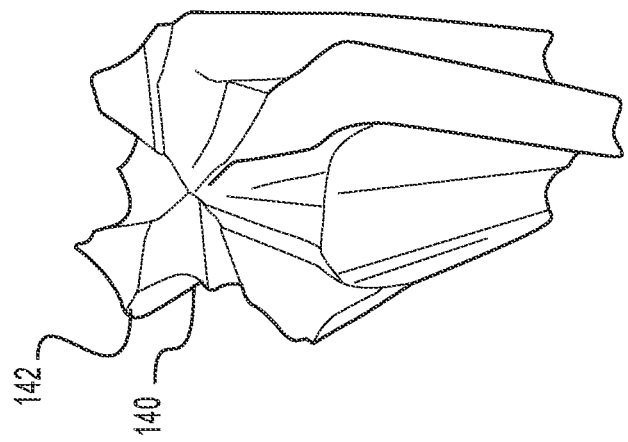
FIG. 27L is a partial isometric view of the bi-directional cutting tool with extended flutes and cutting surfaces.
Figure 27K:
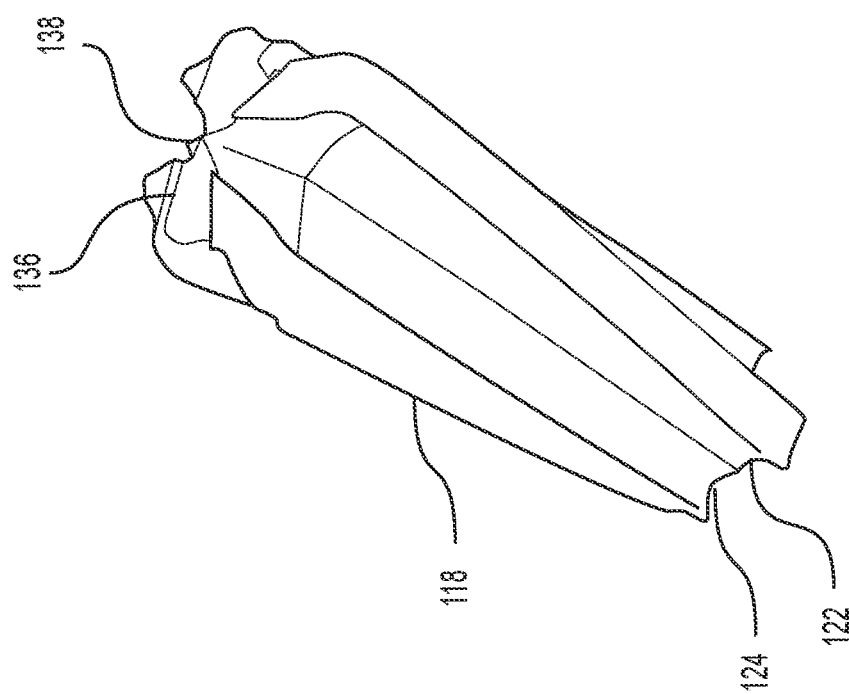
FIG. 27K is a partial isometric view of the bi-directional cutting tool with extended flutes and cutting surfaces.

Referring generally to the figures and more specifically to FIG. 24 the present surgical tool 100 having a plurality of spheres 182 positioned for use with surgical tracking systems which are known in the art is illustrated. The surgical tracking systems typically utilize cameras to monitor the location of the spheres 182, which can be shown on a viewing screen to confirm location and movement. In a preferred embodiment, the tracking system is removable from the motor assembly 14 without disassembly of the surgical tool 100.

All features of the cutting tool 100 may be symmetrical for balancing the cutting operations to minimize axial inadvertent axial translation and lateral translation of the cutting tool 100. Suitable cutting operations may be obtained by asymmetrical geometries as well.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while certain forms of the invention are illustrated, it is not to be limited to the specific forms or arrangements herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures, and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A power operated surgical tool comprising:
   an external housing adapted to enclose and support various internal components;
   a transmission;
   a motor secured within the external housing, the motor including an output shaft, the motor output shaft connected to the transmission, the transmission including an oscillating rotation drive mechanism for causing a cutting tool to rotationally oscillate about a longitudinal axis of the cutting tool, the oscillating rotation drive mechanism having a link that revolves about the motor output shaft at a swing angle and is attached to a rotatably mounted shuttle so that the distal end of the link rotates around the motor shaft while a pivot axis at the front portion of the link is positioned to rotate upon a neutral point, causing the shuttle to rotationally oscillate about an axis lateral to the motor output shaft.

2. The power operated surgical tool as claimed in claim 1 wherein the relationship of the swing angle can be varied with respect to the motor output shaft to provide different angular rotation of the shuttle.

3. The power operated surgical tool as claimed in claim 1 wherein the shuttle includes an arcuate gear segment, the arcuate gear segment intermeshed with a pinion gear, the pinion gear connected to an end effector shaft to cause the rotational oscillating motion to the end effector shaft.

4. The power operated surgical tool as claimed in claim 3 wherein the end effector shaft includes the cutting tool.

5. The power operated surgical tool as claimed in claim 4 wherein rotation of the cutting tool is between 40 degrees and 180 degrees in each direction about the longitudinal axis of the cutting tool.

6. The power operated surgical tool as claimed in claim 5 wherein rotation of the cutting tool is between 50 degrees and 90 degrees in each direction about the longitudinal axis of the cutting tool.

7. The power operated surgical tool as claimed in claim 3 wherein the pinion gear, as well as the gear segment, are constructed from a polymeric material.

8. The power operated surgical tool as claimed in claim 3 wherein the polymeric material is polyether ether ketone.

9. The power operated surgical tool as claimed in claim 3 wherein the pinion gear, as well as the gear segment, are straight cut gears.

10. The power operated surgical tool as claimed in claim 3 wherein the pinion gear, as well as the arcuate gear segment, are helical cut gears.

11. The power operated surgical tool as claimed in claim 10 wherein the arcuate gear segment includes a beveled gear having a helical tooth profile.

12. The power operated surgical tool as claimed in claim 3 wherein the end effector is removably connected to the external housing.

13. The power operated surgical tool as claimed in claim 12 wherein the end effector includes the pinion gear, the end effector shaft, and the cutting tool.

14. The power operated surgical tool as claimed in claim 12 including a tool coupler for coupling the end effector to the external housing, the tool coupler including a ferrule secured to a first end of the end effector, while the cutting tool extends from a second end of the end effector, the ferrule including a flange, the flange including a stop surface that cooperates with a front surface of a lock ring to establish the depth that the end effector is allowed to enter into a motor assembly, adjacent the flange is a ferrule shank, the ferrule shank includes one or more keys fixed in position on the ferrule shank, each key including side key surfaces and a lock surface, the lock ring is constructed to rotate in a first direction to allow the ferrule shank to enter into an inner bore of the lock ring, allowing the ferrule key(s) to enter and the key side surfaces to engage a docking port of the external housing to prevent the end effector from rotating relative to the external housing.

15. The power operated surgical tool as claimed in claim 14 wherein the lock ring includes one or more cam surfaces which cooperate with the lock surface(s) of the ferrule to pull the stop surface of the ferrule against a front surface of the lock ring to secure the end effector in position.

16. The power operated surgical tool as claimed in claim 15 wherein the lock ring includes a spring lock having a rounded end which cooperates with ridges positioned on an outer surface of the docking ports to provide a tactile feedback when the locking ring is rotated into its locked position.

17. The power operated surgical tool as claimed in claim 1 including a crank assembly hub secured to the motor output shaft, the crank assembly hub including a hub bore for receiving the distal end of the link, the crank assembly hub constructed and arranged to maintain the swing angle.

18. The power operated surgical tool as claimed in claim 17 wherein the swing angle is an acute angle with respect to the motor output shaft.

19. The power operated surgical tool as claimed in claim 17 wherein the link is secured to the shuttle by one or more arms each having a bearing which receives therein a bolt that is received within the bearings and threadably secured to a bore in the shuttle.

20. The power operated surgical tool as claimed in claim 17 wherein the link is secured to the shuttle by a pair of spaced apart arms each having a bearing which receives therein a bolt that is received within the bearings and threadably secured to a bore in the shuttle.

* * * * *